US010713462B2

(12) United States Patent
Kurasawa et al.

(10) Patent No.: US 10,713,462 B2
(45) Date of Patent: *Jul. 14, 2020

(54) FINGERPRINT DETECTION DEVICE AND DISPLAY DEVICE

(71) Applicant: Japan Display Inc., Tokyo (JP)

(72) Inventors: Hayato Kurasawa, Tokyo (JP); Toshinori Uehara, Tokyo (JP); Hiroshi Mizuhashi, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/261,063

(22) Filed: Jan. 29, 2019

(65) Prior Publication Data

US 2019/0171859 A1  Jun. 6, 2019

Related U.S. Application Data

(63) Continuation of application No. 15/412,793, filed on Jan. 23, 2017, now Pat. No. 10,242,244.

(30) Foreign Application Priority Data

Jan. 27, 2016  (JP) .................................. 2016-013514
Jan. 27, 2016  (JP) .................................. 2016-013515
Jan. 17, 2017  (JP) .................................. 2017-006159

(51) Int. Cl.
*G06K 9/00*          (2006.01)
(52) U.S. Cl.
CPC .................. *G06K 9/0002* (2013.01)

(58) Field of Classification Search
CPC ............. G06K 9/00053; G06K 9/0002; G06K 19/07756; G06K 9/00026; G06K 9/00087;
(Continued)

(56) References Cited

U.S. PATENT DOCUMENTS 5,869,791 A * 2/1999 Young ................... G06F 3/0414
                                                         178/20.01
5,907,627 A * 5/1999 Borza .................. G06K 9/0002
                                                         382/124

(Continued)

FOREIGN PATENT DOCUMENTS

CN         103530609 A     1/2014
JP         2002-245443 A   8/2002
(Continued)

OTHER PUBLICATIONS

Chinese Office Action dated Dec. 5, 2019, corresponding to Chinese Patent Application No. 201710063359.7.
(Continued)

*Primary Examiner* — Aklilu K Woldemariam
(74) *Attorney, Agent, or Firm* — Michael Best & Friedrich LLP

(57) ABSTRACT

A fingerprint detection device includes: a substrate having a first surface and a second surface on an opposite side of the first surface, the first surface serving as a detection surface configured to detect unevenness of an object in contact or in proximity; a detection electrode provided on the second surface side of the substrate and configured to detect unevenness of a finger in contact or in proximity on the basis of an electrostatic capacitance change; and a drive circuit provided on the second surface side of the substrate and configured to supply a drive signal to the detection electrode.

15 Claims, 29 Drawing Sheets

(58) Field of Classification Search
CPC ..... G06K 9/00013; G06F 21/32; G06F 3/045;
G06F 2203/04102; G06F 2203/04112;
G06F 3/041; G06F 3/0414; G06F 3/044;
G06F 21/83; G06F 2203/04103; G06F
2203/04106; G06F 3/03547; G06F
3/0412; G06F 2203/04101; G06F 3/0416;
G06F 2203/0338; G06F 2203/04105;
G06F 2203/04111; G06F 2203/04107;
G06F 2203/04108; G06F 3/0418; H01L
51/0097; H01L 2224/48091; H01L
2224/16227; H01L 2224/32225; H01L
2224/73204; H01L 27/14678; H01L
2924/00014; H01L 2924/15788; H01L
2924/19105; H01L 2924/19107; H01L
2224/48465; H01L 27/323; H01L
27/3262; H01L 9/3231; G02F 1/19; G02F
2202/02; G07C 2009/00095; G07C
9/00071; H01H 1/0036; G02B 26/0833;
Y10T 156/10; Y10T 29/49124; Y10T
29/4913; Y10S 257/914; Y10S 438/931;
H04L 9/3231; H04N 21/4415; G09G
3/3208; H05K 1/117
USPC ......... 345/173, 174, 175; 382/124, 125, 126
See application file for complete search history.

(56) References Cited

U.S. PATENT DOCUMENTS

| | | | |
|---|---|---|---|
| 6,370,965 B1* | 4/2002 | Knapp | G06K 9/00053 73/780 |
| 2003/0016024 A1 | 1/2003 | Teranuma et al. | |
| 2004/0179722 A1* | 9/2004 | Moritoki | G02B 6/06 382/124 |
| 2004/0185590 A1* | 9/2004 | Miyai | G06K 9/00053 438/48 |
| 2005/0259853 A1* | 11/2005 | Miyai | G06K 9/00053 382/124 |
| 2006/0072355 A1* | 4/2006 | Ebihara | G07C 9/257 365/149 |
| 2008/0297878 A1* | 12/2008 | Brown | B82Y 10/00 359/263 |
| 2010/0156851 A1* | 6/2010 | Kurokawa | G06F 3/0412 345/175 |
| 2011/0090006 A1* | 4/2011 | Yamazaki | H01L 27/156 327/581 |
| 2011/0210324 A1* | 9/2011 | Sakakura | H01L 27/1225 257/43 |
| 2012/0092294 A1* | 4/2012 | Ganapathi | G02B 26/0833 345/174 |
| 2012/0092350 A1* | 4/2012 | Ganapathi | G02B 26/0833 345/501 |
| 2015/0030217 A1* | 1/2015 | Wickboldt | G06F 3/044 382/124 |
| 2016/0042215 A1 | 2/2016 | Wang et al. | |
| 2016/0179229 A1* | 6/2016 | Ahn | G06F 3/041 345/173 |
| 2016/0190500 A1* | 6/2016 | Watabe | C07F 15/0033 257/40 |
| 2017/0286739 A1* | 10/2017 | Shibano | G06K 9/0002 |

FOREIGN PATENT DOCUMENTS

| | | |
|---|---|---|
| JP | 2003-090703 A | 3/2003 |
| JP | 2004-233256 A | 8/2004 |
| WO | WO-02/065394 A1 | 8/2002 |

OTHER PUBLICATIONS

Japanese Office Action dated Jun. 2, 2020 for the corresponding Japanese application No. 2017-006159, with English machine translation.

\* cited by examiner

FINGERPRINT DETECTION DEVICE AND DISPLAY DEVICE

CROSS-REFERENCE TO RELATED APPLICATIONS

This application is a Continuation of application Ser. No. 15/412,793, filed Jan. 23, 2017, and claims priority from Japanese Application No. 2016-013514, filed on Jan. 27, 2016; Japanese Application No. 2016-013515, filed on Jan. 27, 2016; and Japanese Application No. 2017-006159 filed on Jan. 17, 2017, the contents of which are incorporated by reference herein in its entirety.

BACKGROUND

1. Technical Field

The present disclosure relates to a fingerprint detection device and a display device.

2. Description of the Related Art

Some electronic apparatuses including a display device such as a liquid crystal display device are provided with a fingerprint detection device. The fingerprint detection device detects the unevenness of a fingerprint of a finger in contact therewith to detect the shape of the fingerprint. Detection results of a fingerprint sensor are used for personal authentication and other purposes. For example, in a fingerprint detection device disclosed in Japanese Patent Application Laid-open Publication No. 2002-245443 (JP-A-2002-245443), detection electrodes for fingerprint detection, a drive circuit, and a detection circuit are provided on an insulating substrate.

In some electronic apparatuses having a fingerprint detection device mounted thereon, a functional surface such as a display function of displaying images is provided on the opposite side of a detection surface for detecting fingerprints. In JP-A-2002-245443, a detection electrode is provided above a switching element, and hence a surface on the transparent substrate side cannot be used as the detection surface for fingerprint detection, which may limit the arrangement of the detection surface.

SUMMARY

According to an aspect, a fingerprint detection device includes a substrate having a first surface and a second surface on an opposite side of the first surface, the first surface serving as a detection surface configured to detect unevenness of an object in contact or in proximity, a detection electrode provided on the second surface side of the substrate and configured to detect unevenness of a finger in contact or in proximity on the basis of an electrostatic capacitance change, and a drive circuit provided on the second surface side of the substrate and configured to supply a drive signal to the detection electrode.

DETAILED DESCRIPTION

Modes for carrying out the present invention (embodiments) are described in detail with reference to the accompanying drawings. The present invention is not intended to be limited by what is described in the following embodiments. Constituent elements described below encompass elements that may readily occur to those skilled in the art and substantially identical elements. The constituent elements described below can be combined as appropriate. The present disclosure is merely illustrative, and it should be understood that appropriate changes keeping the gist of the present invention that may readily occur to those skilled in the art are encompassed in the scope of the present invention. For a clearer description, some drawings schematically illustrate the width, thickness, shape, and the like of each portion in dimensions different from those in practice, but the drawings are merely illustrative and are not intended to limit the interpretation of the present invention. In the present specification and drawings, the same elements as those described with reference to the drawings already mentioned are denoted by the same reference symbols and detailed descriptions thereof are sometimes omitted as appropriate.

First Embodiment

Figure 1:
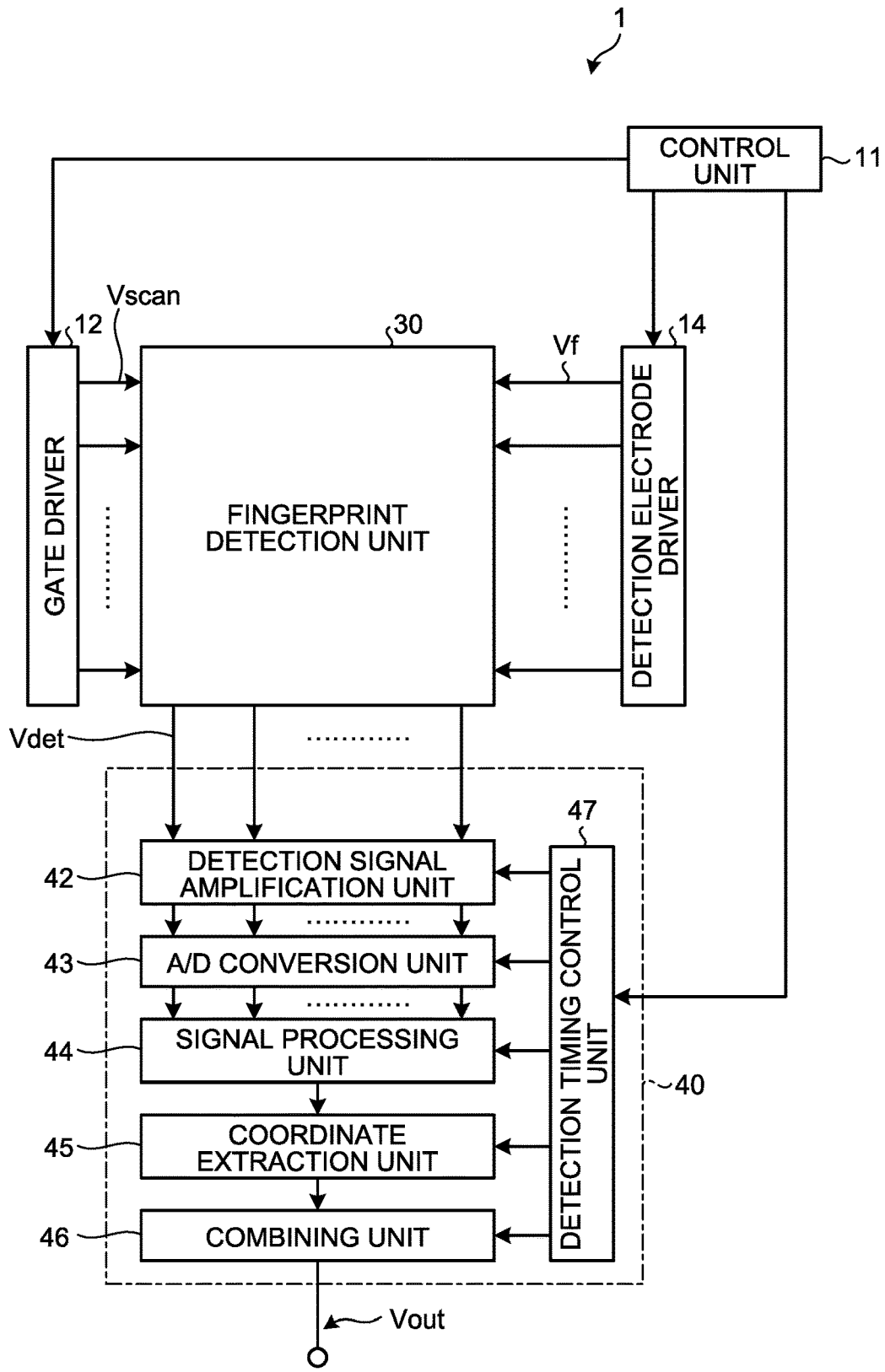
FIG. 1 is a block diagram illustrating a configuration example of a fingerprint detection device according to a first embodiment.

FIG. 1 is a block diagram illustrating a configuration example of a fingerprint detection device according to a first embodiment. As illustrated in FIG. 1, a fingerprint detection device 1 includes a fingerprint detection unit 30, a control unit 11, a gate driver 12, a detection electrode driver 14, and a detection unit 40.

As described later, the fingerprint detection unit 30 detects fingerprints by sequentially scanning detection lines one by one in accordance with a scanning signal Vscan supplied from the gate driver 12. The fingerprint detection unit 30 detects fingerprints by detecting the unevenness of an object in contact or in proximity on the basis of the principle of self-capacitance detection.

The control unit 11 is a circuit configured to supply control signals to the gate driver 12, the detection electrode driver 14 respectively, and the detection unit 40 and control the gate driver 12, the detection electrode driver 14, and the detection unit 40 to operate in synchronization with one another.

The gate driver 12 has a function of sequentially selecting detection electrode blocks one by one that are subjected to detection driving by the fingerprint detection unit 30 on the basis of the control signal supplied from the control unit 11.

The detection electrode driver 14 is a circuit configured to supply a drive signal Vf to a detection electrode 25 subjected to detection driving by the fingerprint detection unit 30 on the basis of the control signal supplied from the control unit 11.

The detection unit 40 is a circuit configured to detect the presence/absence of a finger in contact or in proximity, with fine pitches on the basis of the control signal supplied from the control unit 11 and a detection signal Vdet supplied from the fingerprint detection unit 30. For example, the detection unit 40 includes a detection signal amplification unit 42, an A/D conversion unit 43, a signal processing unit 44, a coordinate extraction unit 45, and a combining unit 46. A detection timing control unit 47 controls the detection signal amplification unit 42, the A/D conversion unit 43, the signal processing unit 44, the coordinate extraction unit 45, and the combining unit 46 so that these units operate in synchronization with one another on the basis of the control signal supplied from the control unit 11.

The detection signal amplification unit 42 amplifies the detection signal Vdet supplied from the fingerprint detection unit 30. The detection signal amplification unit 42 may include an analog low pass filter (LPF), which is an analog low band pass filter. The analog LPF removes high frequency components (noise components) included in the detection signal Vdet and outputs the resultant signal.

The A/D conversion unit 43 samples, at timings synchronized with the drive signals Vf, each of the analog signals output from the detection signal amplification unit 42 and converts the sampled signals into digital signals.

The signal processing unit 44 includes a digital filter. The digital filter reduces frequency components (noise components) included in the output signal from the A/D conversion unit 43 other than the frequency at which the drive signal Vf is sampled. The signal processing unit 44 is a logic circuit configured to detect the presence/absence of a finger in contact or in proximity with the fingerprint detection unit 30 on the basis of the output signal from the A/D conversion unit 43.

The coordinate extraction unit 45 is a logic circuit configured to determine detection coordinates at which the finger in contact or in proximity is detected by the signal processing unit 44. The coordinate extraction unit 45 outputs the detection coordinates to the combining unit 46. The combining unit 46 combines the detection signals Vdet output from the respective detection electrodes 25 in the fingerprint detection unit 30 to generate two-dimensional information representing the shape of an object in contact or in proximity.

Figure 2:
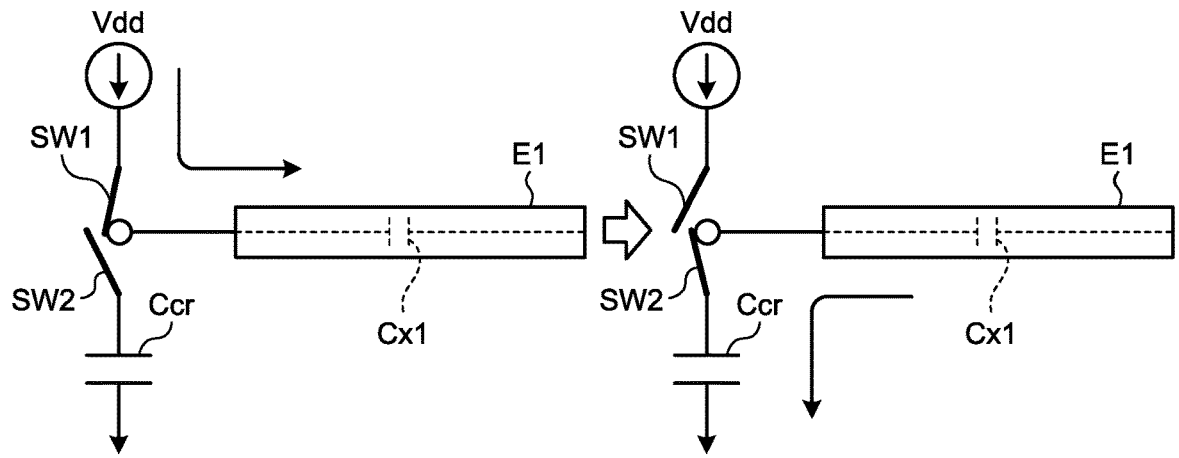
FIG. 2 is an explanatory diagram for describing the fundamental principle of self-capacitance fingerprint detection, illustrating the state in which a finger is not in contact or in proximity with the fingerprint detection device.
Figure 3:
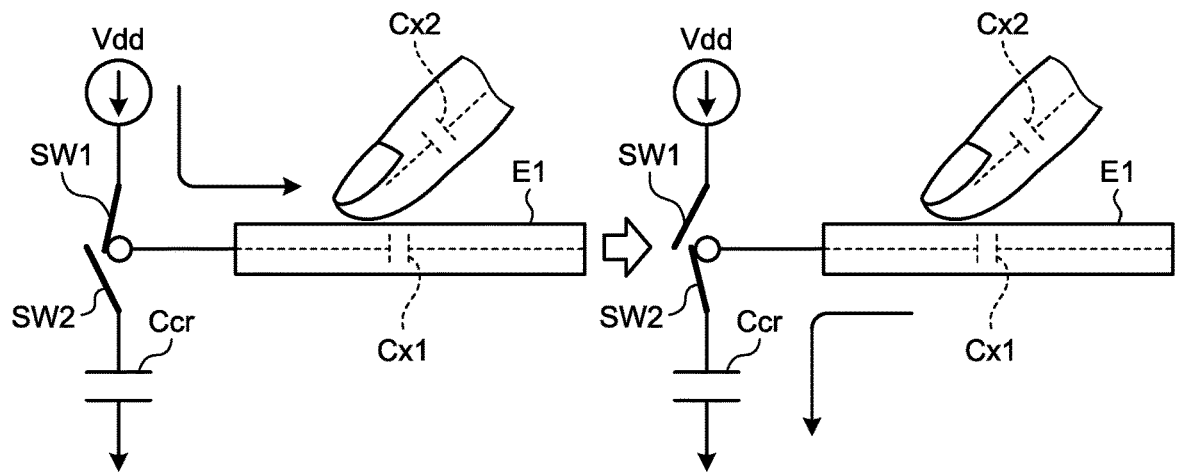
FIG. 3 is an explanatory diagram for describing the fundamental principle of self-capacitance fingerprint detection, illustrating the state in which a finger is in contact or in proximity with the fingerprint detection device.
Figure 4:
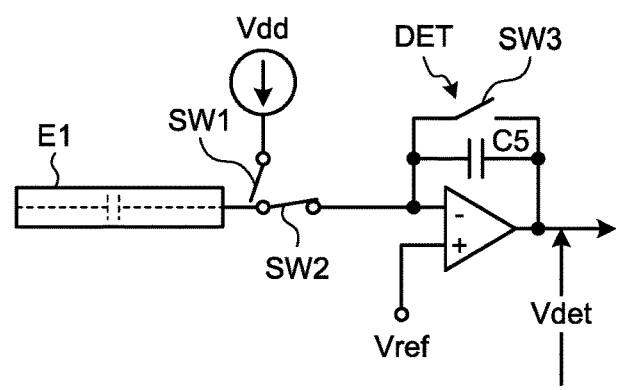
FIG. 4 is an explanatory diagram illustrating an example of an equivalent circuit for the self-capacitance fingerprint detection.
Figure 5:
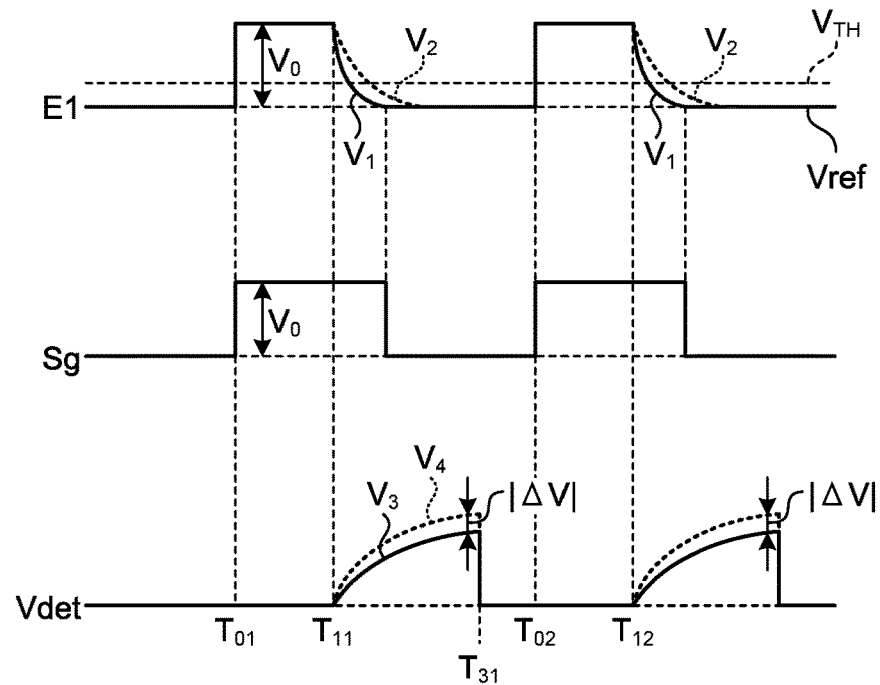
FIG. 5 is a diagram illustrating an example of waveforms of a drive signal and a detection signal for the self-capacitance fingerprint detection.

As described above, the fingerprint detection unit 30 operates on the basis of the fundamental principle of capacitance fingerprint detection. Referring to FIGS. 2 to FIG. 5, the fundamental principle of self-capacitance fingerprint detection is now described. FIG. 2 is an explanatory diagram for describing the fundamental principle of self-capacitance fingerprint detection, illustrating the state in which a finger is not in contact or in proximity with the fingerprint detection device. FIG. 3 is an explanatory diagram for describing the fundamental principle of self-capacitance fingerprint detection, illustrating the state in which a finger is in contact or in proximity with the fingerprint detection device. FIG. 4 is an explanatory diagram illustrating an example of an equivalent circuit for the self-capacitance fingerprint detection. FIG. 5 is a diagram illustrating an example of waveforms of a drive signal and a detection signal for the self-capacitance fingerprint detection. In the following, the state in which a finger is in contact or in proximity with a detection electrode or the like is referred to as "touch state".

The left diagram in FIG. 2 illustrates an untouched state in which a power source Vdd and a detection electrode E1 are coupled together by a switch SW1 and the detection electrode E1 is not coupled to a capacitor Ccr by a switch SW2. In this state, a capacitance Cx1 of the detection electrode E1 is charged. The right diagram in FIG. 2 illustrates the state in which the coupling between the power source Vdd and the detection electrode E1 is turned off by the switch SW1 and the detection electrode E1 and the capacitor Ccr are coupled together by the switch SW2. In this state, electric charges of the capacitance Cx1 are discharged through the capacitor Ccr.

The left diagram in FIG. 3 illustrates the touch state in which the power source Vdd and the detection electrode E1 are coupled together by the switch SW1 and the detection electrode E1 is not coupled to the capacitor Ccr by the switch SW2. In this state, not only the capacitance Cx1 of the detection electrode E1 but also a capacitance Cx2 generated by a finger in proximity with the detection electrode E1 is charged. The right diagram in FIG. 3 illustrates the state in which the power source Vdd and the detection electrode E1 are turned off by the switch SW1 and the detection electrode E1 and the capacitor Ccr are coupled together by the switch SW2. In this state, the electric charges of the capacitance Cx1 and electric charges of the capacitance Cx2 are discharged through the capacitor Ccr.

Voltage change characteristics of the capacitor Ccr during the discharge (touch state) illustrated in the right diagram in FIG. 3 are obviously different from voltage change characteristics of the capacitor Ccr during the discharge (untouched state) illustrated in the right diagram in FIG. 2 because the capacitance Cx2 is present. Thus, in the self-capacitance method, the fact that the voltage change characteristics of the capacitor Ccr differ depending on the presence/absence of the capacitance Cx2 is used to determine the presence/absence of a touch.

Specifically, an AC square wave Sg (refer to FIG. 5) having a predetermined frequency (for example, about several kHz to several hundreds of kHz) is applied to the detection electrode E1. A voltage detector DET illustrated in FIG. 4 converts a fluctuation in current corresponding to the AC square wave Sg into a fluctuation in voltage (waveforms $V_3$ and $V_4$).

As described above, the detection electrode E1 is configured to be decoupled from the capacitor Ccr by the switch SW1 and the switch SW2. In FIG. 5, the AC square wave Sg raises the voltage level corresponding to a voltage $V_0$ at the timing of time $T_{01}$. At this time, the switch SW1 is on and the switch SW2 is off. Accordingly, the voltage of the detection electrode E1 also increases to the voltage $V_0$. Next, the switch SW1 is turned off before the timing of time $T_{11}$. At this time, the detection electrode E1 is in a floating state, but the potential of the detection electrode E1 is maintained at $V_0$ due to the capacitance Cx1 of the detection electrode E1 (refer to FIG. 2) or the capacitance obtained by adding the capacitance Cx2 of a finger generated by a touch to the capacitance Cx1 of the detection electrode E1 (Cx1+Cx2, see FIG. 3). A switch SW3 is turned on before the timing of time $T_{11}$ and turned off after the lapse of a predetermined period to reset the voltage detector DET. This reset operation causes an output voltage of the voltage detector DET to be a voltage substantially equal to Vref.

Subsequently, when the switch SW2 is turned on at the timing of time $T_{11}$, an inverting input part of the voltage detector DET has the voltage V0 of the detection electrode E1, and after that, the voltage of the inverting input part of the voltage detector DET decreases to the reference voltage Vref in accordance with a time constant of the capacitance Cx1 (or Cx1+Cx2) of the detection electrode E1 and a capacitance C5 in the voltage detector DET. At this time, the electric charges stored in the capacitance Cx1 (or Cx1+Cx2) of the detection electrode E1 are transferred to the capacitance C5 in the voltage detector DET, and hence the output of the voltage detector DET increases (Vdet). When a finger or the like is not in proximity with the detection electrode E1, the output (Vdet) of the voltage detector DET exhibits the waveform $V_3$ indicated by solid line, and Vdet=Cx1×V0/C5 is established. When the capacitance due to the influence of a finger or the like is added, the output (Vdet) of the voltage detector DET exhibits the waveform $V_4$ indicated by dotted line, and Vdet=(Cx1+Cx2)×V0/C5 is established.

After that, the switch SW2 is turned off and the switch SW1 and the switch SW3 are turned on at the timing of time $T_{31}$ at which the electric charges of the capacitance Cx1 (or Cx1+Cx2) of the detection electrode E1 have been sufficiently transferred to the capacitance C5, thereby setting the potential of the detection electrode E1 to Low level, which is the same potential as the AC square wave Sg and resetting the voltage detector DET. The timing of turning on the switch SW1 may be any timing after the switch SW2 is turned off and before time $T_{02}$. The timing of resetting the voltage detector DET may be any timing after the switch SW2 is turned off and before time $T_{12}$. The operation described above is repeated at a predetermined frequency (for example, about several kHz to several hundreds of kHz). The presence/absence of a touch can be measured on the basis of the absolute value |ΔV| of the difference between the waveform $V_3$ and the waveform $V_4$. As illustrated in FIG. 5, the potential of the detection electrode E1 exhibits a waveform $V_1$ when a finger or the like is not in proximity, and exhibits a waveform $V_2$ when the capacitance Cx2 due to the influence of a finger or the like is added.

Figure 6:
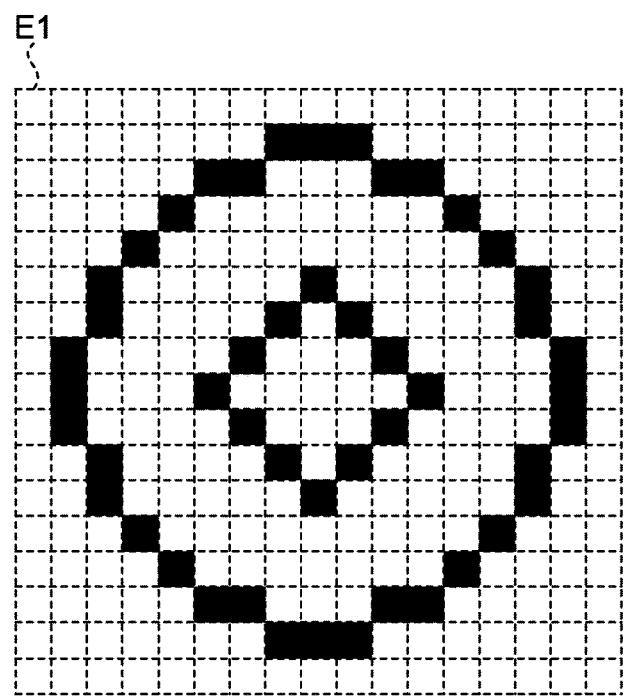
FIG. 6 is a schematic diagram illustrating a mechanism of the fingerprint detection by a detection unit.

FIG. 6 is a schematic diagram illustrating a mechanism of the fingerprint detection by the detection unit 40. The combining unit 46 combines detection signals Vdet from a plurality of detection electrodes E1 to generate two-dimensional information representing the shape of an object in touch with the detection electrodes E1. Specifically, for example, when an external object in proximity having unevenness on its surface (for example, a human finger) contacts the fingerprint detection unit 30 (refer to FIG. 1), a difference in detection intensity occurs in accordance with the unevenness because the distance between the object and the fingerprint detection unit 30 differs depending on the unevenness. The combining unit 46 generates a two-dimensional image representing the difference in detection intensity as color contrast (for example, grayscale). An output Vout of the detection unit 40 including the combining unit 46 is, for example, an output of the two-dimensional information described above.

For easy understanding, FIG. 6 exemplifies two-gradation detection representing only the presence/absence of a finger in contact or in proximity. In practice, detection results in each block can be represented as multi-gradation. In FIG. 6, the detected external object in proximity is an object having double-circular unevenness. In the case where an external object in proximity is a human finger, when the finger touches the fingerprint detection unit 30 with a fingerprint part, a fingerprint appears as two-dimensional information. The function of the combining unit 46 may be implemented in units other than the detection unit 40. For example, the output Vout of the detection unit 40 may be set to the output of the coordinate extraction unit 45, and an external configuration may generate two-dimensional information on the basis of the output Vout. The configuration related to the generation of two-dimensional information may be hardware such as a circuit, or may be implemented by what is called software processing.

Figure 7:
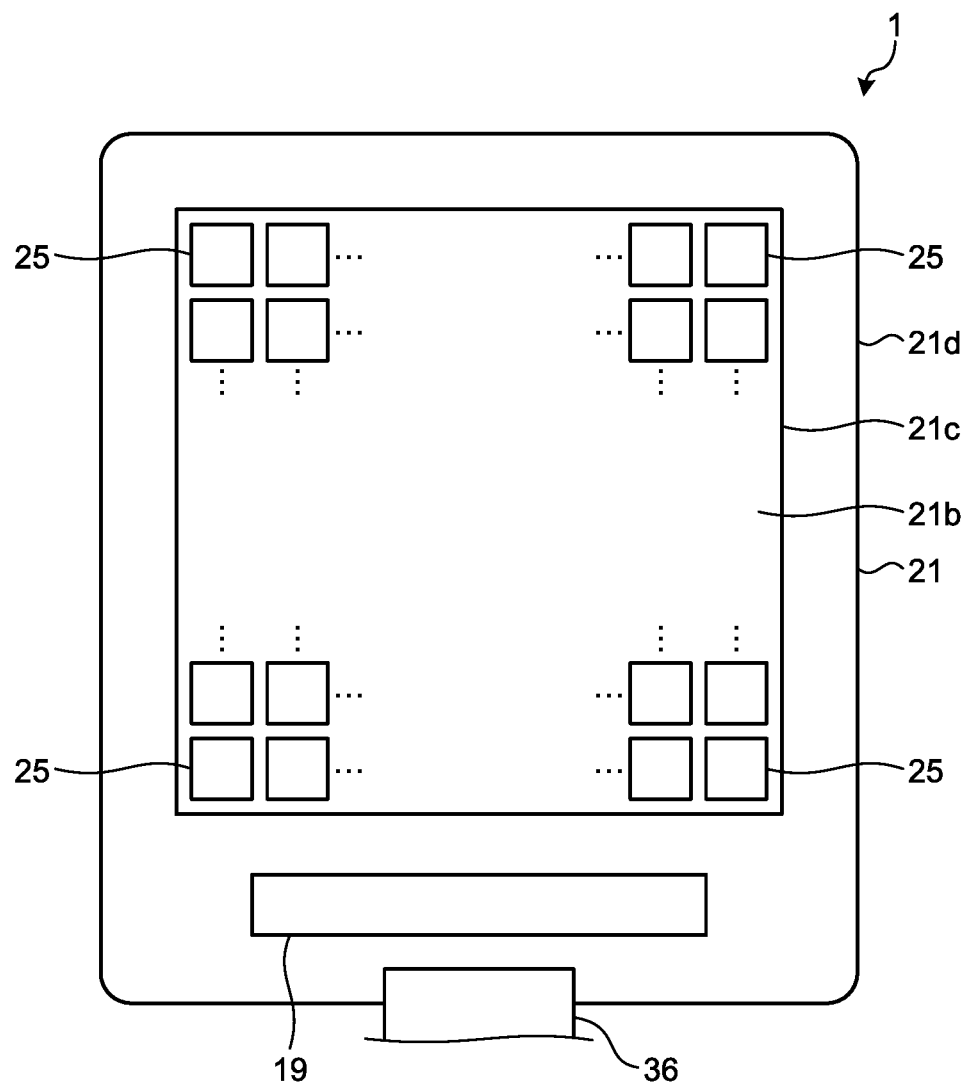
FIG. 7 is a plan view of the fingerprint detection device according to the first embodiment.
Figure 8:
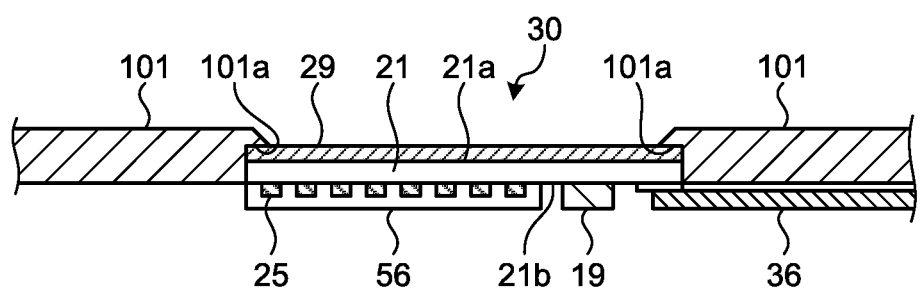
FIG. 8 is a sectional view illustrating a schematic sectional structure of the fingerprint detection device according to the first embodiment.

Next, a configuration example of the fingerprint detection device 1 is described in detail. FIG. 7 is a plan view of the fingerprint detection device according to the first embodiment. FIG. 8 is a sectional view illustrating a schematic sectional structure of the fingerprint detection device according to the first embodiment. FIG. 8 illustrates the section of the fingerprint detection device 1 that is incorporated into a casing 101 of an external electronic apparatus. The fingerprint detection device 1 is incorporated into an electronic apparatus including a display device (not illustrated) such as a liquid crystal display device, and is disposed on the rear surface side of a display surface of the liquid crystal display device on which an image is displayed. The fingerprint detection device 1 is incorporated in an opening part of the casing 101. When a finger is brought into contact with a portion where the fingerprint detection device 1 is provided, a fingerprint is detected. In the following, detecting surface unevenness of a human finger is hereinafter referred to as "fingerprint detection".

As illustrated in FIG. 7 and FIG. 8, the fingerprint detection device 1 includes a substrate 21 and a plurality of detection electrodes 25 provided on the substrate 21. The substrate 21 has a first surface 21a and a second surface 21b on the opposite side of the first surface 21a. The first surface 21a of the substrate 21 is a detection surface for detecting the unevenness of a finger in contact or in proximity with the first surface 21a. As illustrated in FIG. 8, the first surface 21a of the substrate 21 may be provided with a protective layer 29 for protecting the substrate 21, and the second surface 21b of the substrate 21 may be provided with a protective layer 56. A control IC 19 and a flexible substrate 36 are further provided on the second surface 21b of the substrate 21. The control IC 19 has mounted thereon the control unit 11 and the detection unit 40 illustrated in FIG. 1. The output Vout from the detection unit 40 is output to an external circuit through the flexible substrate 36. When the first surface 21a of the substrate 21 is covered with the protective layer 29, the surface of the protective layer 29 can be defined as a detection surface. In other words, in the fingerprint detection device 1, a surface that a finger directly contacts may be a detection surface. In the following, a fingerprint of a finger in contact with the detection surface is sometimes referred to simply as "fingerprint".

A glass substrate can be used as the substrate 21. For example, the use of toughened glass enables the substrate 21 to be thinned while the strength is maintained. Examples of toughened glass that can be used include, but are not limited to, chemically toughened glass in which a compressive stress layer is formed on the surface by exchanging sodium (Na) ions on the surface of glass with potassium (K) ions having larger ion radius, toughened glass in which a compressive stress layer is formed on the surface by supplying air to a heated glass substrate for quenching, for example. The substrate 21 may be six-sided toughened glass.

The detection electrodes 25 are provided on the second surface 21b of the substrate 21. As illustrated in FIG. 7, the detection electrodes 25 each have a rectangular shape and are arranged in a matrix pattern. For example, the detection electrodes 25 are arranged in the row direction with a pitch of 50 μm, and the detection electrodes 25 are arranged in the column direction with a pitch of 50 μm. The arrangement pitch in the row direction and the arrangement pitch in the column direction may be different from each other. The detection electrodes 25 arranged in a matrix pattern constitute the fingerprint detection unit 30. The detection electrode 25 corresponds to the detection electrode E1 in the fundamental principle of self-capacitance fingerprint detection described above, and is capable of detecting a fingerprint in contact with the detection surface on the basis of an electrostatic capacitance change in the detection electrode 25. A metal material such as molybdenum (Mo) can be used for the detection electrode 25. A metal material of at least one of aluminum (Al), copper (Cu), silver (Ag), or an alloy thereof may be used for the detection electrode 25.

The region where the detection electrodes 25 are arranged is a detection region 21c where a fingerprint can be detected, and the outside of the detection region 21c is a frame region 21d. The control IC 19 and the flexible substrate 36 are provided in the frame region 21d. The gate driver 12 and the detection electrode driver 14 may be further provided in the frame region 21d of the second surface 21b.

As illustrated in FIG. 8, the frame region 21d of the substrate 21 is fixed to a fixing part 101a of the casing 101 (refer to FIG. 8). The first surface 21a of the substrate 21 is exposed from the opening part in the casing 101. In this case, the detection region 21c is disposed to overlap with the opening part. When a finger of an operator contacts the detection surface exposed from the opening part, the fingerprint detection device 1 can detect a fingerprint. As described above, in the fingerprint detection device 1 according to the first embodiment, the first surface 21a is a detection surface, and the detection electrodes 25, the control IC 19, and the flexible substrate 36 are provided on the second surface 21b on the opposite side of the detection surface. Thus, the fixation of the substrate 21 to the casing 101 is less restricted by the bump of the control IC 19 and the flexible substrate 36. Specifically, the casing 101 is opposed to the flat plate-shaped first surface 21a side, which simplifies the structure around the opening part in the casing 101 to facilitate the processing of the casing 101 and the mounting of the fingerprint detection device 1 to the casing 101. The flexible substrate 36, the control IC 19, and other components are not placed on the first surface 21a side, but there is only a flat detection surface. Thus, a space for allowing the flexible substrate 36 to turn around or a space for placing the control IC 19 is not required to be formed between the substrate 21 and the casing 101, and the detection surface can be provided at a position that is closer to the outer surface of the casing 101 by the spaces. Consequently, the detection surface can be provided at a position that is closer to the outer surface of the casing 101 with respect to the inner surface of the casing 101, and the difference in bump between the outer surface of the casing 101 and the detection surface can be reduced. The control IC 19 and the flexible substrate 36 are provided on the second surface 21b, and hence no conductor such as a wire is present on the first surface 21a side with respect to the detection electrode 25. Consequently, detection errors and the deterioration in detection sensitivity can be suppressed.

Figure 9:
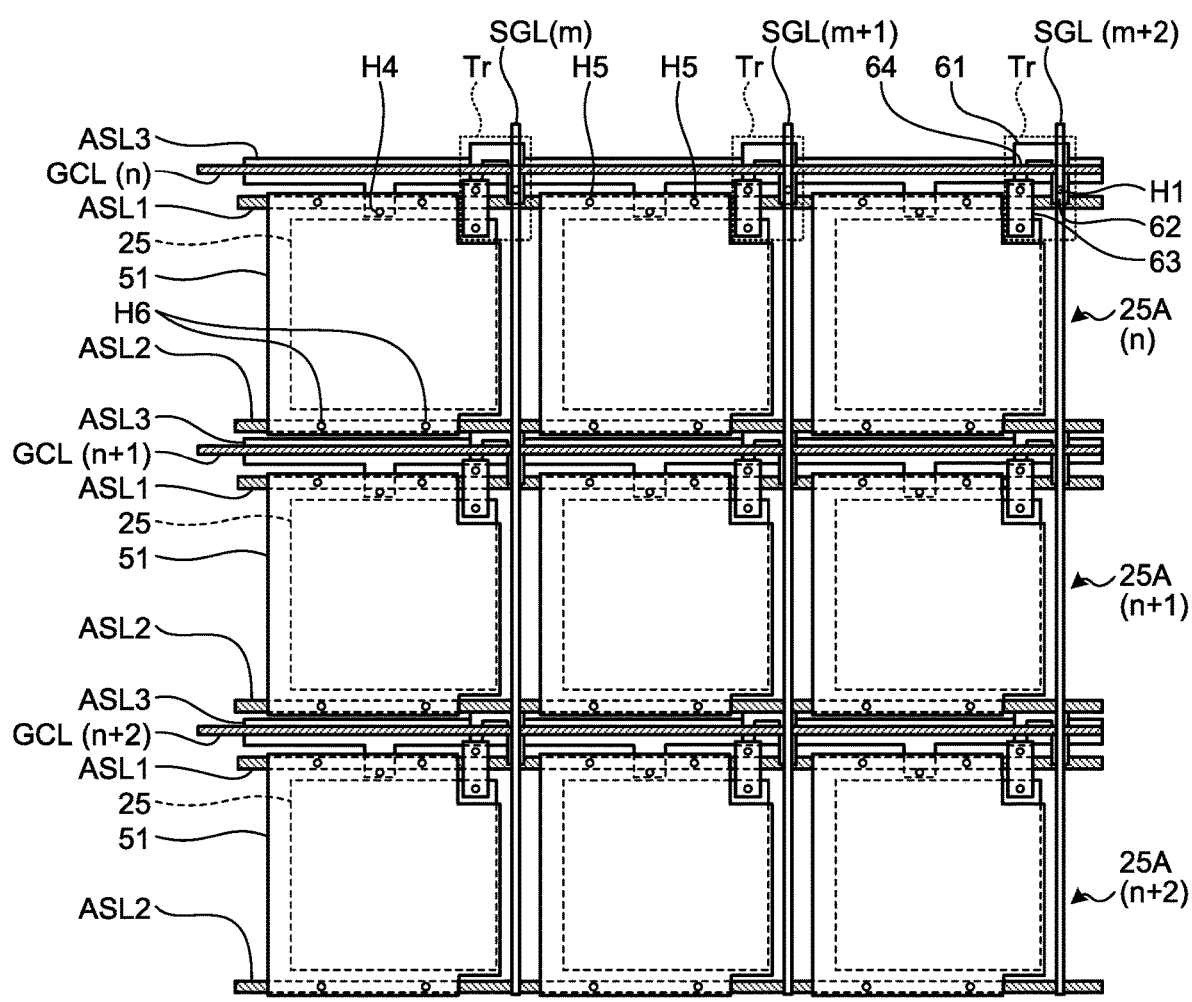
FIG. 9 is a plan view schematically illustrating the arrangement of detection electrodes and switching elements.

Next, the structure of the detection electrodes 25 is described in detail. FIG. 9 is a plan view schematically illustrating the arrangement of the detection electrodes and switching elements. As illustrated in FIG. 9, the detection electrodes 25, switching elements Tr, gate lines GCL, and data lines SGL are provided on the second surface 21b of the substrate 21. The gate lines GCL and the data lines SGL are wired so as to intersect with each other. The direction parallel to the direction in which the gate lines GCL extend is the row direction, and the direction parallel to the direction in which the data lines SGL extend is the column direction. The gate line GCL is provided along the row direction, and the gate lines GCL are arranged in the column direction. The data line SGL is provided along the column direction, and the data lines SGL are arranged in the row direction. Each detection electrode 25 is disposed in a region surrounded by the gate lines GCL and the data lines SGL. The detection electrodes 25 each have a rectangular shape, but without being limited thereto, the detection electrodes 25 may have another shape such as a rhombic shape and a polygonal shape.

Each of the switching elements Tr is provided near the position at which the gate line GCL and the data line SGL intersect with each other. The switching element Tr is disposed to correspond to each detection electrode 25. The switching element Tr is formed of a thin film transistor. In the present example, the switching element Tr is formed of an n-channel metal oxide semiconductor (MOS) thin film transistor (TFT).

The gate driver 12 illustrated in FIG. 1 sequentially selects the gate lines GCL. The gate driver 12 supplies the scanning signal Vscan to the switching element Tr through the selected gate line GCL. In this manner, the gate driver 12 selects one line (one horizontal line) of the detection electrodes 25 as a detection electrode block 25A to be detected. The detection electrode block 25A includes a plurality of detection electrodes 25 arranged in the row direction. The detection electrode driver 14 supplies the drive signal Vf to each detection electrode 25 in the detection electrode block 25A through the data line SGL. The detection unit 40 receives a detection signal Vdet corresponding to an electrostatic capacitance change in each detection electrode 25 in accordance with the fundamental principle of self-capacitance fingerprint detection described above. In this manner, a fingerprint of a finger in touch with the detection surface is detected.

As illustrated in FIG. 9, a conductive layer 51 is provided so as to cover the detection electrode 25. The gate line GCL is provided along one side of the detection electrode 25, and a conductive first wire ASL1 is provided between the gate line GCL and the one side of the detection electrode 25. A second wire ASL2 is provided on the opposite side of the first wire ASL1 across the detection electrode 25. The first wire ASL1 and the second wire ASL2 are provided along the gate lines GCL. The first wire ASL1 and the second wire ASL2 are provided to correspond to the detection electrode block 25A, and are continuous in adjacent to the detection electrodes 25. A third wire ASL3 is further provided along the first wire ASL1 and the second wire ASL2. The third wire ASL3 is provided along the gate line GCL so as to overlap with the gate line GCL.

Aluminum (Al) or an aluminum alloy is used for the gate line GCL and the data line SGL. A metal material such as molybdenum (Mo) can be used for the conductive layer 51, the first wire ASL1, the second wire ASL2, and the third wire ASL3. A metal material of at least one of aluminum (Al), copper (Cu), silver (Ag), or an alloy thereof may also be used.

As described above, the gate line GCL is supplied with the signal (scanning signal Vscan) different from the signal supplied to the data line SGL and the detection electrode 25. Thus, a parasitic capacitance between the gate line GCL and the detection electrode 25 and a parasitic capacitance between the gate line GCL and the data line SGL can increase. When the parasitic capacitance increases, the electrostatic capacitance change caused by a finger in contact or in proximity is relatively reduced, and detection sensitivity can deteriorate.

In the first embodiment, the detection electrode driver 14 supplies the conductive layer 51, the first wire ASL1, the second wire ASL2, and the third wire ASL3 with a signal Vsg1 that is synchronized with the drive signal Vf and has the same waveform as the drive signal Vf. Thus, the parasitic capacitance between the detection electrode 25 and the gate line GCL is reduced. Consequently, detection errors and the deterioration in detection sensitivity are suppressed. A drive circuit that is not provided in the detection electrode driver 14 may be provided as appropriate to supply the signal Vsg1.

Figure 10:
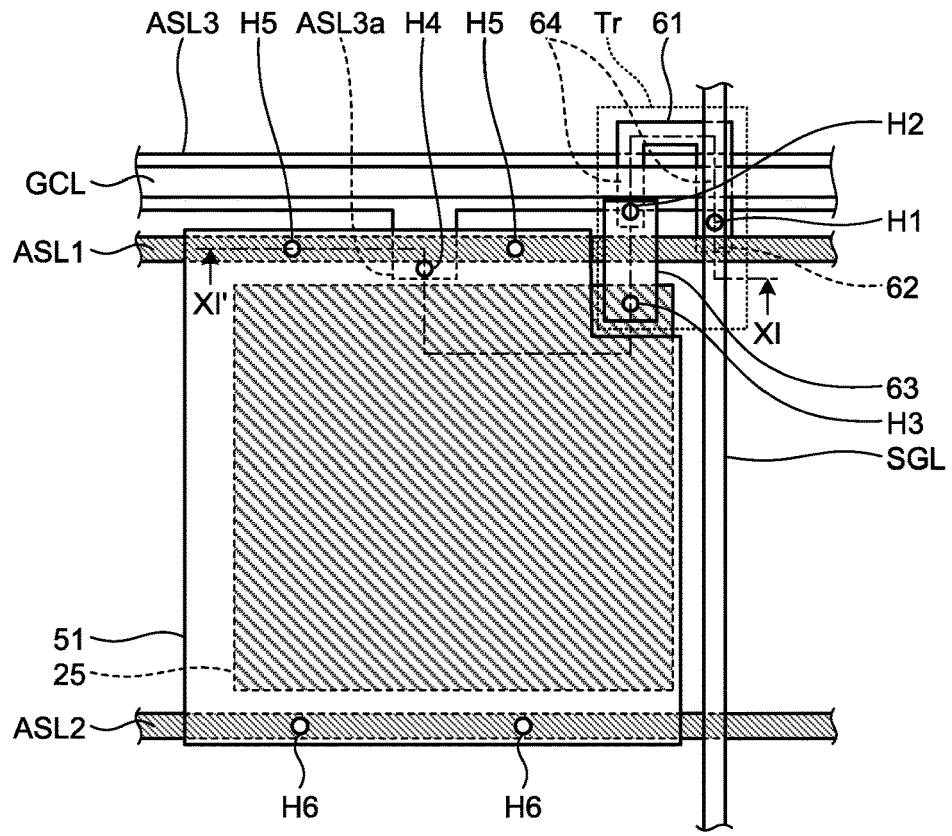
FIG. 10 is an enlarged plan view of the detection electrode.
Figure 11:
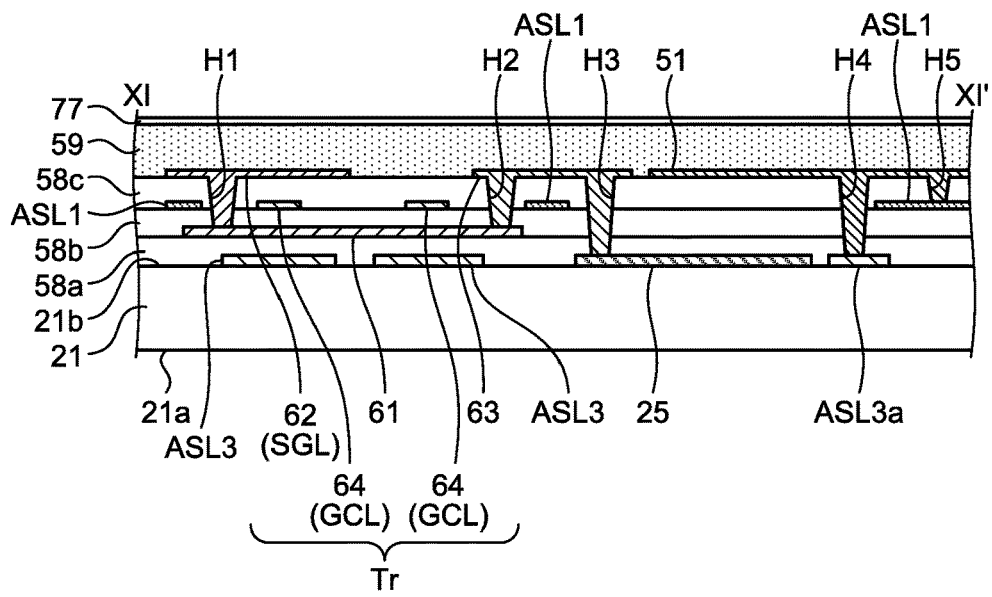
FIG. 11 is a sectional view taken along the line XI-XI' in FIG. 10.

Next, the configuration of the detection electrode 25, each wire, and the conductive layer is described in detail. FIG. 10 is an enlarged plan view of the detection electrode. FIG. 11 is a sectional view taken along the line XI-XI' in FIG. 10. In FIG. 11, the up-down direction is opposite from that in FIG. 8, that is, the first surface 21a of the substrate 21, which is formed as the detection surface, is illustrated as facing downward.

As illustrated in FIG. 10 and FIG. 11, the switching element Tr includes a semiconductor layer 61, a source electrode 62, a drain electrode 63, and a gate electrode 64. As the material for the semiconductor layer 61, a well-known material such as polysilicon and oxide semiconductor can be used.

The semiconductor layer 61 is electrically coupled to the data line SGL via a contact hole H1. A part of the data line SGL that overlaps with the semiconductor layer 61 functions as the source electrode 62. The semiconductor layer 61 is bent so as to intersect with the gate line GCL a plurality of times in a plan view. A part of the gate line GCL that overlaps with the semiconductor layer 61 functions as the gate electrode 64. The semiconductor layer 61 is electrically coupled to the drain electrode 63 via a contact hole H2. The drain electrode 63 is provided to extend from the side of the gate line GCL to the position overlapping with the detection electrode 25 while intersecting with the first wire ASL1. The drain electrode 63 is electrically coupled to the detection electrode 25 via a contact hole H3 at the position overlapping with the detection electrode 25.

As illustrated in FIG. 11, the third wire ASL3 and the detection electrode 25 are provided on the second surface 21b of the substrate 21. An insulating layer 58a is provided on the third wire ASL3 and the detection electrode 25. The semiconductor layer 61 is provided on the insulating layer 58a. An insulating layer 58b is provided on the semiconductor layer 61, and the gate line GCL and the first wire ASL1 are provided on the insulating layer 58b. An insulating layer 58c is provided on the gate line GCL and the first wire ASL1, and the drain electrode 63, the data line SGL, and the conductive layer 51 are provided on the insulating layer 58c. A planarization layer 59 is provided on the drain electrode 63, the data line SGL, and the conductive layer 51, and a protective layer 77 is provided on the planarization layer 59. The second wire ASL2 (not illustrated in FIG. 11) is provided in the same layer as the gate line GCL and the first wire ASL1. Although omitted in FIG. 11, when the protective layer 29 (refer to FIG. 8) is provided, a fingerprint of a finger in contact with the protective layer 29 is detected by the fingerprint detection device 1.

In the first embodiment, the detection electrode 25 is provided closer to the second surface 21b of the substrate 21 than the gate line GCL is. The insulating layers 58a and 58b are provided between the detection electrode 25 and the gate line GCL. In other words, the detection electrode 25 is closer to the first surface 21a serving as the detection surface than the switching element Tr is. Only the substrate 21 or the substrate 21 and the protective layer 29 are provided between the detection electrode 25 and the detection surface. Thus, no conductor such as wire is present on the first surface 21a side with respect to the detection electrode 25, and the distance between a finger in contact with the detection surface and the detection electrode 25 is reduced. Consequently, the deterioration in detection sensitivity can be suppressed.

As illustrated in FIG. 10, the third wire ASL3 is provided with a tab portion ASL3a at the position overlapping with the conductive layer 51. The tab portion ASL3a intersects with the first wire ASL1, and is disposed with a gap from the detection electrode 25. The tab portion ASL3a is electrically coupled to the conductive layer 51 via a contact hole H4. The conductive layer 51 is provided to overlap with the detection electrode 25 and the first wire ASL1, and is electrically coupled to the first wire ASL1 via contact holes H5. In the example illustrated in FIG. 10, two contact holes H5 are provided, but the number of the contact holes H5 may be one or three or more.

The conductive layer 51 is provided to overlap with the second wire ASL2, and is electrically coupled to the second wire ASL2 via contact holes H6.

In this manner, the first wire ASL1, the second wire ASL2, the third wire ASL3, and the conductive layer 51 are electrically coupled to one another. Thus, when a potential is applied to any one of the first wire ASL1, the second wire ASL2, the third wire ASL3, and the conductive layer 51, all the remaining ones can be set to have the same potential. The increase in parasitic capacitances between the first wire ASL1, the second wire ASL2, the third wire ASL3, and the conductive layer 51 is suppressed.

The first wire ASL1 is provided between the gate line GCL and the detection electrode 25 along one side of the detection electrode 25. The first wire ASL1 is provided in the same layer as the gate line GCL. Thus, the parasitic capacitance between the detection electrode 25 and the gate line GCL can be reduced. The third wire ASL3 is provided to overlap with the gate line GCL. The conductive layer 51 is provided to overlap with the detection electrode 25 except for a part where the detection electrode 25 and the drain electrode 63 are coupled to each other. This arrangement enables the parasitic capacitance between the detection electrode 25 and the gate line GCL to be further reduced. The third wire ASL3 has a width larger than the width of the gate line GCL. Without being limited thereto, the third wire ASL3 may have the same width as that of the gate line GCL or a width smaller than that of the gate line GCL.

The semiconductor layer 61 is provided with a channel portion in a region overlapping with the gate electrode 64. It is preferred that the third wire ASL3 be provided at the position overlapping with the channel portion and have an area larger than that of the channel portion. The above-mentioned metal material is used for the third wire ASL3, and the third wire ASL3 has a light transmittance smaller than that of the substrate 21. In the first embodiment, the third wire ASL3 is provided, and hence light entering the semiconductor layer 61 from the first surface 21a side is blocked.

The planarization layer 59 illustrated in FIG. 11 is, for example, an organic planarization film. For the protective layer 77 provided on the planarization layer 59, for example, a translucent conductive material such as indium tin oxide (ITO) or an inorganic material such as silicon oxide ($SiO_2$) is used. In this manner, the entry of moisture into the planarization layer 59 can be suppressed to suppress the occurrence of corrosion of the detection electrode 25, the first wire ASL1, the second wire ASL2, the third wire ASL3, and the conductive layer 51. The protective layer 77, which uses the conductive material such as ITO, functions as a shield configured to block electromagnetic noise such as static electricity that enters from the outside.

Figure 12:
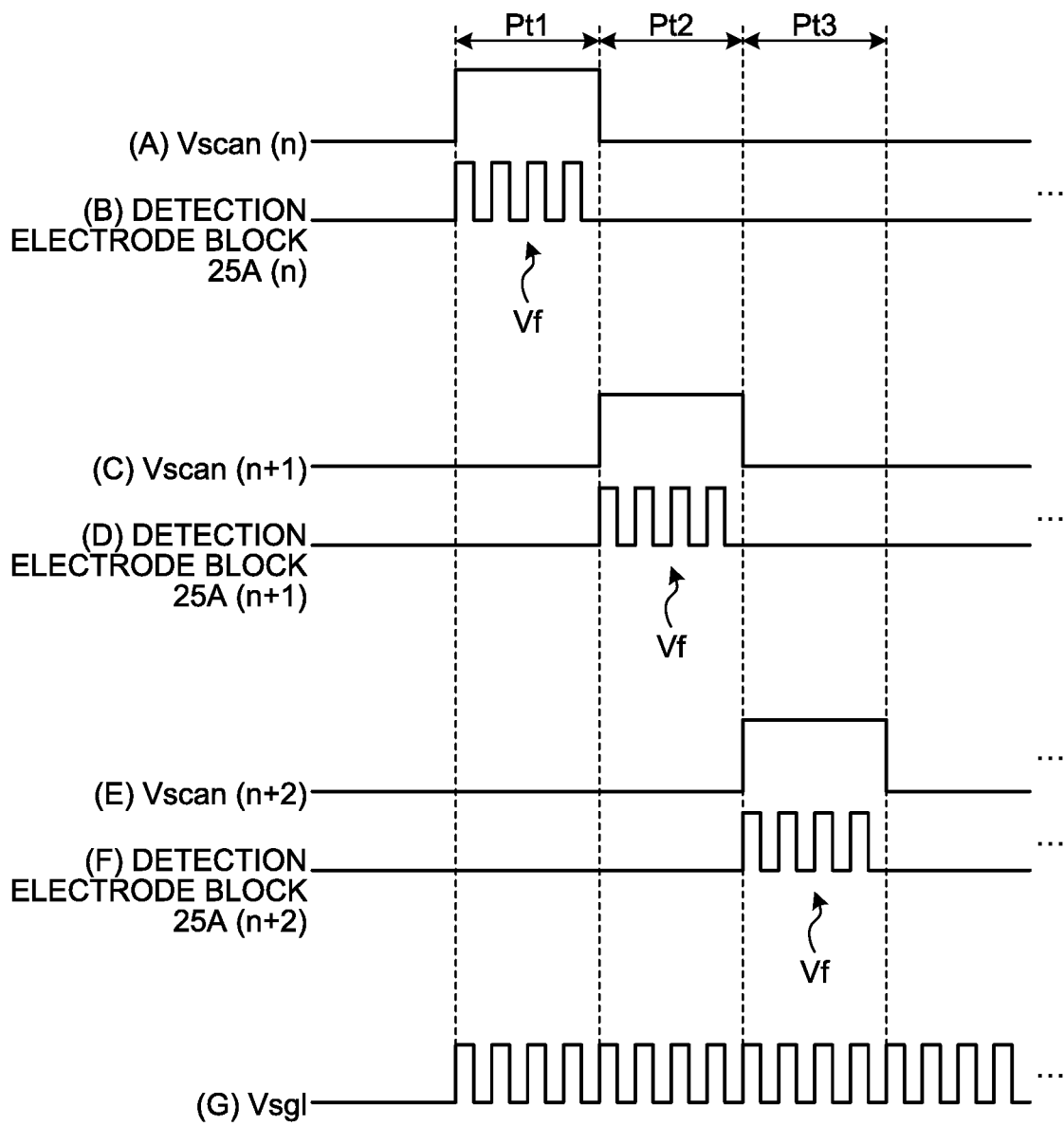
FIG. 12 is a timing waveform diagram of the fingerprint detection device according to the first embodiment.

Next, a drive method for the fingerprint detection device according to the first embodiment is described. FIG. 12 is a timing waveform diagram of the fingerprint detection device according to the first embodiment.

As illustrated in FIG. 12, in a detection period Pt1, the n-th gate line GCL(n) (refer to FIG. 9) is selected, and a scanning signal Vscan(n) is turned on (High level). Switching elements Tr corresponding to a detection electrode block 25A(n) in the n-th row are turned on (open). Accordingly, a drive signal Vf is supplied to the respective detection electrodes 25 in the detection electrode block 25A(n) through data lines SGL(m), SGL(m+1), and SGL(m+2). A detection signal Vdet is output to the detection unit 40 (refer to FIG. 1) from each detection electrode 25 in the detection electrode block 25A(n) on the basis of the fundamental principle of self-capacitance fingerprint detection described above.

In the detection period Pt1, scanning signals Vscan for gate lines GCL(n+1) and GCL(n+2) other than the gate line GCL(n) are off (Low level), and each detection electrode 25 in a detection electrode block 25A(n+1) and a detection electrode block 25A(n+2) is in the floating state in which a fixed potential is not supplied. Thus, parasitic capacitances between the detection electrode 25 in the detection electrode block 25A(n) selected as a detection target and the detection electrode 25 in the unselected detection electrode block 25A(n+1) and between the detection electrode 25 in the detection electrode block 25A(n) and the detection electrode 25 in the unselected detection electrode block 25A(n+2) can be suppressed. In the detection period Pt1, the first wire ASL1, the second wire ASL2, the third wire ASL3, and the conductive layer 51 are supplied with a signal Vsg1. Thus, the parasitic capacitance between each detection electrode 25 in the detection electrode block 25A(n) selected as a detection target and the gate line GCL is suppressed to suppress the deterioration in detection sensitivity.

Next, in a detection period Pt2, the gate line GCL(n+1) in the (n+1)th row is selected, and a scanning signal Vscan(n+1) is turned on (High level). Switching elements Tr in the detection electrode block 25A(n+1) in the (n+1)th row are turned on (open). Accordingly, the drive signal Vf is supplied to the respective detection electrodes 25 in the detection electrode block 25A(n+1) through the data lines SGL (m), SGL(m+1), and SGL(m+2), and the detection signal Vdet is output to the detection unit 40 (refer to FIG. 1) from each detection electrode 25 in the detection electrode block 25A(n+1).

In the detection period Pt2, each detection electrode 25 in the detection electrode block 25A(n) and the detection electrode block 25A(n+2) is in the floating state in which a fixed potential is not supplied. The first wire ASL1, the second wire ASL2, the third wire ASL3, and the conductive layer 51 are supplied with the signal Vsg1.

In a detection period Pt3, the gate line GCL(n+2) in the (n+2)th row is selected, and a scanning signal Vscan(n+2) is turned on (High level). Switching elements Tr in the detection electrode block 25A(n+2) in the (n+2)th row are turned on (open). Accordingly, the drive signal Vf is supplied to the respective detection electrodes 25 in the detection electrode block 25A(n+2) through the data lines SGL(m), SGL(m+1), and SGL(m+2), and the detection signal Vdet is output to the detection unit 40 (refer to FIG. 1) from each detection electrode 25 in the detection electrode block 25A(n+2). This operation is sequentially repeated to carry out the detection operation in the entire detection region 21c.

As described above, the fingerprint detection device 1 according to the first embodiment includes: the substrate 21 having the first surface 21a and the second surface 21b on the opposite side of the first surface 21a; the first surface 21a serving as a detection surface for detecting unevenness of an object in contact or in proximity; the detection electrode 25 provided on the second surface 21b side of the substrate 21, for detecting unevenness of a finger in contact or in proximity on the basis of an electrostatic capacitance change; and the drive circuit provided on the second surface 21b side of the substrate 21, for supplying a drive signal to the detection electrode 25.

The detection electrode 25, the switching element Tr, the control IC 19, and the flexible substrate 36 are provided on the second surface 21b on the opposite side of the detection surface. Thus, the fixation of the substrate 21 to the casing 101 of the electronic apparatus is less restricted by the bump of the control IC 19, the flexible substrate 36, and other components. Specifically, the structure of the casing 101 to which the first surface 21a side of the substrate 21 is to be fixed can be simplified to facilitate processing. No conductor such as the gate line GCL and the data line SGL is present on the first surface 21a side with respect to the detection electrode 25, and hence detection errors and the reduction in detection sensitivity can be suppressed.

Second Embodiment

Figure 13:
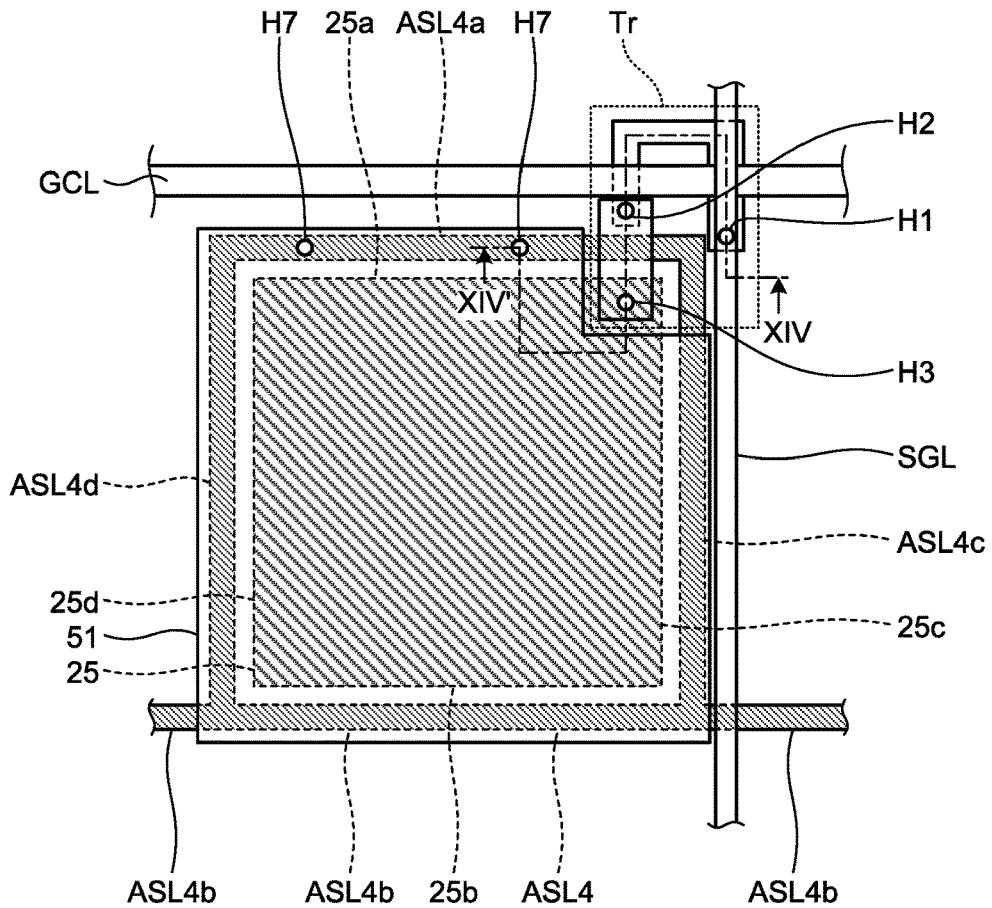
FIG. 13 is an enlarged plan view of a detection electrode according to a second embodiment.
Figure 14:
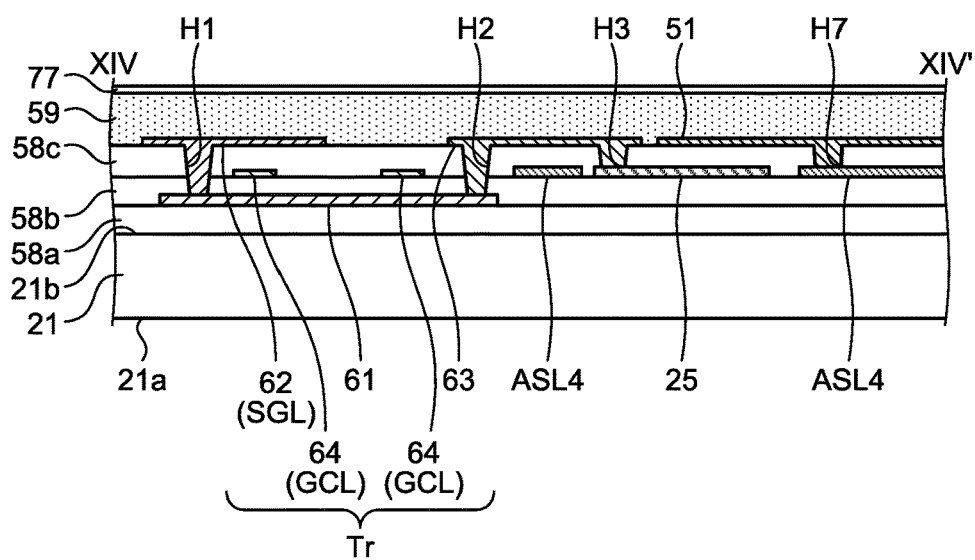
FIG. 14 is a sectional view taken along the line XIV-XIV' in FIG. 13.

FIG. 13 is an enlarged plan view of a detection electrode according to a second embodiment. FIG. 14 is a sectional view taken along the line XIV-XIV' in FIG. 13.

In the second embodiment, the first wire ASL1, the second wire ASL2, and the third wire ASL3 are not provided, but a fourth wire ASL4 that surrounds the detection electrode 25 is provided. As illustrated in FIG. 13, the fourth wire ASL4 includes a first part ASL4a, a second part ASL4b, a third part ASL4c, and a fourth part ASL4d. The gate line GCL is provided along a side 25a of the detection electrode 25, and the first part ASL4a is provided between the side 25a of the detection electrode 25 and the gate line GCL along the side 25a of the detection electrode 25 and the gate line GCL. The second part ASL4b is provided on the opposite side of the first part ASL4a across the detection electrode 25, and is provided along a side 25b of the detection electrode 25. The third part ASL4c is provided between the detection electrode 25 and the data line SGL, and is provided along a side 25c of the detection electrode 25. The fourth part ASL4d is provided on the opposite side of the third part ASL4c across the detection electrode 25, and is provided along a side 25d of the detection electrode 25. Although not illustrated in FIG. 13, another gate line GCL is provided on the opposite side of the gate line GCL across the detection electrode 25 (refer to FIG. 9), and the second part ASL4b is provided between the gate line GCL and the detection electrode 25.

The first part ASL4a and the second part ASL4b, which are provided across the detection electrode 25, are coupled to each other by the third part ASL4c and the fourth part ASL4d. In this manner, the fourth wire ASL4 has a frame shape that surrounds the detection electrode 25. As illustrated in FIG. 13 and FIG. 14, the fourth wire ASL4 is electrically coupled to the conductive layer 51 via contact holes H7. FIG. 13 illustrates only one detection electrode 25, but the conductive layer 51 and the fourth wire ASL4 are provided for each of the detection electrodes 25 arranged in a matrix pattern. As illustrated in FIG. 13, the second part ASL4b extends to the outer side of connection portions with the third part ASL4c and the fourth part ASL4d in the row direction, and is continuous correspondingly to the detection electrodes 25 arranged in the row direction. The fourth wires ASL4 arranged in the row direction are electrically coupled to one another by the second part ASL4b. The above-mentioned signal Vsg1 is supplied through the second part ASL4b to the fourth wires ASL4 and conductive layers 51 arranged in the row direction. The structure for coupling the fourth wires ASL4 together is not limited thereto. For example, the first part ASL4a may be extended, or a wire that connects the fourth wires ASL4 together may be coupled to the third part ASL4c and the fourth part ASL4d.

As illustrated in FIG. 14, the detection electrode 25 is provided in the same layer as the gate line GCL. The fourth wire ASL4 is provided in the same layer as the detection electrode 25 and the gate line GCL. Specifically, the insulating layer 58a is provided on the second surface 21b of the substrate 21, and the semiconductor layer 61 is provided on the insulating layer 58a. The insulating layer 58b is provided on the semiconductor layer 61, and the gate line GCL, the detection electrode 25, and the fourth wire ASL4 are provided on the insulating layer 58b. The insulating layer 58c is provided on the gate line GCL, the detection electrode 25, and the fourth wire ASL4, and the data line SGL, the drain electrode 63, and the conductive layer 51 are provided on the insulating layer 58c.

The fourth wire ASL4 is provided to surround the periphery of the detection electrode 25. The fourth wire ASL4 and the conductive layer 51 are electrically coupled to each other. Thus, the detection electrode 25 is surrounded by the fourth wire ASL4 and the conductive layer 51 except for a surface opposed to the detection surface. When the signal Vsg1 is supplied to the fourth wire ASL4, the signal Vsg1 is supplied to the fourth wire ASL4 and the conductive layer 51. Consequently, the parasitic capacitance between the detection electrode 25 and the gate line GCL can be further reduced.

The fourth wire ASL4 and the detection electrode 25 are provided in the same layer, and hence the wire forming step corresponding to one layer can be omitted as compared with the first embodiment. In this manner, the manufacturing process can be simplified to reduce the manufacturing cost.

Figure 15:
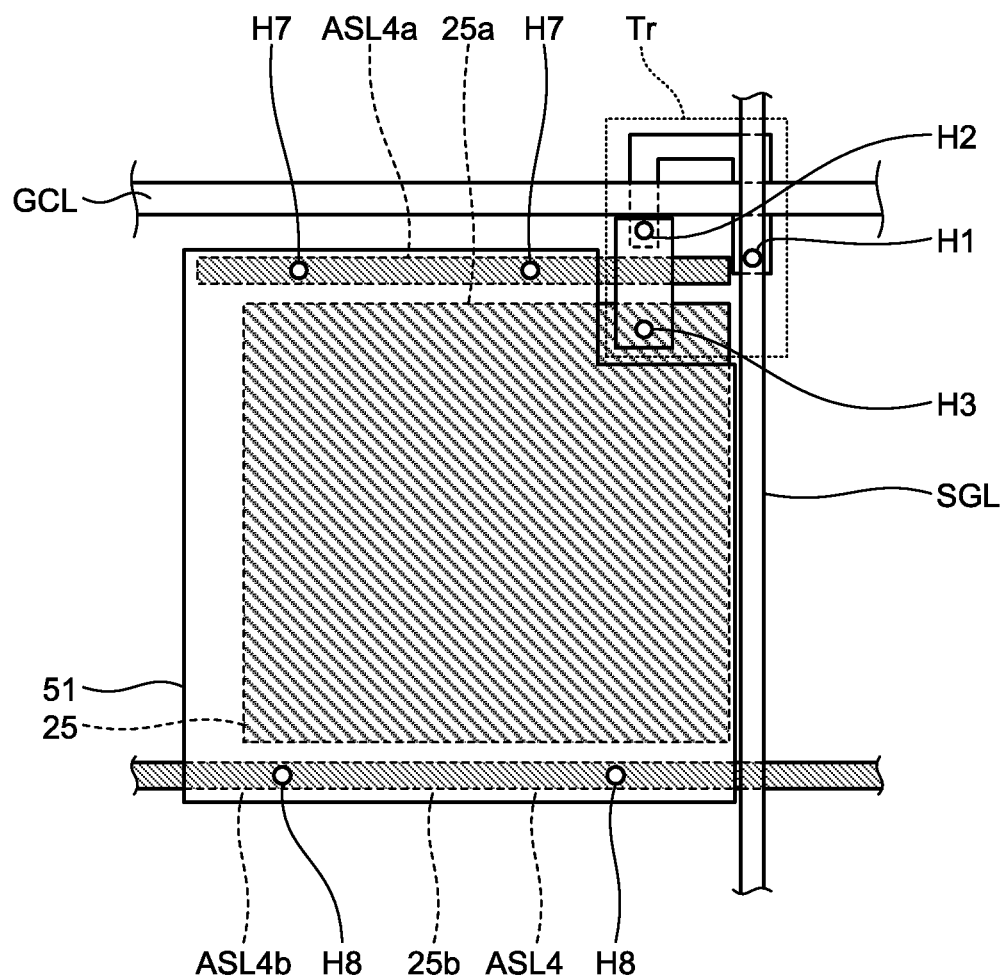
FIG. 15 is an enlarged plan view of a detection electrode according to a modification of the second embodiment.

FIG. 15 is an enlarged plan view of a detection electrode according to a modification of the second embodiment. As illustrated in FIG. 15, in the present modification, the first part ASL4a and the second part ASL4b of the fourth wire ASL4 are provided, but the third part ASL4c and the fourth part ASL4d are not provided. The first part ASL4a is provided between the detection electrode 25 and the gate line GCL along the side 25a of the detection electrode 25. The second part ASL4b is provided between the detection electrode 25 and another gate line GCL (not illustrated) along the side 25b of the detection electrode 25 on the opposite side of the side 25a. The second part ASL4b is continuous correspondingly to the detection electrodes 25 arranged in the row direction. The first part ASL4a is electrically coupled to the conductive layer 51 via the contact holes H7. The second part ASL4b is electrically coupled to the conductive layer 51 via contact holes H8. Accordingly, the signal Vsg1 is supplied through the second part ASL4b to the conductive layers 51 and first parts ASL4a arranged in the row direction.

By providing the fourth wire ASL4 at least between the detection electrode 25 and the gate line GCL in this manner, the parasitic capacitance between the detection electrode 25 and the gate line GCL can be reduced.

The fourth wire ASL4 may be configured such that the first part ASL4a, the second part ASL4b, and the third part ASL4c illustrated in FIG. 13 are provided and the fourth part ASL4d is omitted.

Third Embodiment

Figure 16:
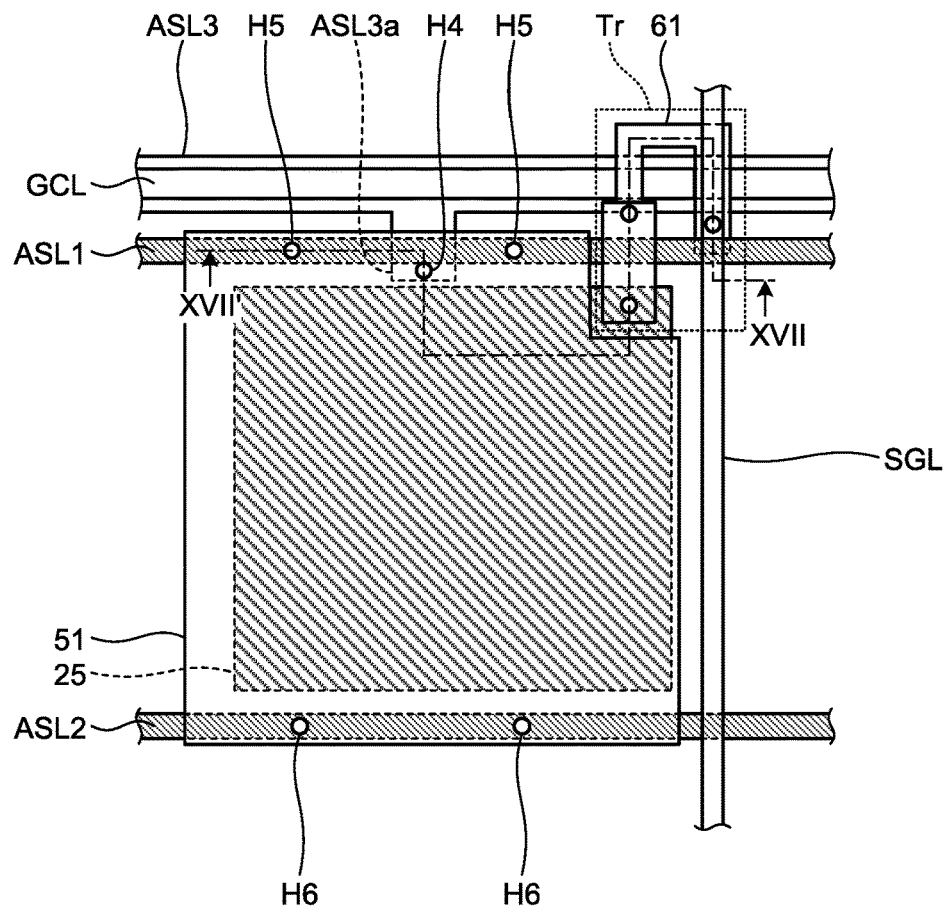
FIG. 16 is an enlarged plan view of a detection electrode according to a third embodiment.
Figure 17:
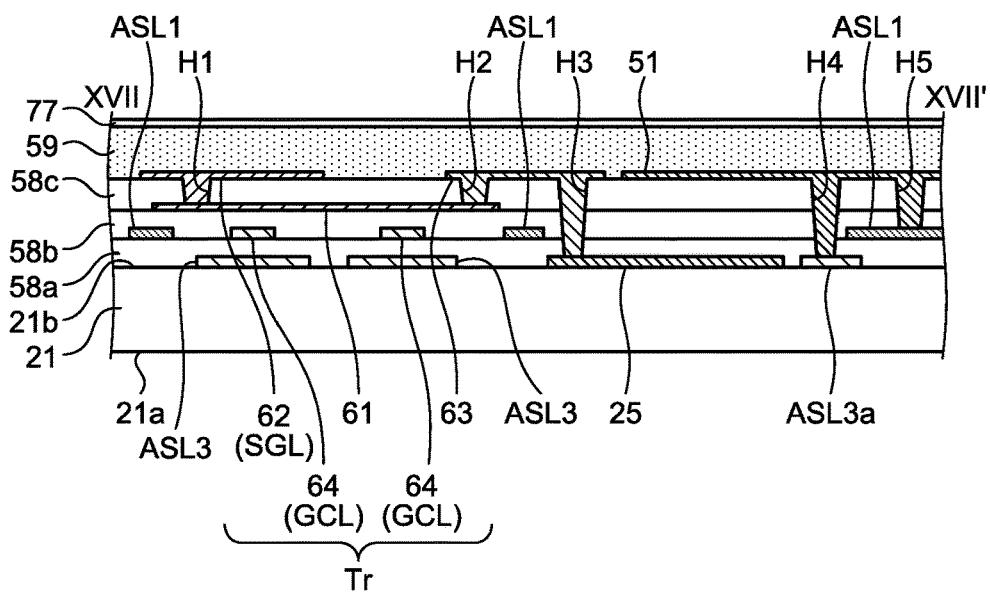
FIG. 17 is a sectional view taken along the line XVII-XVII' in FIG. 16.

FIG. 16 is an enlarged plan view of a detection electrode according to a third embodiment. FIG. 17 is a sectional view taken along the line XVII-XVII' in FIG. 16.

In the third embodiment, similarly to the first embodiment, the first wire ASL1, the second wire ASL2, the third wire ASL3, and the conductive layer 51 are provided. As illustrated in FIG. 17, the third embodiment is different from the first embodiment in employing what is called a bottom gate structure in which the gate electrode 64 (gate line GCL) is provided closer to the substrate 21 than the semiconductor layer 61 is.

As illustrated in FIG. 17, the third wire ASL3 and the detection electrode 25 are provided on the second surface 21b of the substrate 21. The insulating layer 58a is provided on the third wire ASL3 and the detection electrode 25. The gate line GCL and the first wire ASL1 are provided on the insulating layer 58a. The insulating layer 58b is provided on the gate line GCL and the first wire ASL1, and the semiconductor layer 61 is provided on the insulating layer 58b. The insulating layer 58c is provided on the semiconductor layer 61, and the drain electrode 63, the data line SGL, and the conductive layer 51 are provided on the insulating layer 58c. The planarization layer 59 is provided on the drain electrode 63, the data line SGL, and the conductive layer 51, and the protective layer 77 is provided on the planarization layer 59. The second wire ASL2 (not illustrated in FIG. 17) is provided in the same layer as the gate line GCL and the first wire ASL1.

In the third embodiment, the detection electrode 25 is provided closer to the second surface 21b of the substrate 21 than the gate line GCL is. The insulating layer 58a is provided between the detection electrode 25 and the gate line GCL. In other words, the detection electrode 25 is closer to the first surface 21a serving as the detection surface than the switching element Tr is. Only the substrate 21 or the substrate 21 and the protective layer 29 are provided between the detection electrode 25 and the detection surface. Thus, no conductor such as a wire is present on the first surface 21a side with respect to the detection electrode 25, and the distance between a finger in contact with the detection surface and the detection electrode 25 is reduced. Consequently, the deterioration in detection sensitivity can be suppressed.

The gate line GCL is disposed closer to the substrate 21 than the semiconductor layer 61 is, and hence the distance between the third wire ASL3 and the gate line GCL is reduced. Thus, the parasitic capacitance between the gate line GCL and the detection electrode 25 is reduced.

Fourth Embodiment

Figure 18:
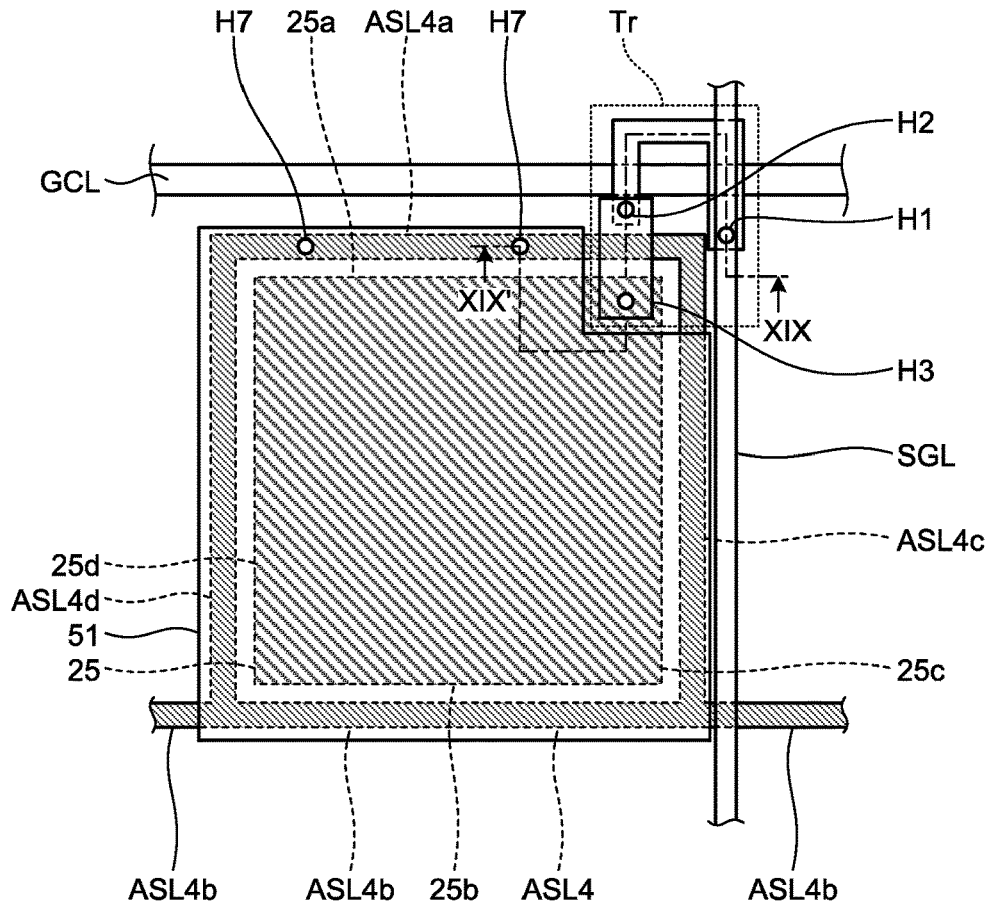
FIG. 18 is an enlarged plan view of a detection electrode according to a fourth embodiment.
Figure 19:
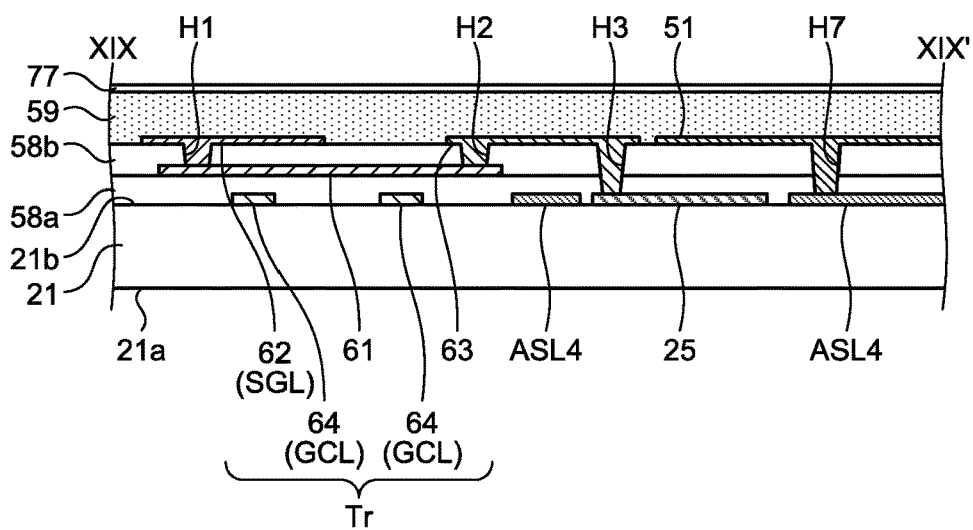
FIG. 19 is a sectional view taken along the line XIX-XIX' in FIG. 18.

FIG. 18 is an enlarged plan view of a detection electrode according to a fourth embodiment. FIG. 19 is a sectional view taken along the line XIX-XIX' in FIG. 18. In the fourth embodiment, similarly to the second embodiment, the first wire ASL1, the second wire ASL2, and the third wire ASL3 are not provided, but the fourth wire ASL4 that surrounds the detection electrode 25 is provided. As illustrated in FIG. 19, the fourth embodiment employs what is called a bottom gate structure in which the gate electrode 64 (gate line GCL) is provided closer to the substrate 21 than the semiconductor layer 61 is.

As illustrated in FIG. 19, the gate line GCL, the fourth wire ASL4, and the detection electrode 25 are provided on the second surface 21b of the substrate 21. The insulating layer 58a is provided on the gate line GCL, the fourth wire ASL4, and the detection electrode 25. The semiconductor layer 61 is provided on the insulating layer 58a. The insulating layer 58b is provided on the semiconductor layer 61, and the drain electrode 63, the data line SGL, and the conductive layer 51 are provided on the insulating layer 58b. The planarization layer 59 is provided on the drain electrode 63, the data line SGL, and the conductive layer 51, and the protective layer 77 is provided on the planarization layer 59.

In the fourth embodiment, the detection electrode 25 is provided on the second surface 21b of the substrate 21 in the same layer as the gate line GCL. Thus, the detection electrode 25 is disposed at the position close to the first surface 21a serving as the detection surface, and hence the distance between a finger in contact or in proximity and the detection electrode 25 can be reduced to suppress the deterioration in detection sensitivity.

As illustrated in FIG. 18, the second part ASL4b extends to the outer side of connection portions with the third part ASL4c and the fourth part ASL4d in the row direction, and is continuous correspondingly to the detection electrodes 25 arranged in the row direction. The fourth wires ASL4 arranged in the row direction are electrically coupled to one another by the second part ASL4b. The above-mentioned signal Vsg1 is supplied through the second part ASL4b to the fourth wires ASL4 and conductive layers 51 arranged in the row direction. The fourth wire ASL4 is provided to surround the detection electrode 25, and hence the parasitic capacitance between the detection electrode 25 and the gate line GCL can be reduced. The gate line GCL, the fourth wire ASL4, and the detection electrode 25 are provided in the same layer, and hence the number of laminated layers can be reduced to simplify the manufacturing process.

In the fourth embodiment, for example, the fourth wire ASL4 may be configured such that the first part ASL4a and the second part ASL4b illustrated in FIG. 18 are provided but the third part ASL4c and the fourth part ASL4d are omitted. The fourth wire ASL4 may be configured such that the first part ASL4a, the second part ASL4b, and the third part ASL4c are provided but the fourth part ASL4d is omitted. As illustrated in FIG. 19, the insulating layer 58a and the insulating layer 58b are provided between the substrate 21 and the planarization layer 59. The fourth embodiment can reduce the number of insulating layers by one as compared with what is called the top gate structure illustrated in FIG. 14, thereby thinning the fingerprint detection unit 30.

Fifth Embodiment

Figure 20:
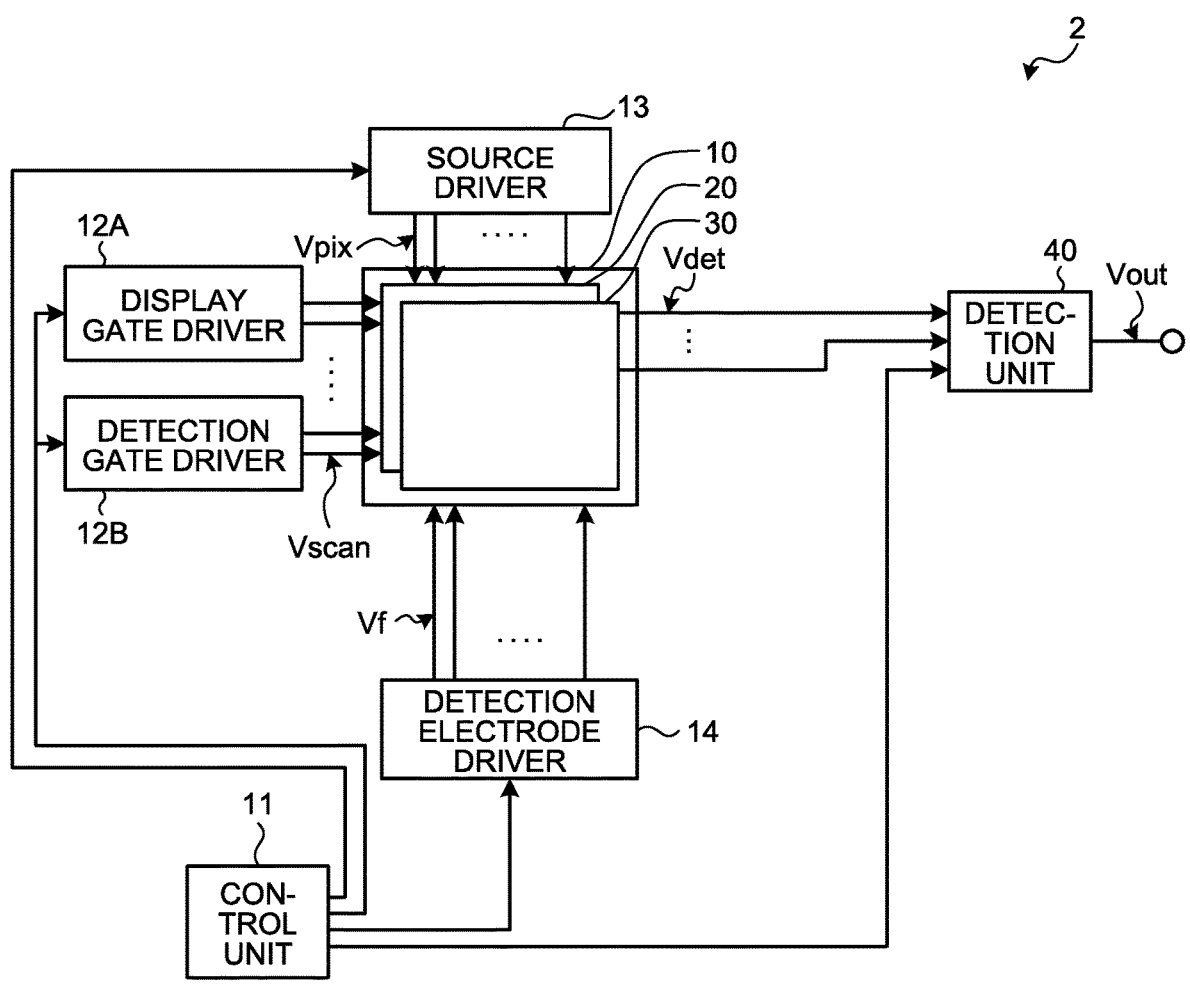
FIG. 20 is a block diagram illustrating a configuration example of a display device according to a fifth embodiment.

FIG. 20 is a block diagram illustrating a configuration example of a display device according to a fifth embodiment. As illustrated in FIG. 20, a display device 2 includes a display unit 10 with a fingerprint detection function, a control unit 11, a display gate driver 12A, a detection gate driver 12B, a source driver 13, a detection electrode driver 14, and a detection unit 40. The display device 2 is a display device in which the display unit 10 with the fingerprint detection function has the fingerprint detection function incorporated therein. The display unit 10 with the fingerprint detection function is a device obtained by integrating a display panel 20 that uses a liquid crystal display element as a display element and a fingerprint detection unit 30 configured to detect the unevenness of a finger in contact or in proximity. The display panel 20 may be a device obtained by integrating a touch panel configured to detect a touch input position or a device obtained by mounting a touch panel on the display panel 20.

The display panel 20 is an element configured to perform display by sequentially scanning horizontal lines one by one in accordance with a scanning signal Vscan supplied from the display gate driver 12A.

The display gate driver 12A has a function of sequentially selecting one horizontal line as a display drive target by the display unit 10 with the fingerprint detection function on the basis of a control signal supplied from the control unit 11.

The source driver 13 is a circuit configured to supply a pixel signal Vpix to each subpixel SPix in the display unit 10 with the fingerprint detection function on the basis of a control signal supplied from the control unit 11.

The fingerprint detection unit 30 performs detection by sequentially scanning detection lines one by one in accordance with a scanning signal Vscan supplied from the detection gate driver 12B. The fingerprint detection unit 30 detects the shape of a fingerprint by detecting the unevenness of a finger in contact or in proximity on the basis of the principle of self-capacitance detection.

The detection electrode driver 14 is a circuit configured to supply a drive signal Vf to a detection electrode 25 subjected to detection driving by the fingerprint detection unit 30 on the basis of a control signal supplied from the control unit 11.

The control unit 11 is a circuit configured to supply the control signals to the display gate driver 12A and the source driver 13 to control display operation on the basis of an image signal supplied from the outside. The control unit 11 is a circuit configured to supply the control signals to the detection gate driver 12B, the detection electrode driver 14, and the detection unit 40 to control the detection gate driver 12B, the detection electrode driver 14, and the detection unit 40 so as to perform fingerprint detection operation in synchronization with one another. The control unit 11 may independently control the display operation and the fingerprint detection operation, or may control the display operation and the fingerprint detection operation in synchronization with each other.

Figure 21:
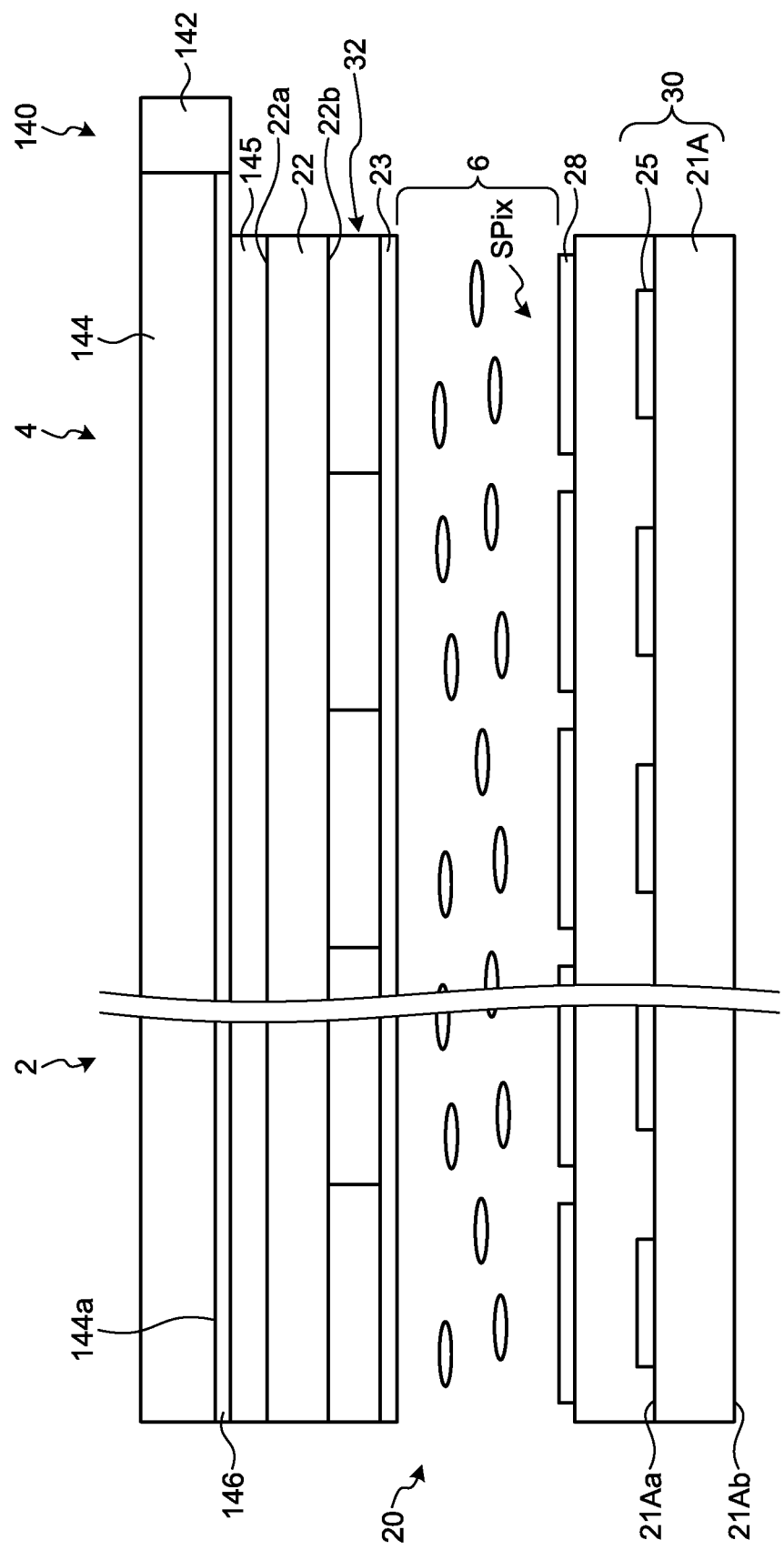
FIG. 21 is a sectional view illustrating a schematic sectional structure of the display device according to the fifth embodiment.

Next, a configuration example of the display device 2 is described in detail. FIG. 21 is a sectional view illustrating a schematic sectional structure of the display device according to the fifth embodiment. As illustrated in FIG. 21, the display device 2 includes a first substrate 21A, a second substrate 22, detection electrodes 25, reflection electrodes 28, a liquid crystal layer 6, and a front light unit 4.

The first substrate 21A has a first surface 21Aa and a second surface 21Ab on the opposite side of the first surface 21Aa. The detection electrodes 25 are provided on the first surface 21Aa side of the first substrate 21A. The detection electrodes 25 can detect a fingerprint of a finger in contact with the second surface 21Ab of the first substrate 21A on the basis of the fundamental principle of self-capacitance fingerprint detection described above. The second surface 21Ab of the first substrate 21A functions as a detection surface used for the fingerprint detection unit 30 to detect a fingerprint.

A glass substrate can be used as the first substrate 21A. For example, the use of toughened glass enables the first substrate 21A to be thinned while the strength is maintained. This configuration enables the distance between the second surface 21Ab, which is the detection surface for fingerprint detection, and the detection electrode 25 to be reduced to improve the detection sensitivity. Examples of toughened glass that can be used include, but are not limited to, chemically toughened glass in which a compressive stress layer is formed on the surface by exchanging sodium (Na) ions on the surface of glass with potassium (K) ions having larger ion radius, toughened glass in which a compressive stress layer is formed on the surface by supplying air to a heated glass substrate for quenching, for example. The first substrate 21A may be six-sided toughened glass.

The reflection electrodes 28 are provided on the first surface 21Aa side of the first substrate 21A so as to be opposed to the detection electrodes 25. The second substrate 22 has a first surface 22a and a second surface 22b on the opposite side of the first surface 22a. The second surface 22b of the second substrate 22 is disposed to be opposed to the first surface 21Aa of the first substrate 21A. A color filter 32 and a translucent electrode 23 that uses a translucent conductive material such as indium tin oxide (ITO) are provided on the second surface 22b side of the second substrate 22. The translucent electrode 23 is electrically coupled to the first substrate 21A side through a connection portion (not illustrated) and supplied with a common potential Vcom. An optical function layer 145, which includes a polarization plate, a ¼ wavelength plate or the like, and the front light unit 4 are provided on the first surface 22a side of the second substrate 22.

The reflection electrode 28 is disposed to correspond to one subpixel SPix. External light entering the second substrate 22 side is reflected by the reflection electrode 28, and the reflected light is modulated by the liquid crystal layer 6 to implement the display. The first surface 22a of the second substrate 22 functions as a display surface of the display panel 20. A metal material such as aluminum (Al) is used for the reflection electrode 28. A configuration in which an ITO layer is laminated on the reflection electrode 28 to inhibit corrosion can be employed. Another configuration in which bump is formed on the reflection electrode 28 to improve diffusivity of the reflected light can be employed. The reflection electrode 28 may be mirror-finished to improve reflectivity so as to improve the luminance. Circuit elements, including a switching element such as a thin film transistor (TFT) and a capacitive element, are formed between the detection electrode 25 and the reflection electrode 28 for each subpixel SPix.

The liquid crystal layer 6 is provided between the translucent electrode 23 and the reflection electrode 28. The liquid crystal layer 6 modulates light passing therethrough in accordance with the state of electric field. The liquid crystal layer 6 is formed by sealing a liquid crystal material between the translucent electrode 23 and the reflection electrode 28.

The display panel 20 according to the fifth embodiment is a display device using a liquid crystal display (LCD) panel. In particular, a reflective liquid crystal display device is used. The reflective liquid crystal display device may be either a monochrome display-compatible display device or a color display-compatible display device. When the display device is compatible with color display, one display pixel as a unit for forming a color image includes a plurality of subpixels. More specifically, in the color display-compatible display device, for example, one display pixel includes three subpixels: a subpixel for displaying red (R), a subpixel for displaying green (G), and a subpixel for displaying blue (B). One pixel may include four or more subpixels, and the colors may be other than red, green, and blue.

In the color filter 32, for example, color regions of color filters colored with red (R), green (G), and blue (B) may be periodically arranged. Color regions of three colors of R, G, and B as a set are associated with each subpixel SPix, and the subpixels SPix corresponding to the three color regions as a set form the pixel Pix. The color filter 32 is opposed to the liquid crystal layer 6 in a direction perpendicular to the first substrate 21A. The color filter 32 may have a combination of different colors as long as the color regions are colored with different colors. The color filter 32 is not limited to a combination of three colors, and may have a combination of four or more colors.

The front light unit 4 is disposed on the first surface 22a side of the second substrate 22. The first surface 22a is a surface on the side where an image of the display panel 20 is displayed, that is, a surface that external light enters and a surface from which light reflected by the reflection electrode 28 exits. The front light unit 4 includes a light source 140, a light guide plate 144, and an adhesive member 146. A light emitting diode (LED) 142 is used for the light source 140. Another light source such as a fluorescent tube may be used for the light source 140. The light guide plate 144 is a transparent plate-shaped member, and is laminated above the first surface 22a of the second substrate 22 with the optical function layer 145 and the adhesive member 146 interposed therebetween. In the light guide plate 144, a large number of grooves may be formed in a surface 144a opposed to the second substrate 22. The light guide plate 144 can reflect and scatter incident light from the light source 140 so that the light is output toward the second substrate 22.

The light output toward the second substrate 22 passes through the translucent electrode 23 and the liquid crystal layer 6 and is reflected by the reflection electrode 28, and then passes through the light guide plate 144 to reach the eyes of an observer. A region where the light output toward the second substrate 22 is blocked and a region where the light transmits are switched depending on the state of liquid crystal at the light passing position as described above, thereby displaying an image on the display surface.

Figure 22:
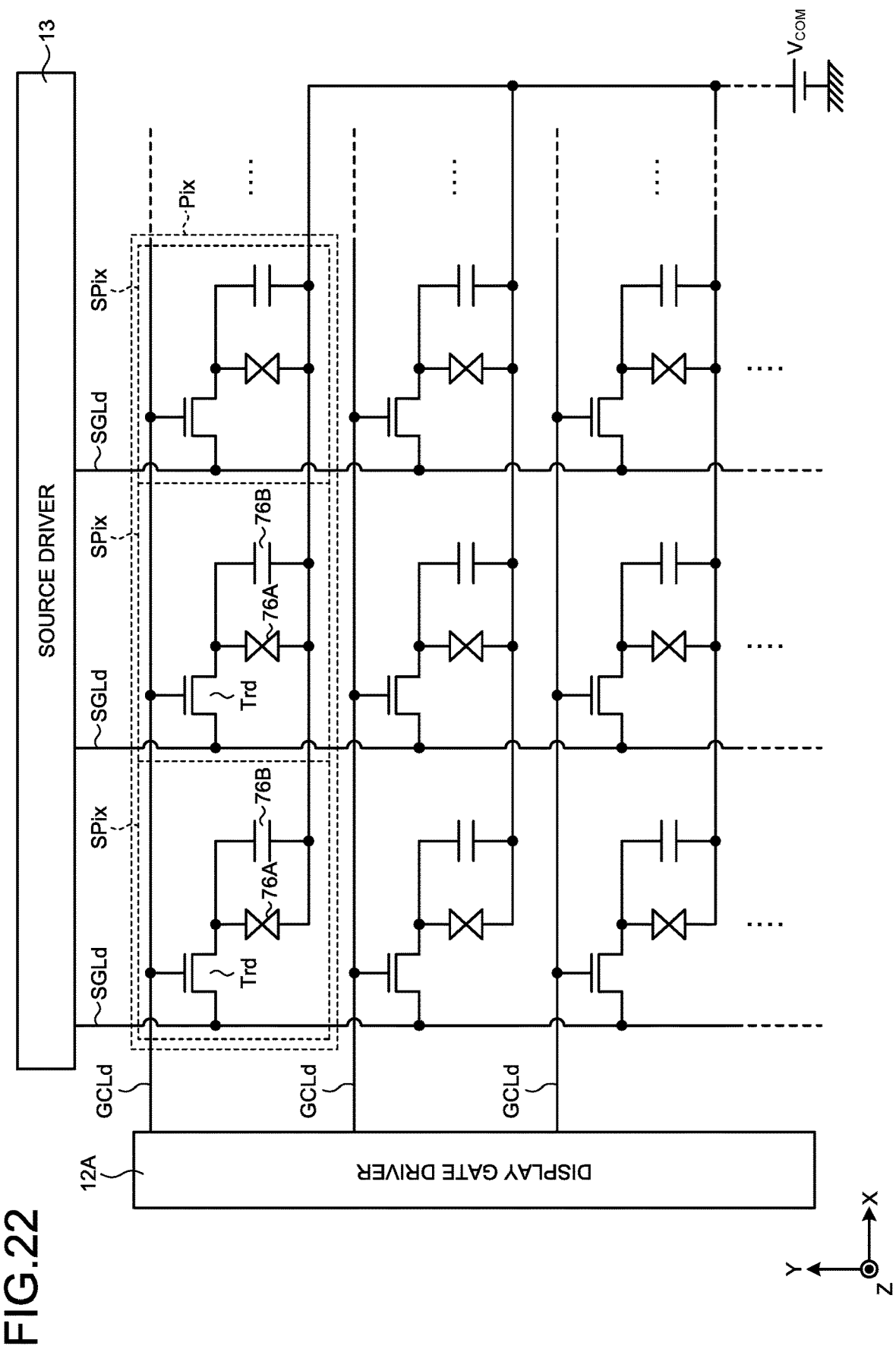
FIG. 22 is a circuit diagram illustrating fundamental pixel circuits.

FIG. 22 is a circuit diagram illustrating a fundamental pixel circuit. FIG. 22 illustrates a pixel circuit for the display panel 20, and the illustration of circuits such as the wire for the fingerprint detection unit 30 is omitted. As illustrated in FIG. 22, a plurality of display data lines SGLd and a plurality of display gate lines GCLd are wired so as to intersect with each other. The direction in which the display data lines SGLd extend is the column direction, and the direction in which the display gate lines GCLd extend is the row direction.

The subpixels SPix are arranged in a matrix pattern, and each include a display switching element Trd, a liquid crystal capacitance 76A, and a holding capacitance 76B. The display switching element Trd has a source coupled to the display data line SGLd, a gate coupled to the display gate line GCLd, and a drain coupled to one end of the liquid crystal capacitance 76A and one end of the holding capacitance 76B.

The liquid crystal capacitance 76A represents a capacitive component generated between the reflection electrode 28 and the translucent electrode 23. The holding capacitance 76B is a capacitive component for holding an image display voltage applied between the reflection electrode 28 and the translucent electrode 23.

The subpixel SPix is coupled to other subpixels SPix belonging to the same row in the display panel 20 by the display gate line GCLd. The display gate line GCLd is coupled to the display gate driver 12A and supplied with the scanning signal Vscan from the display gate driver 12A. The subpixel SPix is coupled to other subpixels SPix belonging to the same column in the display panel 20 by the display data line SGLd. The display data line SGLd is coupled to the source driver 13 and supplied with the pixel signal Vpix from the source driver 13.

The display gate driver 12A is driven to sequentially scan the display gate lines GCLd. The display gate driver 12A applies the scanning signal Vscan (refer to FIG. 1) to the gates of the display switching elements Trd in the subpixels SPix through the display gate line GCLd, thereby sequentially selecting one line (one horizontal line) of the subpixels SPix as a display drive target. The source driver 13 supplies the pixel signal Vpix to the subpixels SPix forming the selected one horizontal line through the display data line SGLd. In these subpixels SPix, display is performed for each horizontal line in accordance with the supplied pixel signal Vpix.

Figure 23:
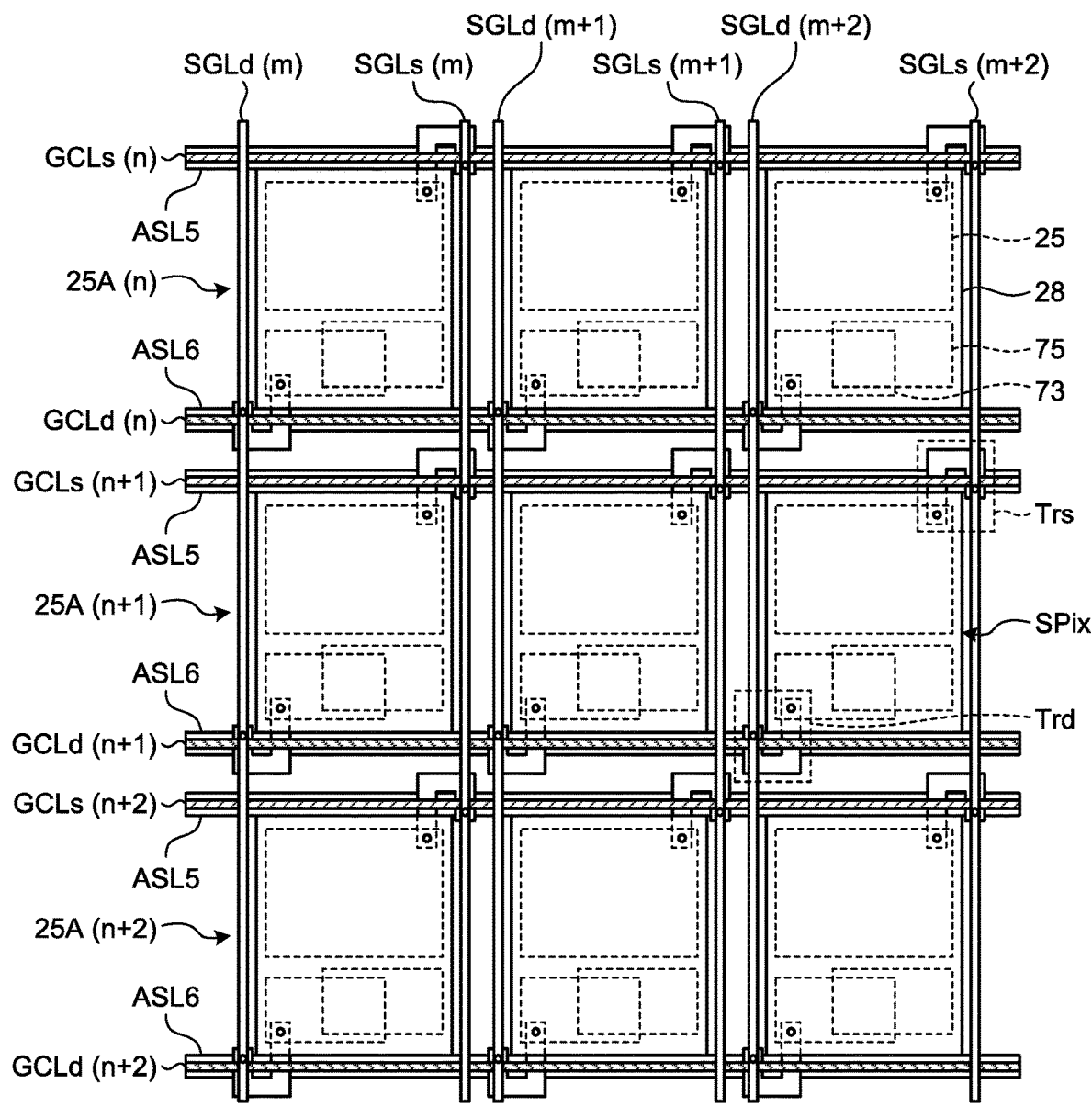
FIG. 23 is a plan view illustrating a planar structure of the display device according to the fifth embodiment.
Figure 24:
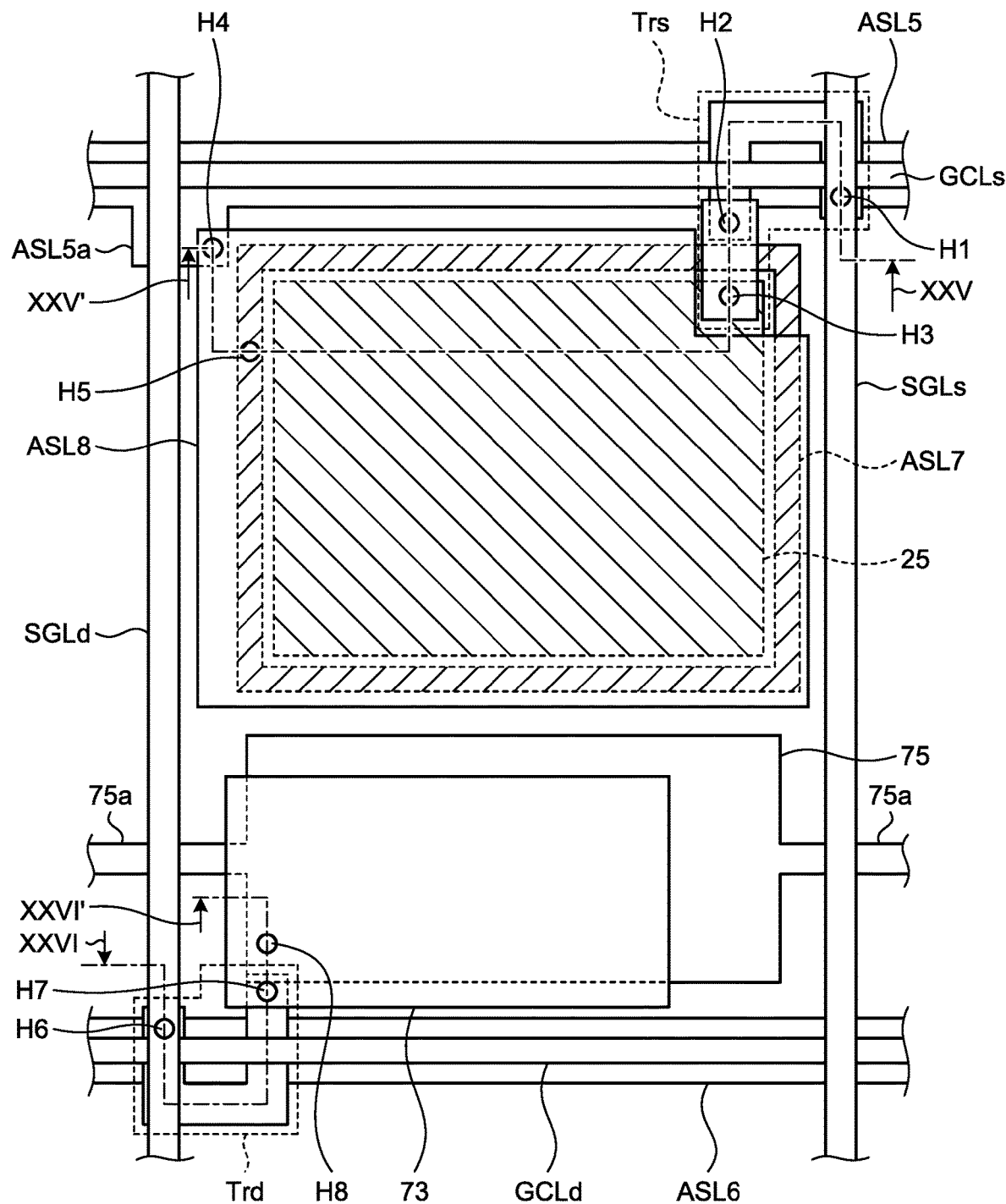
FIG. 24 is an enlarged plan view of a portion corresponding to one subpixel.
Figure 25:
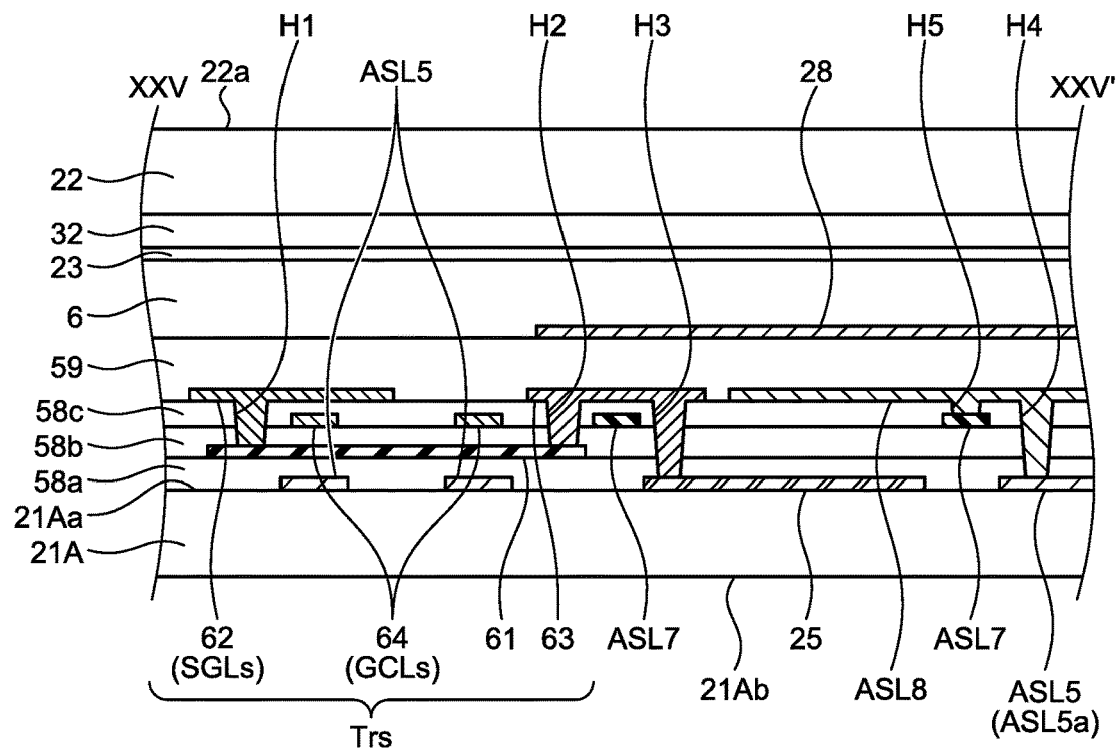
FIG. 25 is a sectional view taken along the line XXV-XXV' in FIG. 24.
Figure 26:
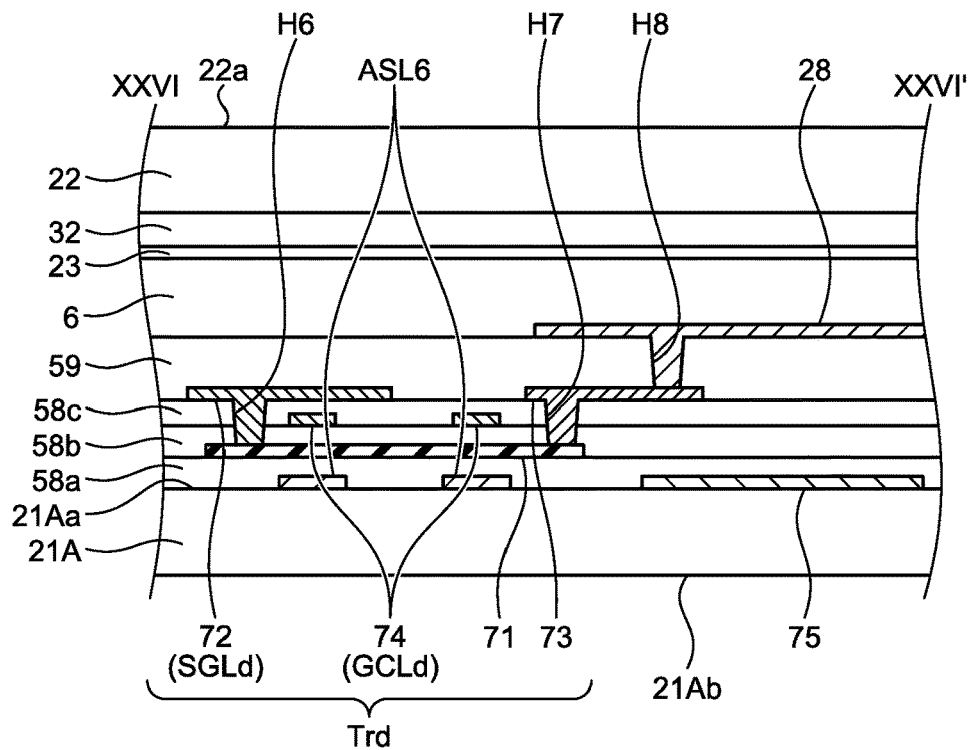
FIG. 26 is a sectional view taken along the line XXVI-XXVI' in FIG. 24.

Next, the configurations of the detection electrode 25 and the reflection electrode 28 are described with reference to FIG. 23 to FIG. 26. FIG. 23 is a plan view illustrating a planar structure of the display device according to the fifth embodiment. FIG. 24 is an enlarged plan view of a portion corresponding to one subpixel. FIG. 25 is a sectional view taken along the line XXV-XXV' in FIG. 24. FIG. 26 is a sectional view taken along the line XXVI-XXVI' in FIG. 24. FIG. 23 and FIG. 24 illustrate plan views when the first surface 21Aa of the first substrate 21A is viewed from the second surface 22 side. FIG. 24 omits the illustration of the reflection electrode 28 for simplicity.

As illustrated in FIG. 23, the display gate line GCLd is provided along the row direction, and the display gate lines GCLd are arranged with intervals in the column direction. The display data line SGLd is provided along the column direction, and the display data lines SGLd are arranged with intervals in the row direction. A detection gate line GCLs is provided in parallel to the display gate line GCLd, and the detection gate lines GCLs are arranged along the row direction with intervals in the column direction. A detection data line SGLs is provided in parallel to the display data line SGLd, and the detection data lines SGLs are arranged along the column direction with intervals in the row direction. The reflection electrode 28 is disposed in a region surrounded by the display gate line GCLd, the display data line SGLd, the detection gate line GCLs, and the detection data line SGLs. The region surrounded by the display gate line GCLd, the display data line SGLd, the detection gate line GCLs, and the detection data line SGLs corresponds to one subpixel SPix. The reflection electrode 28 has a substantially rectangular shape, and the reflection electrodes 28 are arranged in a matrix pattern. The detection electrode 25 and a holding capacitance electrode 75 are provided to overlap with the corresponding reflection electrode 28. In other words, the detection electrodes 25 are arranged in a matrix pattern to correspond to the reflection electrodes 28.

As illustrated in FIG. 24, the display switching element Trd is provided near the position at which the display gate line GCLd and the display data line SGLd intersect with each other. The display switching element Trd is provided at the position corresponding to the reflection electrode 28 in one subpixel SPix. A drain electrode 73 of the display switching element Trd is provided to overlap with the holding capacitance electrode 75, and a holding capacitance is formed between the drain electrode 73 and the holding capacitance electrode 75. The holding capacitance electrode 75 is coupled to adjacent holding capacitance electrodes arranged in the row direction through connection parts 75a.

A detection switching element Trs is provided near the position at which the detection gate line GCLs and the detection data line SGLs intersect with each other. The detection switching element Trs is provided at the position corresponding to the detection electrode 25.

The display switching element Trd and the detection switching element Trs are formed of thin film transistors. In the present example, the display switching element Trd and the detection switching element Trs are formed of re-channel metal oxide semiconductor (MOS) TFT elements.

The detection gate driver 12B (refer to FIG. 1) sequentially selects the detection gate lines GCLs. The detection gate driver 12B supplies the scanning signal Vscan to the detection switching elements Trs through the selected detection gate line GCLs. In this manner, the detection gate driver 12B selects one line (one horizontal line) of the detection electrodes 25 as a detection electrode block 25A to be detected. The detection electrode block 25A includes a plurality of detection electrodes 25 arranged in the row direction. The detection electrode driver 14 (refer to FIG. 1) supplies the drive signal Vf to each detection electrode 25 in the detection electrode block 25A through the detection data line SGLs. The detection unit 40 receives a detection signal Vdet corresponding to an electrostatic capacitance change in each detection electrode 25 in accordance with the fundamental principle of self-capacitance fingerprint detection described above. In this manner, a fingerprint of a finger in touch with the detection surface is detected.

Conductive fifth wire ASL5 is provided to overlap with the detection gate line GCLs along the detection gate line GCLs. A sixth wire ASL6 is provided to overlap with the display gate line GCLd along the display gate line GCLd. The fifth wire ASL5 and the sixth wire ASL6 are provided to be continuous correspondingly to the subpixels SPix arranged in the row direction.

As illustrated in FIG. 24, a seventh wire ASL7 that surrounds the periphery of the detection electrode 25 is provided. The seventh wire ASL7 has a part that extends along the detection gate line GCLs between the detection electrode 25 and the detection gate line GCLs and a part that extends along the display gate line GCLd between the detection electrode 25 and the display gate line GCLd. A conductive layer ASL8 is further provided so as to cover the detection electrode 25 and the seventh wire ASL7.

For example, a metal material of at least one of molybdenum (Mo), aluminum (Al), copper (Cu), silver (Ag), or an alloy thereof can be used for the fifth wire ASL5, the sixth wire ASL6, the seventh wire ASL7, and the conductive layer ASL8.

As described above, the display gate line GCLd and the detection gate line GCLs are supplied with the signal (scanning signal Vscan) different from the drive signal Vf supplied to the detection data line SGLs and the detection electrode 25. Thus, a parasitic capacitance between the display gate line GCLd and the detection electrode 25 and a parasitic capacitance between the display data line SGLd and the detection electrode 25 can increase. A parasitic capacitance between the detection gate line GCLs and the detection electrode 25 and a parasitic capacitance between the detection gate line GCLs and the detection data line SGLs can increase. When the parasitic capacitance increases, the electrostatic capacitance change caused by contact or proximity of a finger is relatively reduced, and detection sensitivity can deteriorate.

In the fifth embodiment, the detection electrode driver 14 supplies the fifth wire ASL5, the sixth wire ASL6, the seventh wire ASL7, and the conductive layer ASL8 with the signal Vsg1 that is synchronized with the drive signal Vf and has the same waveform as the drive signal Vf. Thus, the parasitic capacitance is reduced. Consequently, detection errors and the deterioration in detection sensitivity are suppressed. A drive circuit that is not provided in the detection electrode driver 14 may be provided as appropriate to supply the signal Vsg1. By providing the fifth wire ASL5, the sixth wire ASL6, the seventh wire ASL7, and the conductive layer ASL8, a fluctuation in the liquid crystal capacitance 76A caused by the fingerprint detection operation can be suppressed to suppress the deterioration in display image.

Next, the configurations of the detection electrode 25, each wire, and the conductive layer are described in detail. As illustrated in FIG. 25, the detection switching element Trs includes a semiconductor layer 61, a source electrode 62, a drain electrode 63, and a gate electrode 64. As the material for the semiconductor layer 61, a well-known material such as polysilicon and oxide semiconductor can be used.

The semiconductor layer 61 is electrically coupled to the detection data line SGLs via a contact hole H1. A part of the detection data line SGLs that overlaps with the semiconductor layer 61 functions as the source electrode 62. The semiconductor layer 61 is bent so as to intersect with the detection gate line GCLs a plurality of times in a plan view. A part of the detection gate line GCLs that overlaps with the semiconductor layer 61 functions as the gate electrode 64. The semiconductor layer 61 is electrically coupled to the drain electrode 63 via a contact hole H2. The drain electrode 63 intersects with the seventh wire ASL7 to overlap with the detection electrode 25. The drain electrode 63 is electrically coupled to the detection electrode 25 via a contact hole H3.

As illustrated in FIG. 25, the fifth wire ASL5 and the detection electrode 25 are provided on the first surface 21Aa of the substrate 21. The insulating layer 58a is provided on the fifth wire ASL5 and the detection electrode 25. The semiconductor layer 61 is provided on the insulating layer 58a. The insulating layer 58b is provided on the semiconductor layer 61, and the detection gate line GCLs and the seventh wire ASL7 are provided on the insulating layer 58b. The insulating layer 58c is provided on the detection gate line GCLs and the seventh wire ASL7, and the detection data line SGLs, the drain electrode 63, and the conductive layer ASL8 are provided on the insulating layer 58c. The planarization layer 59 is provided on the detection data line SGLs, the drain electrode 63, and the conductive layer ASL8, and the reflection electrode 28 is provided on the planarization layer 59.

The translucent electrode 23, the color filter 32, and the second substrate 22 are provided above the reflection electrode 28 with the liquid crystal layer 6 interposed therebetween.

As illustrated in FIG. 24, the fifth wire ASL5 is provided with a tab portion ASL5a that protrudes to a position overlapping with the conductive layer ASL8. The tab portion ASL5a is electrically coupled to the conductive layer ASL8 via a contact hole H4. Accordingly, when the above-mentioned signal Vsg1 is supplied to the fifth wire ASL5, the signal Vsg1 is supplied to the conductive layer ASL8 through the tab portion ASL5a. The seventh wire ASL7 is coupled to the conductive layer ASL8 via a contact hole H5. Accordingly, the signal Vsg1 supplied to the fifth wire ASL5 is supplied to the seventh wire ASL7 through the conductive layer ASL8.

The semiconductor layer 61 is provided with a channel portion in a region overlapping with the gate electrode 64. It is preferred that the fifth wire ASL5 be provided at a position overlapping with the channel portion and have an area larger than that of the channel portion. The above-mentioned metal material is used for the fifth wire ASL5, and the fifth wire ASL5 has a light transmittance smaller than that of the first substrate 21A, and hence light that enters the semiconductor layer 61 from the first substrate 21A side is blocked.

Next, the connection structure of the reflection electrode 28 and the display switching element Trd is described. As illustrated in FIG. 26, the display switching element Trd includes a semiconductor layer 71, a source electrode 72, a drain electrode 73, and a gate electrode 74. As the material for the semiconductor layer 71, a well-known material such as polysilicon and oxide semiconductor can be used. For example, the use of transparent amorphous oxide semiconductor (TAOS) or low temperature polysilicon (LTPS) enables the semiconductor layer 71 to have good capability of holding an image display voltage for a long period (holding rate), thereby improving the display quality. The same material may be used for the semiconductor layer 71 of the display switching element Trd and the semiconductor layer 61 of the detection switching element Trs.

As illustrated in FIG. 24 and FIG. 26, the semiconductor layer 71 is electrically coupled to the display data line SGLd via a contact hole H6. A part of the display data line SGLd that overlaps with the semiconductor layer 71 functions as the source electrode 72. The semiconductor layer 71 is bent so as to intersect with the display gate line GCLd a plurality of times in a plan view. A part of the display gate line GCLd that overlaps with the semiconductor layer 71 functions as the gate electrode 74. The semiconductor layer 71 is electrically coupled to the drain electrode 73 via a contact hole H7. The drain electrode 73 has an area larger than that of the drain electrode 63 of the detection switching element Trs, and overlaps with the holding capacitance electrode 75. The drain electrode 73 is electrically coupled to the reflection electrode 28 via a contact hole H8.

As illustrated in FIG. 26, the sixth wire ASL6 and the holding capacitance electrode 75 are provided on the first surface 21Aa of the substrate 21. The insulating layer 58a is provided on the sixth wire ASL6 and the holding capacitance electrode 75. The semiconductor layer 71 is provided on the insulating layer 58a. The insulating layer 58b is provided on the semiconductor layer 71, and the display gate line GCLd is provided on the insulating layer 58b. The insulating layer 58c is provided on the display gate line GCLd, and the display data line SGLd and the drain electrode 73 are provided on the insulating layer 58c. The planarization layer 59 is provided on the display data line SGLd and the drain electrode 73, and the reflection electrode 28 is provided on the planarization layer 59.

The semiconductor layer 71 is provided with a channel portion in a region overlapping with the gate electrode 74. It is preferred that the sixth wire ASL6 be provided at a position overlapping with the channel portion and have an area larger than that of the channel portion. By providing the sixth wire ASL6, for example, light that enters the semiconductor layer 71 from the first substrate 21A side is blocked.

As illustrated in FIG. 25 and FIG. 26, the detection electrode 25, the holding capacitance electrode 75, the fifth wire ASL5, and the sixth wire ASL6 are provided in the same layer. The display switching element Trd and the detection switching element Trs are provided in the same layer. The detection electrode 25 and the holding capacitance electrode 75 may be provided in different layers, and the display switching element Trd and the detection switching element Trs may be provided in different layers.

In the fifth embodiment, the detection electrode 25 is provided closer to the first surface 21Aa of the first substrate 21A than the detection gate line GCLs is. The detection electrode 25 is provided closer to the first surface 21Aa of the first substrate 21A than the display gate line GCLd is. The insulating layers 58a and 58b are provided between the detection electrode 25 and the detection gate line GCLs and between the detection electrode 25 and the display gate line GCLd. In other words, the detection electrode 25 is closer to the second surface 21Ab serving as the detection surface than the detection switching element Trs and the display switching element Trd are. Only the first substrate 21A or the first substrate 21A and a protective layer are provided between the detection electrode 25 and the detection surface. Thus, no conductor such as a wire is present on the second surface 21Ab side with respect to the detection electrode 25, and the distance between a finger in contact with the detection surface and the detection electrode 25 is reduced. Consequently, the deterioration in detection sensitivity can be suppressed.

The reflection electrode 28 is provided on the first surface 21Aa side of the first substrate 21A at a position farther away from the first surface 21Aa than the detection electrode 25 is. Thus, images can be displayed on the first surface 22a of the second substrate 22. Consequently, in the display device 2 according to the fifth embodiment, the second surface 21Ab of the first substrate 21A functions as a detection surface for detecting a fingerprint of a finger in contact, and the first surface 22a of the second substrate 22 on the opposite side of the second surface 21Ab across the detection electrode 25 functions as a display surface for displaying images. The reflection electrode 28 is formed to be non-transmissive in order to reflect light from the display surface. Thus, circuits and electrodes can be relatively freely arranged between the reflection electrode 28 and the first substrate 21A on which the reflection electrode 28 is formed. The fifth embodiment focuses on this point, and the detection electrode 25 and other components are provided on the rear side of the reflection electrode 28 and the detection surface is provided on the surface on the opposite side of the display surface. Consequently, the display device 2 according to the fifth embodiment enables fingerprints to be detected on the surface on the opposite side of the display surface, and enables fingerprints to be detected in the period during which the display is performed.

Figure 27:
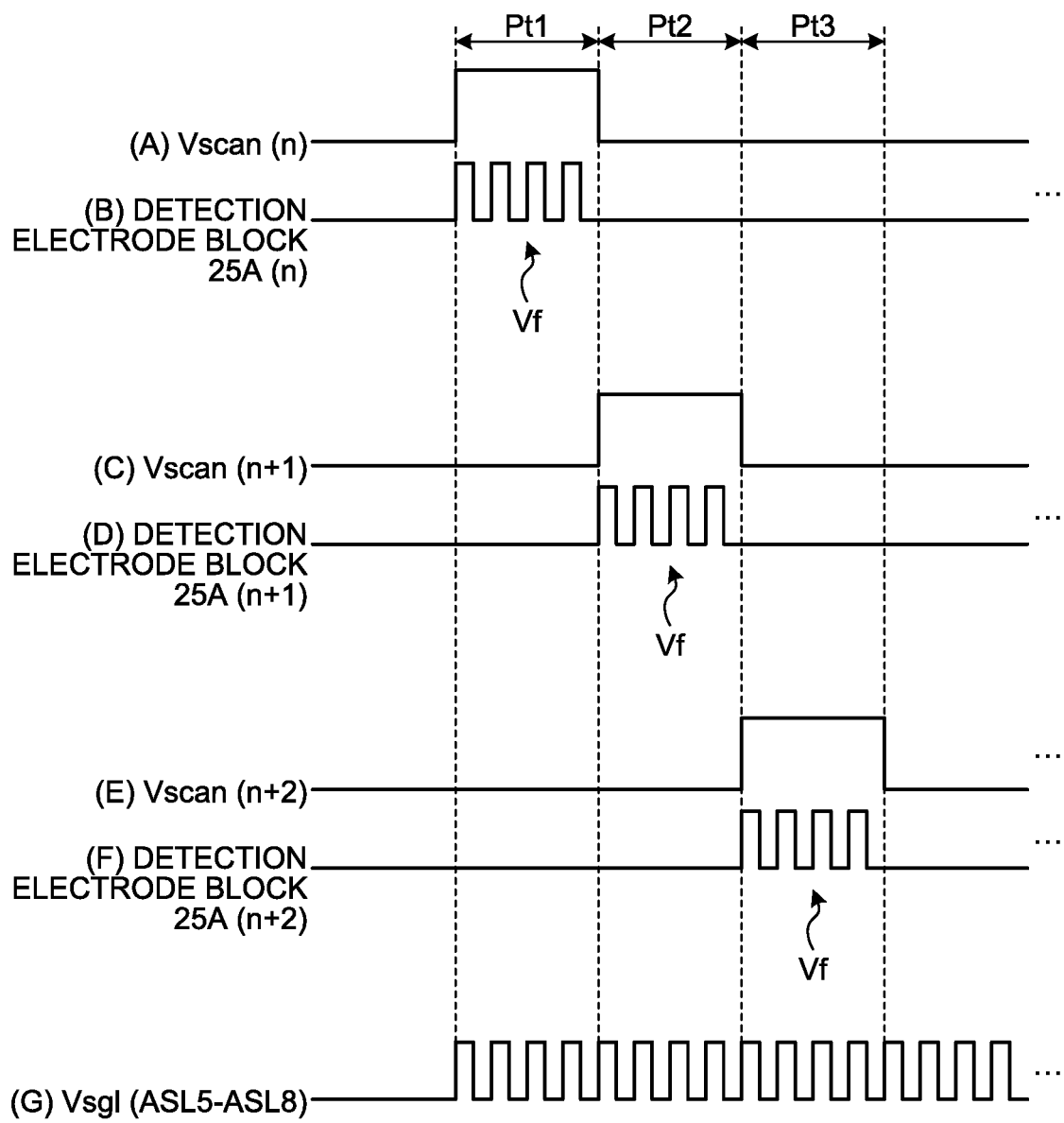
FIG. 27 is a timing waveform diagram illustrating an operation example of fingerprint detection operation.

Next, a drive method for the display device 2 according to the fifth embodiment is described. FIG. 27 is a timing waveform diagram illustrating an operation example of fingerprint detection operation according to the fifth embodiment. As illustrated in FIG. 27, detection periods Pt1, Pt2, and Pt3 during which the fingerprint detection operation is performed are arranged in a time division manner.

As illustrated in FIG. 27, in the detection period Pt1, the detection gate line GCLs(n) (refer to FIG. 23) in the n-th row is selected, and the scanning signal Vscan(n) is turned on (High level). When the scanning signal Vscan(n) is turned on (High level), detection switching elements Trs corresponding to the detection electrode block 25A(n) in the n-th row are turned on (open). Accordingly, the drive signal Vf is supplied to the respective detection electrodes 25 in the detection electrode block 25A(n) through the detection data lines SGLs(m), SGLs(m+1), and SGLs(m+2). The detection signal Vdet is output to the detection unit 40 (refer to FIG. 1) from each detection electrode 25 in the detection electrode block 25A(n) on the basis of the fundamental principle of self-capacitance fingerprint detection described above.

In the detection period Pt1, the scanning signal Vscan for the detection gate lines GCLs(n+1) and GCLs(n+2) other than the detection gate line GCLs(n) is off (Low level), and each detection electrode 25 in the detection electrode block 25A(n+1) and the detection electrode block 25A(n+2) is in the floating state in which a fixed potential is not supplied. Thus, parasitic capacitances between the detection electrode 25 in the detection electrode block 25A(n) selected as a detection target and the detection electrode 25 in the unselected detection electrode block 25A(n+1) and between the detection electrode 25 in the detection electrode block 25A(n) and the detection electrode 25 in the unselected detection electrode block 25A(n+2) can be suppressed. In the detection period Pt1, the fifth wire ASL5, the sixth wire ASL6, the seventh wire ASL7, and the conductive layer ASL8 are supplied with the signal Vsg1. Thus, the parasitic capacitance between each detection electrode 25 in the detection electrode block 25A(n) selected as a detection target and the detection gate line GCLs is suppressed to suppress the deterioration in detection sensitivity.

Next, in the detection period Pt2, the detection gate line GCLs(n+1) in the (n+1)th row is selected, and the scanning signal Vscan(n+1) is turned on (High level). Detection switching elements Trs in the detection electrode block 25A(n+1) in the (n+1)th row are turned on (open). Accordingly, the drive signal Vf is supplied to the respective detection electrodes 25 in the detection electrode block 25A(n+1) through the detection data lines SGLs(m), SGLs(m+1), and SGLs(m+2), and the detection signal Vdet is output to the detection unit 40 (refer to FIG. 1) from each detection electrode 25 in the detection electrode block 25A(n+1).

In the detection period Pt2, each detection electrode 25 in the detection electrode block 25A(n) and the detection electrode block 25A(n+2) is in the floating state in which a fixed potential is not supplied. The fifth wire ASL5, the sixth wire ASL6, the seventh wire ASL7, and the conductive layer ASL8 are supplied with the signal Vsg1.

In the detection period Pt3, the detection gate line GCLs(n+2) in the (n+2)th row is selected, and the scanning signal Vscan(n+2) is turned on (High level). Detection switching elements Trs in the detection electrode block 25A(n+2) in the (n+2)th row are turned on (open). Accordingly, the drive signal Vf is supplied to the respective detection electrodes 25 in the detection electrode block 25A(n+2) through the detection data lines SGLs(m), SGLs(m+1), and SGLs(m+2), and the detection signal Vdet is output to the detection unit 40 (refer to FIG. 1) from each detection electrode 25 in the detection electrode block 25A(n+2). This operation is sequentially repeated to carry out the detection operation on the entire detection surface.

In the fifth embodiment, the display gate driver 12A and the detection gate driver 12B can be driven independently. In other words, in the display device 2 according to the fifth embodiment, the display and the fingerprint detection can be driven independently. More specifically, the detection period Pt1 is provided in a period during which the display gate line GCLd(n) is not selected, the detection period Pt2 is provided in a period during which the display gate line GCLd(n+1) is not selected, and the detection period Pt3 is provided in a period during which the display gate line GCLd(n+2) is not selected. Thus, the deterioration in display image caused by the drive signal Vf supplied from the detection electrode 25 in the fingerprint detection operation can be suppressed.

In the fifth embodiment, the shapes of the reflection electrode 28, the detection electrode 25, and the holding capacitance electrode 75 are illustrative, and can be changed to a rhombic, a parallelogram, or a polygon as appropriate. The fifth wire ASL5 and the sixth wire ASL6 have widths larger than the widths of the detection gate line GCLs and the display gate line GCLd, respectively. Without being limited thereto, the fifth wire ASL5 and the sixth wire ASL6 may have the same or smaller widths than the detection gate line GCLs and the display gate line GCLd. The seventh wire ASL7 is provided continuously so as to surround the periphery of the detection electrode 25, but without being limited thereto, the seventh wire ASL7 only needs to be provided at least between the detection electrode 25 and the detection gate line GCLs and between the detection electrode 25 and the display gate line GCLd.

Sixth Embodiment

Figure 28:
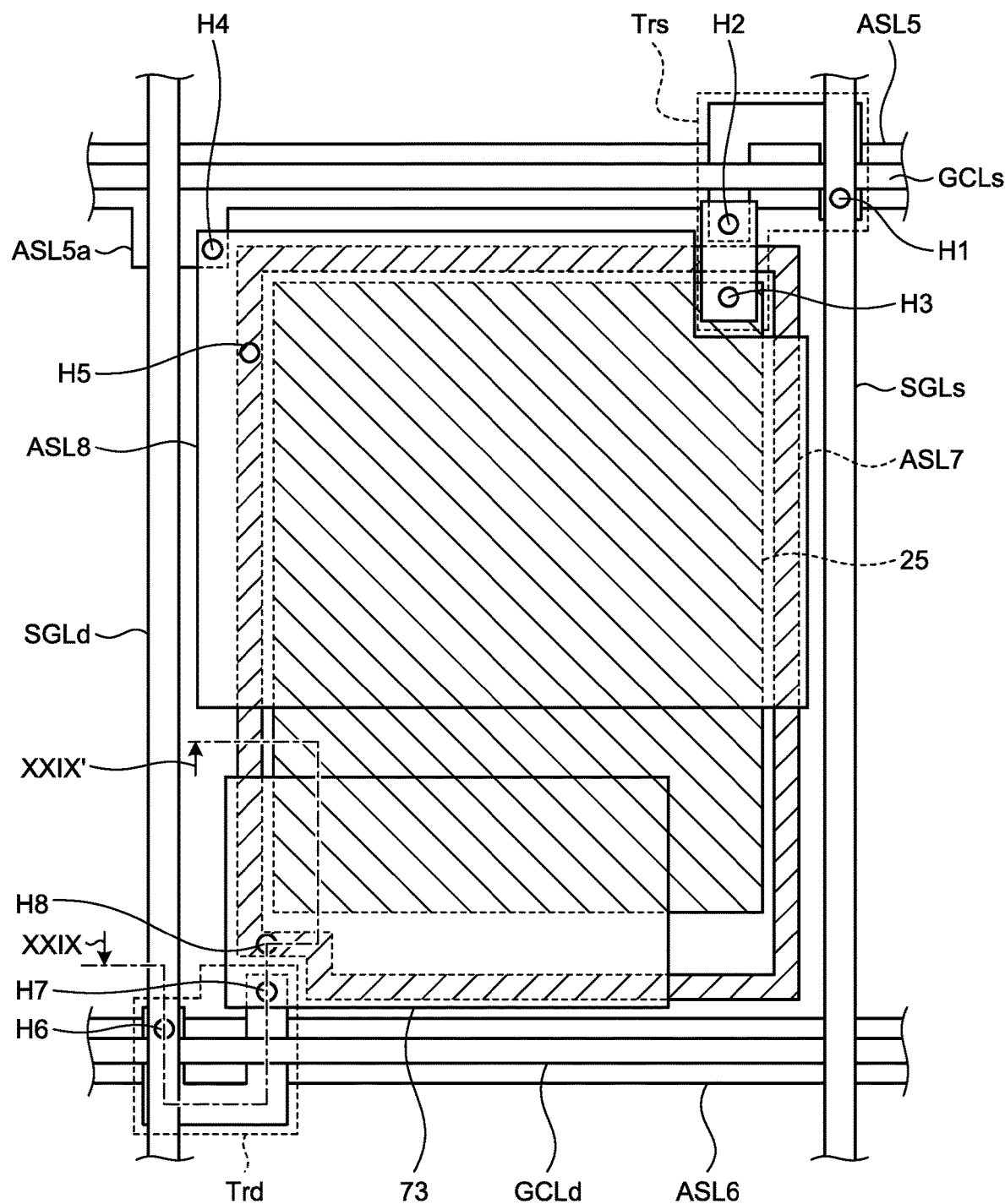
FIG. 28 is an enlarged plan view of a portion corresponding to one subpixel in a display device according to a sixth embodiment.
Figure 29:
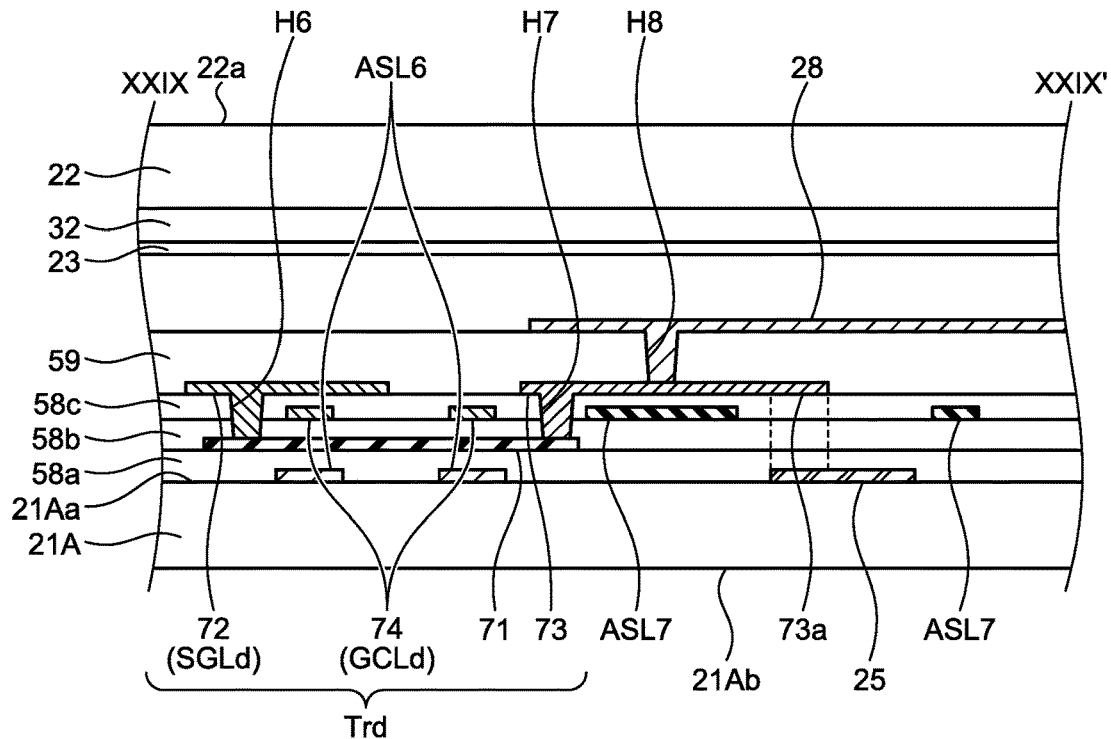
FIG. 29 is a sectional view taken along the line XXIX-XXIX' in FIG. 28.

FIG. 28 is an enlarged plan view of a portion corresponding to one subpixel in a display device according to a sixth embodiment. FIG. 29 is a sectional view taken along the line XXIX-XXIX' in FIG. 28. In the sixth embodiment, the holding capacitance electrode 75 for forming a holding capacitance is not provided.

As illustrated in FIG. 28 and FIG. 29, the connection structure of the display switching element Trd and the reflection electrode 28 is the same as in the fifth embodiment. The semiconductor layer 71 is electrically coupled to the display data line SGLd via the contact hole H6. The semiconductor layer 71 is bent so as to intersect with the display gate line GCLd a plurality of times in a plan view. The semiconductor layer 71 is electrically coupled to the drain electrode 73 via the contact hole H7. The drain electrode 73 has an area larger than that of the drain electrode 63 of the detection switching element Trs. As illustrated in FIG. 28, the detection electrode 25 is provided to extend from the position near the detection gate line GCLs to the position near the display gate line GCLd. The detection electrode 25 includes a portion overlapping with the drain electrode 73. The drain electrode 73 is electrically coupled to the reflection electrode 28 via the contact hole H8. The seventh wire ASL7 is provided to surround the periphery of the detection electrode 25, and includes a portion provided between the detection electrode 25 and the display gate line GCLd along the display gate line GCLd.

As illustrated in FIG. 29, the sixth wire ASL6 and the detection electrode 25 are provided on the first surface 21Aa of the substrate 21. The insulating layer 58a is provided on the sixth wire ASL6 and the detection electrode 25. The semiconductor layer 71 is provided on the insulating layer 58a. The insulating layer 58b is provided on the semiconductor layer 71, and the display gate line GCLd and the seventh wire ASL7 are provided on the insulating layer 58b. The insulating layer 58c is provided on the display gate line GCLd and the seventh wire ASL7, and the display data line SGLd and the drain electrode 73 are provided on the insulating layer 58c. The planarization layer 59 is provided on the display data line SGLd and the drain electrode 73, and the reflection electrode 28 is provided on the planarization layer 59.

In the sixth embodiment, the drain electrode 73 has a portion 73a overlapping with the detection electrode 25, and hence a holding capacitance is formed between the drain electrode 73 and the detection electrode 25. In this manner, the deterioration in display image can be suppressed. The detection electrode 25 can be provided in the region in which the holding capacitance electrode 75 is otherwise formed, and hence the area of the detection electrode 25 can be increased to improve the detection sensitivity of fingerprint detection.

Seventh Embodiment

Figure 30:
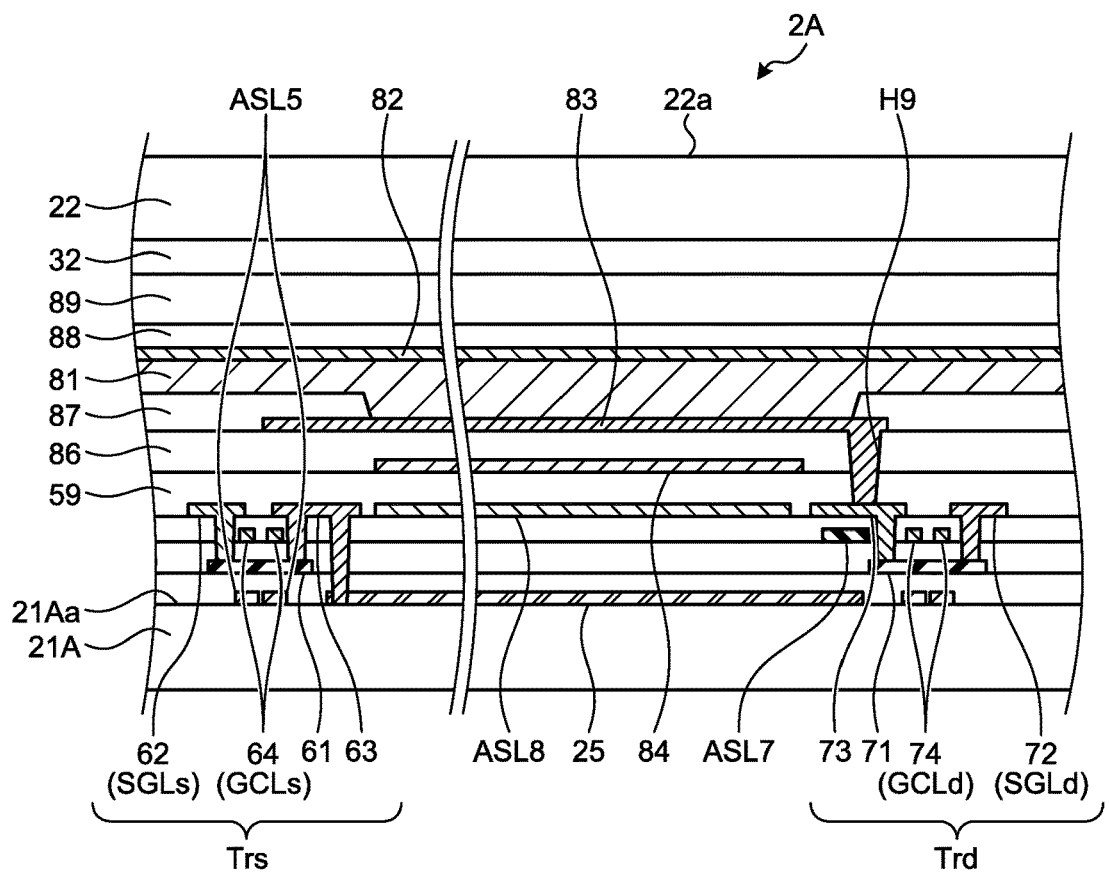
FIG. 30 is a sectional view illustrating a sectional structure of a display device according to a seventh embodiment.

FIG. 30 is a sectional view illustrating a sectional structure of a display device according to a seventh embodiment. A display panel 20 according to the seventh embodiment is a display panel using organic light-emitting diodes (OLEDs).

As illustrated in FIG. 30, a display device 2A includes the detection electrode 25, the display switching element Trd, the detection switching element Trs, a reflection layer 84, a self-light emitting layer 81, an upper electrode 82, and a lower electrode 83. The planarization layer 59 is provided on the detection switching element Trs, the conductive layer ASL8, and the display switching element Trd, and the reflection layer 84 is provided on the planarization layer 59. An insulating layer 86 is provided on the reflection layer 84, and the lower electrode 83 and an insulating layer 87 are provided on the insulating layer 86. The self-light emitting layer 81 is provided on the lower electrode 83 and the insulating layer 87, and the upper electrode 82 is provided on the self-light emitting layer 81. An insulating layer 88, an insulating layer 89, the color filter 32, and the second substrate 22 are laminated on the upper electrode 82 in this order. FIG. 30 illustrates the sectional structure of the above-mentioned one subpixel SPix, and the subpixels SPix including the self-light emitting layer 81 are arranged.

The lower electrode 83 is electrically coupled to the drain electrode 73 of the display switching element Trd via a contact hole H9. The lower electrode 83 is provided to correspond to each subpixel SPix, and is a conductor serving as an anode of the organic light-emitting diode. The lower electrode 83 is a translucent electrode that uses a translucent conductive material such as ITO. The self-light emitting layer 81 includes an organic material, and includes a hole injection layer, a hole transport layer, a light emitting layer, an electron transport layer, and an electron injection layer (not illustrated). The upper electrode 82 is a conductor serving as a cathode of the organic light-emitting diode. The upper electrode 82 is a translucent electrode that uses a translucent conductive material such as ITO. Without being limited thereto, the translucent conductive material used for the upper electrode 82 may be a conductive material having a different composition such as indium zinc oxide (IZO). Alternatively a thin film metal layer that is formed to be extremely thin to have light transmissivity may be employed for the upper electrode 82. The reflection layer 84 is provided below the self-light emitting layer 81, and is formed of a metallic glossy material that reflects light from the self-light emitting layer 81, such as silver, aluminum, and gold. The insulating layer 87 is an insulating layer called dam, for partitioning the subpixels SPix. The insulating layer 88 is a sealing layer for sealing the upper electrode 82, and a silicon oxide or a silicon nitride can be used. The insulating layer 89 is a planarization layer for inhibiting a step generated by the insulating layer 87, and a silicon oxide, a silicon nitride or the like can be used as the insulating layer 89.

With the configuration described above, light from the self-light emitting layer 81 is transmitted through the color filter 32 and exits from the first surface 22a of the second substrate 22 to reach the eyes of an observer. The lighting amount of the self-light emitting layer 81 is controlled for each subpixel SPix, and an image is displayed on the first surface 22a of the second substrate 22 serving as the display surface.

Without being limited to the above-mentioned example, the lower electrode 83 may be a cathode and the upper electrode 82 may be an anode. In this case, the polarity of the display switching element Trd electrically coupled to the lower electrode 83 can be changed as appropriate, and the lamination order of the carrier injection layers (hole injection layer and electron injection layer), the carrier transport layers (hole transport layer and electron transport layer), and the light emitting layer can be changed as appropriate.

Also in the seventh embodiment, the detection electrode 25 is provided on the first surface 21Aa of the first substrate 21A, and the detection electrode 25 is electrically coupled to the drain electrode 63 of the detection switching element Trs. Thus, a fingerprint of a finger in contact with the second surface 21Ab of the first substrate 21A can be detected on the basis of an electrostatic capacitance change in the detection electrode 25. Specifically, the second surface 21Ab of the first substrate 21A functions as the detection surface of the fingerprint detection unit 30, and the first surface 22a of the second substrate 22, which is located on the opposite side of the detection surface across the detection electrode 25, functions as the display surface of the display panel 20.

Figure 31:
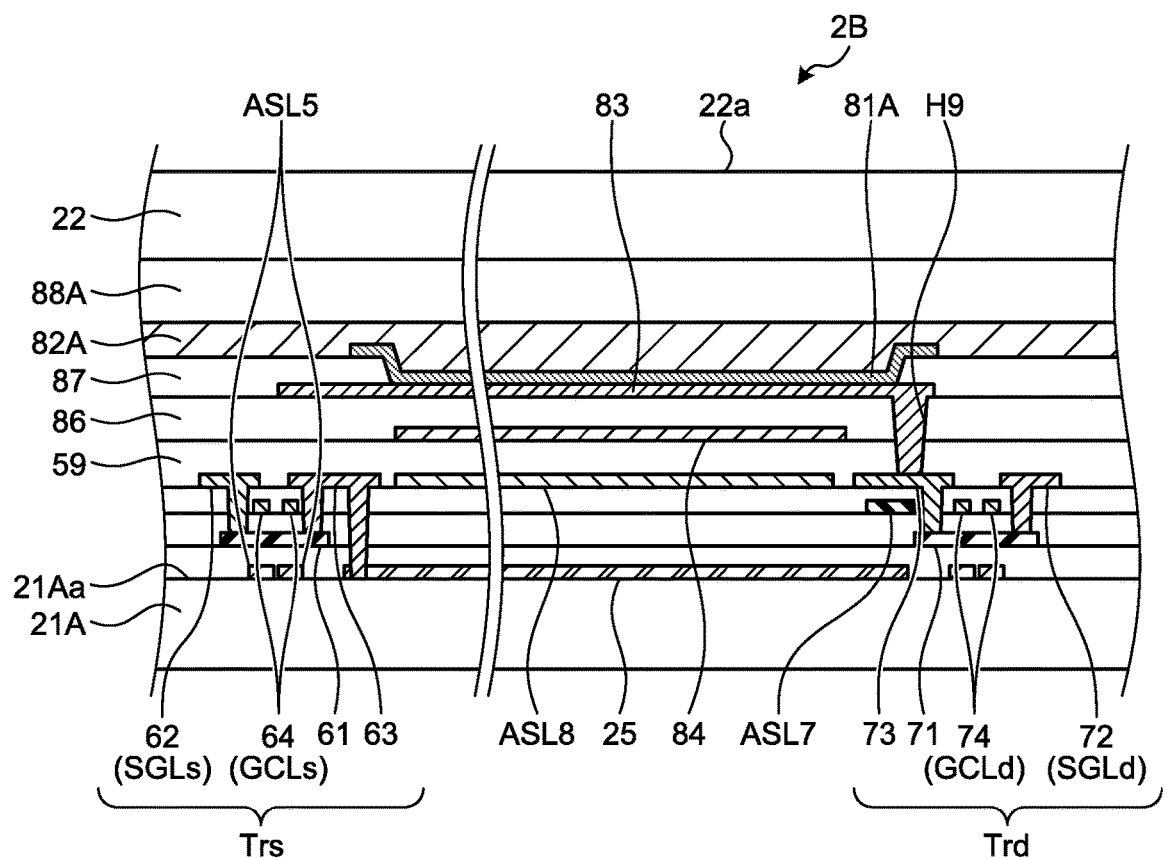
FIG. 31 is a sectional view illustrating a sectional structure of a display device according to a modification of the seventh embodiment.

FIG. 31 is a sectional view illustrating a sectional structure of a display device according to a modification of the seventh embodiment. As illustrated in FIG. 31, in a display device 2B according to the present modification, a self-light emitting layer 81A is provided on the lower electrode 83, and an upper electrode 82A is provided on the self-light emitting layer 81. The second substrate 22 is provided above the upper electrode 82A with a sealing layer 88A interposed therebetween. In the present modification, the color filter 32 illustrated in FIG. 30 is not provided.

The self-light emitting layers 81A are formed of light emitting materials that are different depending on the subpixels SPix, and display light of colors of red (R), green (G), and blue (B). The self-light emitting layer 81A for displaying red (R) is provided to correspond to the subpixel SPix for displaying red (R). The self-light emitting layer 81A for displaying green (G) is provided to correspond to the subpixel SPix for displaying green (G). The self-light emitting layer 81A for displaying blue (B) is provided to correspond to the subpixel SPix for displaying blue (B). In this manner, color display of the display device 2B can be implemented.

Also in the display device 2B according to the present modification, the configurations of the detection electrode 25, the detection switching element Trs, the display switching element Trd, and various kinds of wire coupled thereto are the same as in the display device 2A in FIG. 30. Thus, a fingerprint of a finger in contact with the second surface 21Ab of the first substrate 21A can be detected.

Eighth Embodiment

Figure 32:
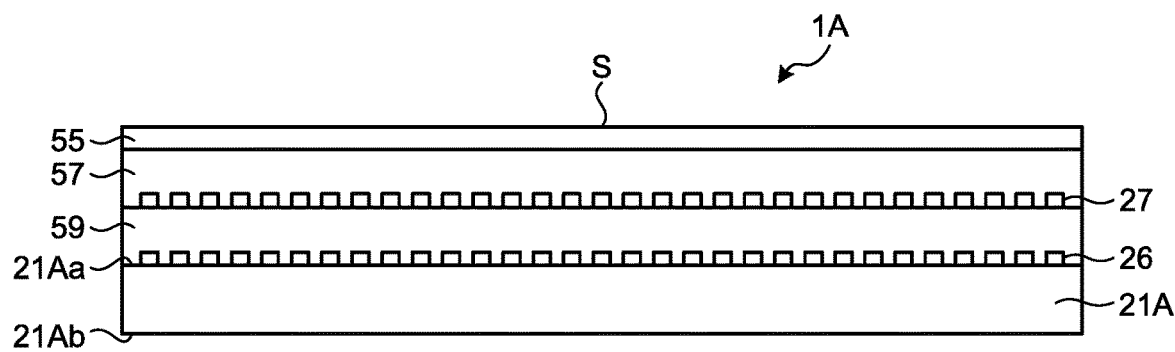
FIG. 32 is a schematic sectional view schematically illustrating a sectional structure of a fingerprint detection device according to an eighth embodiment.

FIG. 32 is a schematic sectional view schematically illustrating a sectional structure of a fingerprint detection device according to an eighth embodiment. As illustrated in FIG. 32, a fingerprint detection device 1A includes a first substrate 21A, first detection electrodes 26, and second detection electrodes 27. The first substrate 21A has a first surface 21Aa and a second surface 21Ab on the opposite side of the first surface 21Aa. The first detection electrodes 26 are provided on the first surface 21Aa of the first substrate 21A, and the second detection electrodes 27 are provided above the first detection electrodes 26 with a planarization layer 59 interposed therebetween. A protective layer 57 for protecting the second detection electrodes 27 may be provided on the second detection electrodes 27.

The first detection electrodes 26 are detection electrodes for detecting a fingerprint of a finger in contact with the second surface 21Ab. The second detection electrodes 27 are detection electrodes for detecting a fingerprint of a finger in contact with another detection surface S provided on the first surface 21Aa side. The fingerprint detection device 1A in the eighth embodiment is capable of detecting fingerprints on both of the first surface 21Aa and the second surface 21Ab of the first substrate 21A.

Figure 33:
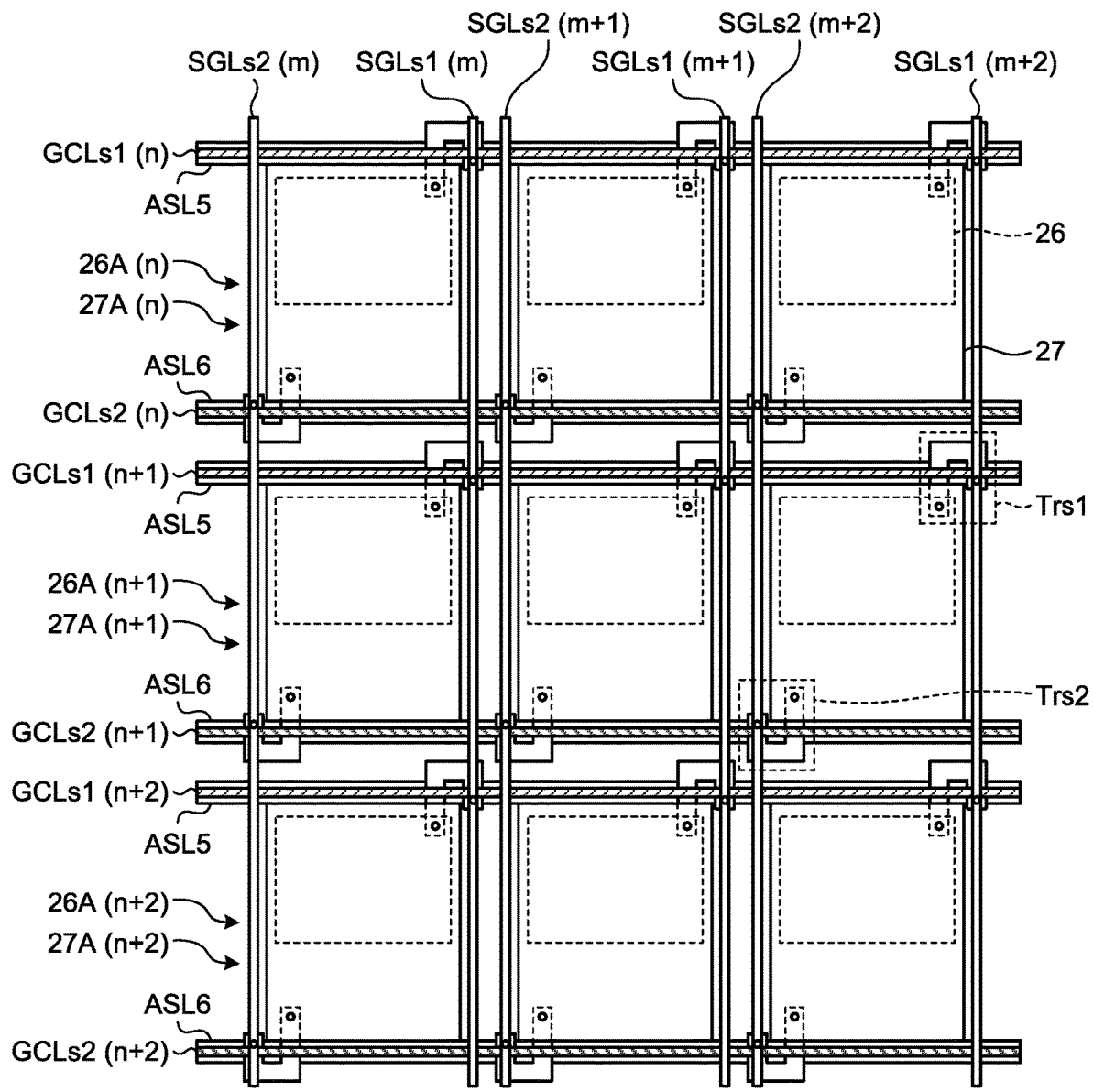
FIG. 33 is a plan view illustrating a planar structure of the fingerprint detection device according to the eighth embodiment.
Figure 34:
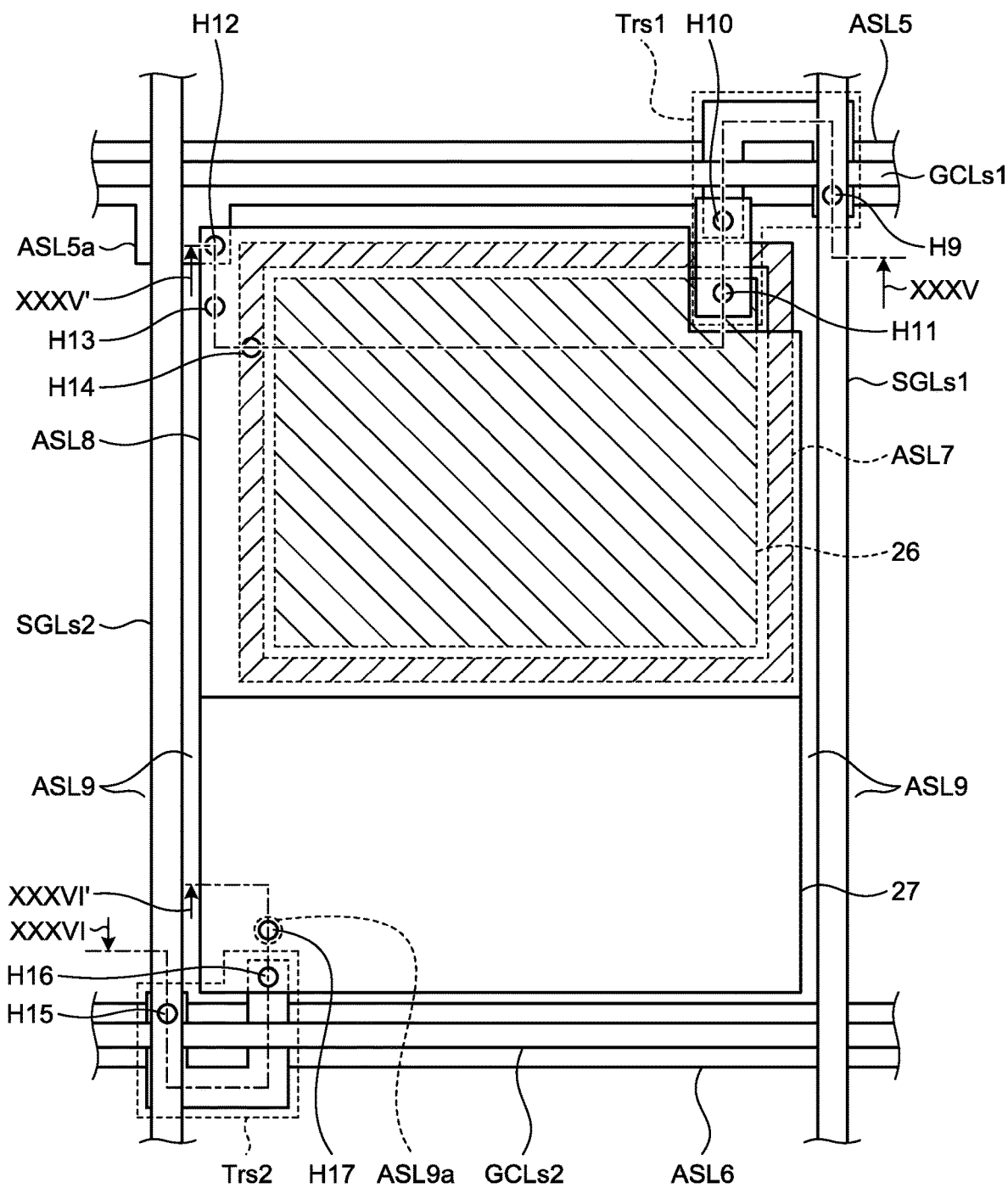
FIG. 34 is an enlarged plan view of a first detection electrode and a second detection electrode.
Figure 35:
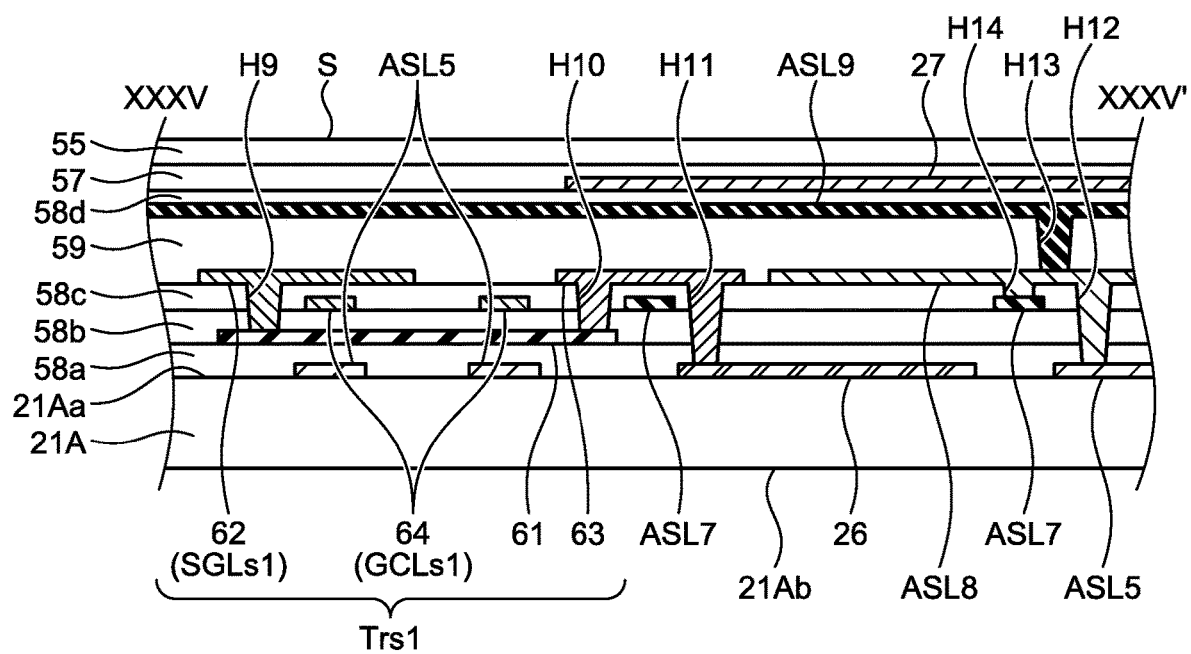
FIG. 35 is a sectional view taken along the line XXXV-XXXV' in FIG. 34.
Figure 36:
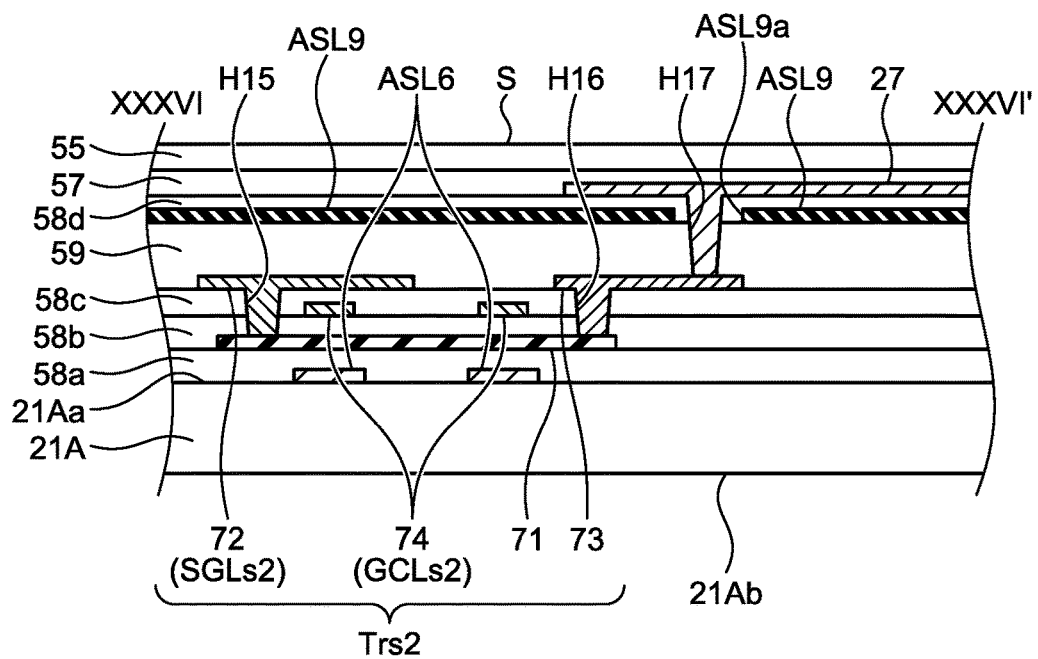
FIG. 36 is a sectional view taken along the line XXXVI-XXXVI' in FIG. 34.

Next, the configurations of the first detection electrode 26 and the second detection electrode 27 are described with reference to FIG. 33 to FIG. 36. FIG. 33 is a plan view illustrating the planar structure of the fingerprint detection device according to the eighth embodiment. FIG. 34 is an enlarged plan view of the first detection electrode and the second detection electrode. FIG. 35 is a sectional view taken along the line XXXV-XXXV' in FIG. 34. FIG. 36 is a sectional view taken along the line XXXVI-XXXVI' in FIG. 34.

As illustrated in FIG. 33, a first detection gate line GCLs1 is provided along the row direction, and the first detection gate lines GCLs1 are arranged with intervals in the column direction. A first detection data line SGLs1 is provided along the column direction, and the first detection data lines SGLs1 are arranged with intervals in the row direction. A second detection gate line GCLs2 is provided in parallel to the first detection gate line GCLs1 and provided along the row direction, and the second detection gate lines GCLs2 are arranged with intervals in the column direction. A second detection data line SGLs2 is provided in parallel to the first detection data line SGLs1 and provided along the column direction, and the second detection data lines SGLs2 are arranged with intervals in the row direction. The first detection electrode 26 and the second detection electrode 27 are arranged in a region surrounded by the first detection gate line GCLs1, the first detection data line SGLs1, the second detection gate line GCLs2, and the second detection data line SGLs2. The first detection electrode 26 and the second detection electrode 27 each have a substantially rectangular shape and are provided to overlap with each other. The overlapping first detection electrodes 26 and second detection electrodes 27 are arranged in a matrix pattern.

A first detection switching element Trs1 is provided near the position at which the first detection gate line GCLs1 and the first detection data line SGLs1 intersect with each other. The first detection switching element Trs1 is provided at the position corresponding to one first detection electrode 26.

A second detection switching element Trs2 is provided near the position at which the second detection gate line GCLs2 and the second detection data line SGLs2 intersect with each other. The second detection switching element Trs2 is provided at the position corresponding to one second detection electrode 27.

The first detection switching element Trs1 and the second detection switching element Trs2 are formed of thin film transistors. In the present example, the first detection switching element Trs1 and the second detection switching element Trs2 are formed of n-channel MOS TFT elements.

In the fingerprint detection device 1A, similarly to the fingerprint detection unit 30 illustrated in FIG. 1, a gate driver (not illustrated) for supplying the scanning signal Vscan to each of the first detection gate line GCLs1 and the second detection gate line GCLs2 and a detection electrode driver (not illustrated) for supplying the drive signal Vf to each of the first detection data line SGLs1 and the second detection data line SGLs2 are provided. Similarly to the detection unit 40 illustrated in FIG. 2, detection signals from the first detection electrode 26 and the second detection electrode 27 are supplied to the detection unit. The scanning signals Vscan may be supplied from a single gate driver. Two gate drivers, specifically, a gate driver for supplying a scanning signal Vscan1 to the first detection gate line GCLs1 and a gate driver for supplying a scanning signal Vscan2 to the second detection gate line GCLs2 may be provided. Also for the detection electrode driver, the drive signal Vf may be supplied from a single detection electrode driver, or the drive signal Vf may be supplied from each of two detection electrode drivers.

The gate driver sequentially selects the first detection gate lines GCLs1. The gate driver supplies the scanning signal Vscan to the first detection switching elements Trs1 through the selected first detection gate line GCLs1. In this manner, the gate driver selects one line (one horizontal line) of the first detection electrodes 26 as a first detection electrode block 26A to be detected. The first detection electrode block 26A includes a plurality of first detection electrodes 26 arranged in the row direction. The detection electrode driver (not illustrated) supplies the drive signal Vf to each first detection electrode 26 in the first detection electrode block 26A through the first detection data line SGLs1. In this manner, a detection signal is output to the detection unit (not illustrated) through the first detection data line SGLs1 in accordance with an electrostatic capacitance change in the first detection electrode 26.

Similarly, the gate driver sequentially selects the second detection gate lines GCLs2. The gate driver supplies the scanning signal Vscan to the second detection switching elements Trs2 through the selected second detection gate line GCLs2. In this manner, the gate driver selects one line (one horizontal line) of the second detection electrodes 27 as a second detection electrode block 27A to be detected. The second detection electrode block 27A includes a plurality of second detection electrodes 27 arranged in the row direction. The detection electrode driver (not illustrated) supplies the drive signal Vf to each second detection electrode 27 in the second detection electrode block 27A through the second detection data line SGLs2. In this manner, a detection signal is output to the detection unit (not illustrated) through the second detection data line SGLs2 in accordance with an electrostatic capacitance change in the second detection electrode 27. In this manner, a fingerprint of a finger in contact or in proximity is detected in accordance with the fundamental principle of self-capacitance fingerprint detection described above. The first detection electrode 26 and the second detection electrode 27 each correspond to the detection electrode E1 in the fundamental principle of self-capacitance fingerprint detection described above.

As illustrated in FIG. 34, the fifth wire ASL5 is provided to overlap with the first detection gate line GCLs1 along the first detection gate line GCLs1. The sixth wire ASL6 is provided to overlap with the second detection gate line GCLs2 along the second detection gate line GCLs2. The fifth wire ASL5 and the sixth wire ASL6 are provided to be continuous correspondingly to the first detection electrodes 26 and second detection electrodes 27 arranged in the row direction.

As illustrated in FIG. 34, the first detection electrode 26 has an area smaller than that of the second detection electrode 27. The second detection electrode 27 protrudes to a position that does not overlap with the first detection electrode 26, and covers the entire surface of the first detection electrode 26 except for a connection portion of the first detection electrode 26 and the first detection switching element Trs1. The second detection electrode 27 is provided to further overlap with the seventh wire ASL7, the conductive layer ASL8, and a conductive layer ASL9. The seventh wire ASL7 is provided to surround the periphery of the first detection electrode 26. The conductive layer ASL8 overlaps with the entire surfaces of the first detection electrode 26 and the seventh wire ASL7 except for a connection portion with the first detection switching element Trs1. The conductive layer ASL9 is provided continuously so as to overlap with the first detection electrodes 26 and the second detection electrodes 27 arranged in a matrix pattern.

In the eighth embodiment, the detection electrode driver supplies the fifth wire ASL5, the sixth wire ASL6, the seventh wire ASL7, and the conductive layer ASL8 with the signal Vsg1 that is synchronized with the drive signal Vf and has the same waveform as the drive signal Vf. Thus, the parasitic capacitances between the first detection gate line GCLs1 and the first detection electrode 26 and between the second detection gate line GCLs2 and the second detection electrode 27 are reduced to suppress detection errors and the deterioration in detection sensitivity. A drive circuit that is not provided in the detection electrode driver may be provided as appropriate to supply the signal Vsg1. The conductive layer ASL8 is provided between the layer of the first detection electrode 26 and the layer of the second detection electrode 27, and hence capacitive coupling between the first detection electrode 26 and the second detection electrode 27 is suppressed to suppress detection errors and the deterioration in detection sensitivity. In this manner, the fingerprint detection operation based on an electrostatic capacitance change in the first detection electrode 26 and the fingerprint detection operation based on an electrostatic capacitance change in the second detection electrode 27 can be performed independently.

Next, the connection structure of the first detection electrode 26, the second detection electrode 27, each wire, and the conductive layers is described. As illustrated in FIG. 35, the semiconductor layer 61 in the first detection switching element Trs1 is electrically coupled to the first detection data line SGLs1 via the contact hole H9. The semiconductor layer 61 is bent so as to intersect with the first detection gate line GCLs1 a plurality of times in a plan view. The semiconductor layer 61 is electrically coupled to the drain electrode 63 via a contact hole H10. The drain electrode 63 intersects with the seventh wire ASL7 and extends to a position overlapping with the first detection electrode 26, and is electrically coupled to the first detection electrode 26 via a contact hole H11. In this manner, the first detection electrode 26 is electrically coupled to the first detection data line SGLs1 through the first detection switching element Trs1.

As illustrated in FIG. 35, the fifth wire ASL5 and the first detection electrode 26 are provided on the first surface 21Aa of the first substrate 21A. The insulating layer 58a is provided on the fifth wire ASL5 and the first detection electrode 26. The semiconductor layer 61 is provided on the insulating layer 58a. The insulating layer 58b is provided on the semiconductor layer 61, and the first detection gate line GCLs1 and the seventh wire ASL7 are provided on the insulating layer 58b. The insulating layer 58c is provided on the first detection gate line GCLs1 and the seventh wire ASL7, and the first detection data line SGLs1, the drain electrode 63, and the conductive layer ASL8 are provided on the insulating layer 58c. The planarization layer 59 is provided on the first detection data line SGLs1, the drain electrode 63, and the conductive layer ASL8, the conductive layer ASL9 is provided on the planarization layer 59, and the second detection electrode 27 is provided above the conductive layer ASL9 with an insulating layer 58d interposed therebetween. The protective layer 57 and a protective layer 55 for protecting the second detection electrode 27 are provided on the second detection electrode 27. The top surface of the protective layer 55 is the detection surface S.

As illustrated in FIG. 35, the fifth wire ASL5 is electrically coupled to the conductive layer ASL8 via a contact hole H12. Thus, when the above-mentioned signal Vsg1 is supplied to the fifth wire ASL5, the signal Vsg1 is supplied to the conductive layer ASL8 through the tab portion ASL5a (refer to FIG. 34). The seventh wire ASL7 is coupled to the conductive layer ASL8 via a contact hole H14, and the conductive layer ASL9 is coupled to the conductive layer ASL8 via a contact hole H13. With this configuration, the signal Vsg1 supplied to the fifth wire ASL5 is supplied to the seventh wire ASL7 and the conductive layer ASL9 through the conductive layer ASL8.

As illustrated in FIG. 36, the semiconductor layer 71 in the second detection switching element Trs2 is electrically coupled to the second detection data line SGLs2 via a contact hole H15. The semiconductor layer 71 is bent so as to intersect with the second detection gate line GCLs2 a plurality of times in a plan view. The semiconductor layer 71 is electrically coupled to the drain electrode 73 via a contact hole H16. As described above, the conductive layer ASL9 is provided continuously so as to overlap with the first detection electrodes 26 and the second detection electrodes 27 arranged in a matrix pattern. An opening ASL9a is provided in the conductive layer ASL9, and the drain electrode 73 is electrically coupled to the second detection electrode 27 via a contact hole H17 that passes through the opening ASL9a. In this manner, the second detection electrode 27 is electrically coupled to the second detection data line SGLs2 through the second detection switching element Trs2.

As illustrated in FIG. 36, the sixth wire ASL6 is provided on the first surface 21Aa of the substrate 21. The insulating layer 58a is provided on the sixth wire ASL6, and the semiconductor layer 61 is provided on the insulating layer 58a. The insulating layer 58b is provided on the semiconductor layer 61, and the second detection gate line GCLs2 is provided on the insulating layer 58b. The insulating layer 58c is provided on the second detection gate line GCLs2, and the second detection data line SGLs2 and the drain electrode 73 are provided on the insulating layer 58c. The planarization layer 59 is provide on the second detection data line SGLs2 and the drain electrode 73, and the second detection electrode 27 is provided above the planarization layer 59 with the conductive layer ASL9 and the insulating layer 58d interposed therebetween. The protective layer 57 for protecting the second detection electrode 27 is provided on the second detection electrode 27.

As illustrated in FIG. 35 and FIG. 36, the first detection switching element Trs1 and the second detection switching element Trs2 are provided in the same layer. Without being limited thereto, the first detection switching element Trs1 and the second detection switching element Trs2 may be provided in different layers. The conductive layer ASL9 is disposed between the first detection electrode 26 and the second detection electrode 27, and is provided continuously so as to overlap with the second detection electrodes 27 arranged in the row direction and the column direction.

Figure 37:
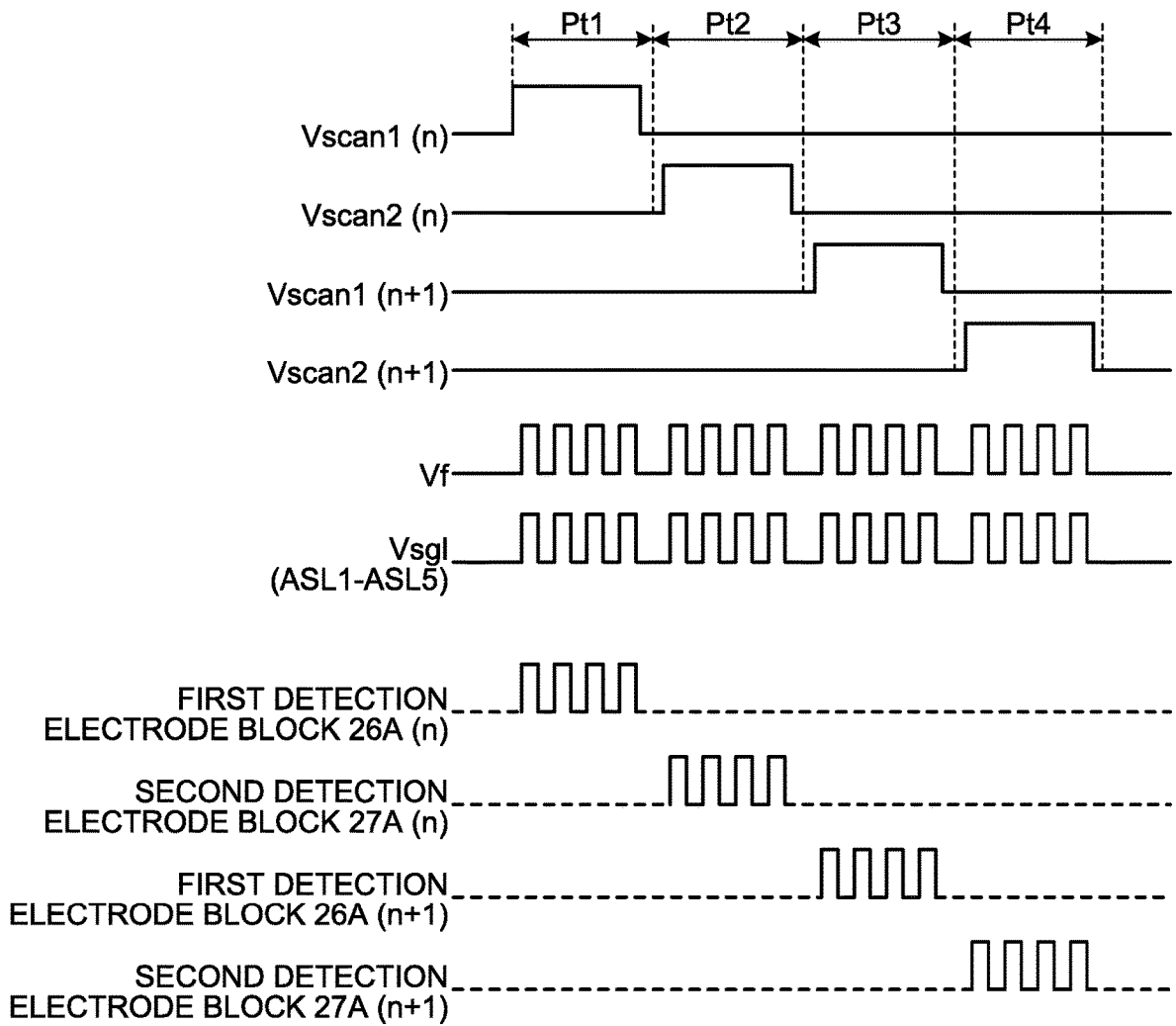
FIG. 37 is a timing waveform diagram illustrating an operation example of the fingerprint detection device according to the eighth embodiment.

Next, a drive method for the fingerprint detection device 1A according to the eighth embodiment is described. FIG. 37 is a timing waveform diagram illustrating an operation example of the fingerprint detection device according to the eighth embodiment. As illustrated in FIG. 37, detection periods Pt1, Pt2, Pt3, and Pt4 during which the fingerprint detection operation is performed are arranged in a time division manner.

As illustrated in FIG. 37, in the detection period Pt1, the first detection gate line GCLs1($n$) in the n-th row (refer to FIG. 33) is selected, and the scanning signal Vscan1($n$) is turned on (High level). First detection switching elements Trs1 corresponding to the first detection electrode block 26A(n) in the n-th row are turned on (open). Accordingly, the drive signal Vf is supplied to the respective first detection electrodes 26 in the first detection electrode block 26A(n) through the first detection data lines SGLs1($m$), SGLs1($m$+1), and SGLs1($m$+2). The detection signal Vdet is output to the detection unit from each first detection electrode 26 in the first detection electrode block 26A(n) on the basis of the fundamental principle of self-capacitance fingerprint detection described above. In this manner, a fingerprint of a finger in contact with the second surface 21Ab of the first substrate 21A can be detected.

In the detection period Pt1, a first detection electrode block 26A(n+1), a second detection electrode block 27A(n), and a second detection electrode block 27A(n+1) that are not selected as detection targets are in the floating state in which a fixed potential is not supplied. Thus, parasitic capacitances between the first detection electrode block 26A(n) selected as a detection target and the first detection electrode block 26A(n+1), the second detection electrode block 27A(n), and the second detection electrode block 27A(n+1) that are not selected as detection targets can be suppressed.

Next, in the detection period Pt2, the second detection gate line GCLs2($n$) in the n-th row is selected, and the scanning signal Vscan2($n$) is turned on (High level). Second detection switching elements Trs2 in the second detection electrode block 27A(n) in the n-th row are turned on (open). Accordingly, the drive signal Vf is supplied to the respective second detection electrodes 27 in the second detection electrode block 27A(n) through the second detection data lines SGLs2($m$), SGLs2($m$+1), and SGLs2($m$+2), and the detection signal Vdet is output to the detection unit from each second detection electrode 27 in the second detection electrode block 27A(n). In this manner, a fingerprint of a finger in contact with the detection surface S on the first surface 21Aa side of the first substrate 21A can be detected.

In the detection period Pt2, the first detection electrode blocks 26A(n) and 26A(n+1) and the second detection electrode block 27A(n+1) are in the floating state in which a fixed potential is not supplied.

In the detection period Pt3, the first detection gate line GCLs1($n$+1) in the (n+1)th row is selected, and the scanning signal Vscan1($n$+1) is turned on (High level). First detection switching elements Trs1 corresponding to the first detection electrode block 26A(n+1) in the (n+1)th row are turned on (open). Accordingly, the drive signal Vf is supplied to the respective first detection electrodes 26 in the first detection electrode block 26A(n+1) through the first detection data lines SGLs1($m$), SGLs1($m$+1), and SGLs1($m$+2). The detection signal Vdet is output to the detection unit from each first detection electrode 26 in the first detection electrode block 26A(n+1) on the basis of the fundamental principle of self-capacitance fingerprint detection described above. In this manner, a fingerprint of a finger in contact with the second surface 21Ab of the first substrate 21A can be detected.

Next, in the detection period Pt4, the second detection gate line GCLs2($n$+1) in the (n+1)th row is selected, and the scanning signal Vscan2($n$+1) is turned on (High level). Second detection switching elements Trs2 in the second detection electrode block 27A(n+1) in the (n+1) row are turned on (open). Accordingly, the drive signal Vf is supplied to the respective second detection electrodes 27 in the second detection electrode block 27A(n+1) through the second detection data lines SGLs2($m$), SGLs2($m$+1), and SGLs2($m$+2), and the detection signal Vdet is output to the detection unit from each second detection electrode 27 in the second detection electrode block 27A(n+1). In this manner, a fingerprint of a finger in contact or in proximity on the first surface 21Aa side of the first substrate 21A can be detected. This operation is sequentially repeated to carry out the fingerprint detection operation on the entire one detection surface S on the first surface 21Aa side of the first substrate 21A and on the entire other detection surface that is the second surface 21Ab.

In the detection periods Pt1 to Pt4, the fifth wire ASL5, the sixth wire ASL6, the seventh wire ASL7, the conductive layer ASL8, and the conductive layer ASL9 are supplied with the signal Vsg1. Thus, the parasitic capacitances between each detection electrode in the detection electrode block selected as a detection target and the first detection gate line GCLs1, the second detection gate line GCLs2, and the like are suppressed to suppress the deterioration in detection sensitivity.

In the eighth embodiment, in the detection periods Pt1 and Pt3, a fingerprint of a finger in contact or in proximity on the second surface 21Ab side of the first substrate 21A is detected on the basis of an electrostatic capacitance change in the first detection electrode 26. In the detection periods Pt2 and Pt4, a fingerprint of a finger in contact or in proximity on the first surface 21Aa side of the first substrate 21A is detected on the basis of an electrostatic capacitance change in the second detection electrode 27. In this manner, the fingerprint detection on the first surface 21Aa side of the first substrate 21A and the fingerprint detection on the second surface 21Ab side are alternatingly performed in a time division manner, but the configuration is not limited thereto. For example, after the fingerprint detection on the first surface 21Aa side of the first substrate 21A is performed continuously in a plurality of periods, the fingerprint detection on the second surface 21Ab side of the first substrate 21A may be performed continuously in a plurality of periods. The fingerprint detection on the first surface 21Aa side of the first substrate 21A and the fingerprint detection on the second surface 21Ab side may be performed in the same period.

First Modification

Figure 38:
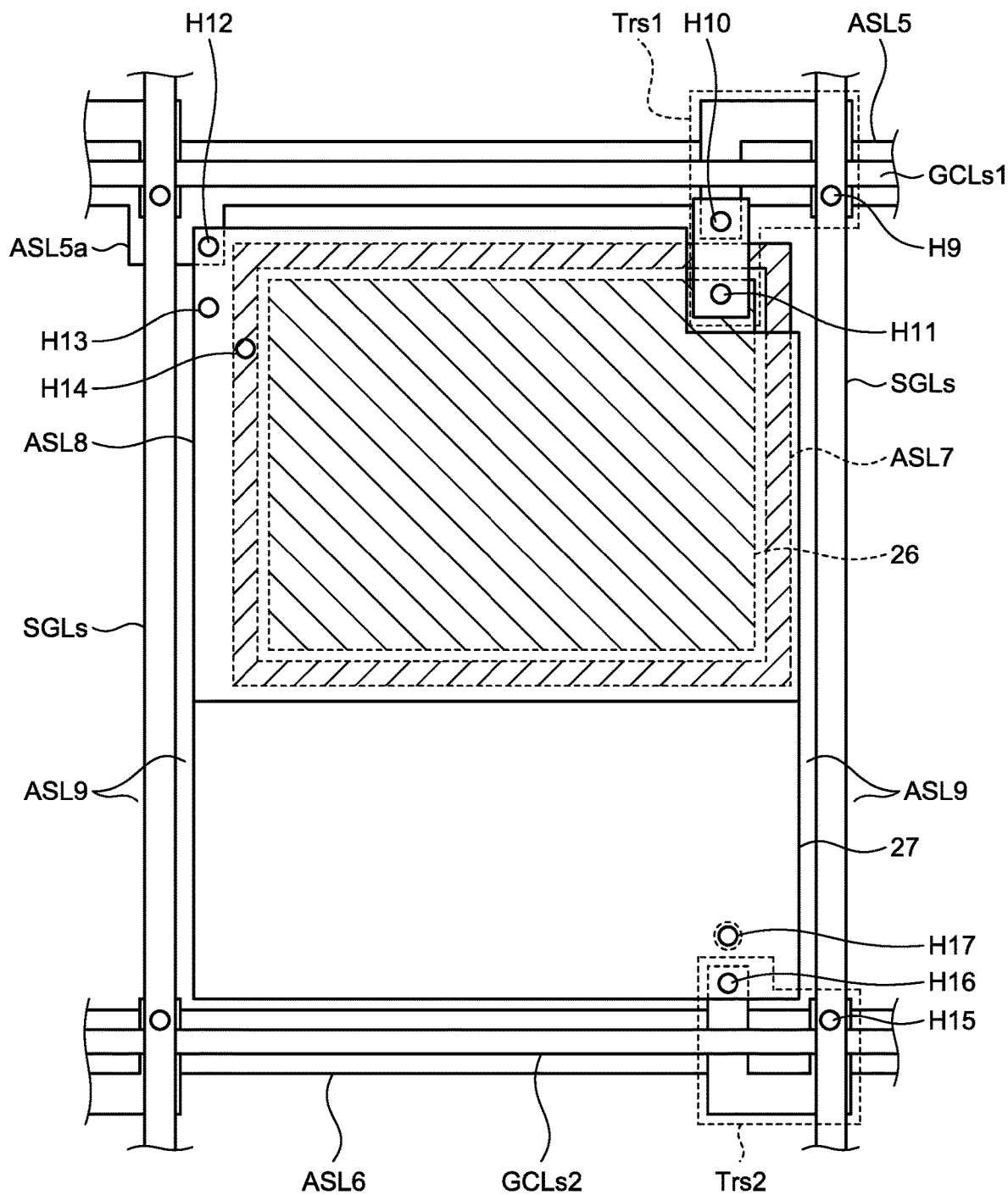
FIG. 38 is an enlarged plan view of a first detection electrode and a second detection electrode in a fingerprint detection device according to a first modification of the eighth embodiment.

The fingerprint detection device 1A is not limited to the configuration illustrated in FIG. 34. FIG. 38 is an enlarged plan view of a first detection electrode and a second detection electrode in a fingerprint detection device according to a first modification of the eighth embodiment.

As illustrated in FIG. 38, in the first modification, a first detection switching element Trs1 and a second detection switching element Trs2 are provided correspondingly to one detection data line SGLs. The first detection switching element Trs1 is provided at an intersection part between the detection data line SGLs and a first detection gate line GCLs1, and the second detection switching element Trs2 is provided at an intersection part between the detection data line SGLs and a second detection gate line GCLs2. In this manner, the first detection electrode 26 and the second detection electrode 27 are supplied with the drive signal Vf through the common detection data line SGLs.

In this case, similarly to the drive method illustrated in FIG. 37, the first detection switching element Trs1 and the second detection switching element Trs2 are switched between on and off by scanning signals Vscan1 and Vscan2, respectively. Consequently, the fingerprint detection on the first surface 21Aa side of the first substrate 21A and the fingerprint detection on the second surface 21Ab side can be alternatingly performed in a time division manner. By setting the first detection switching element Trs1 and the second detection switching element Trs2 to the on state in the same period, the same drive signal Vf is supplied to the first detection electrode 26 and the second detection electrode 27. In this manner, the fingerprint detection on the first surface 21Aa side of the first substrate 21A and the fingerprint detection on the second surface 21Ab side can be simultaneously performed in the same period.

Second Modification

Figure 39:
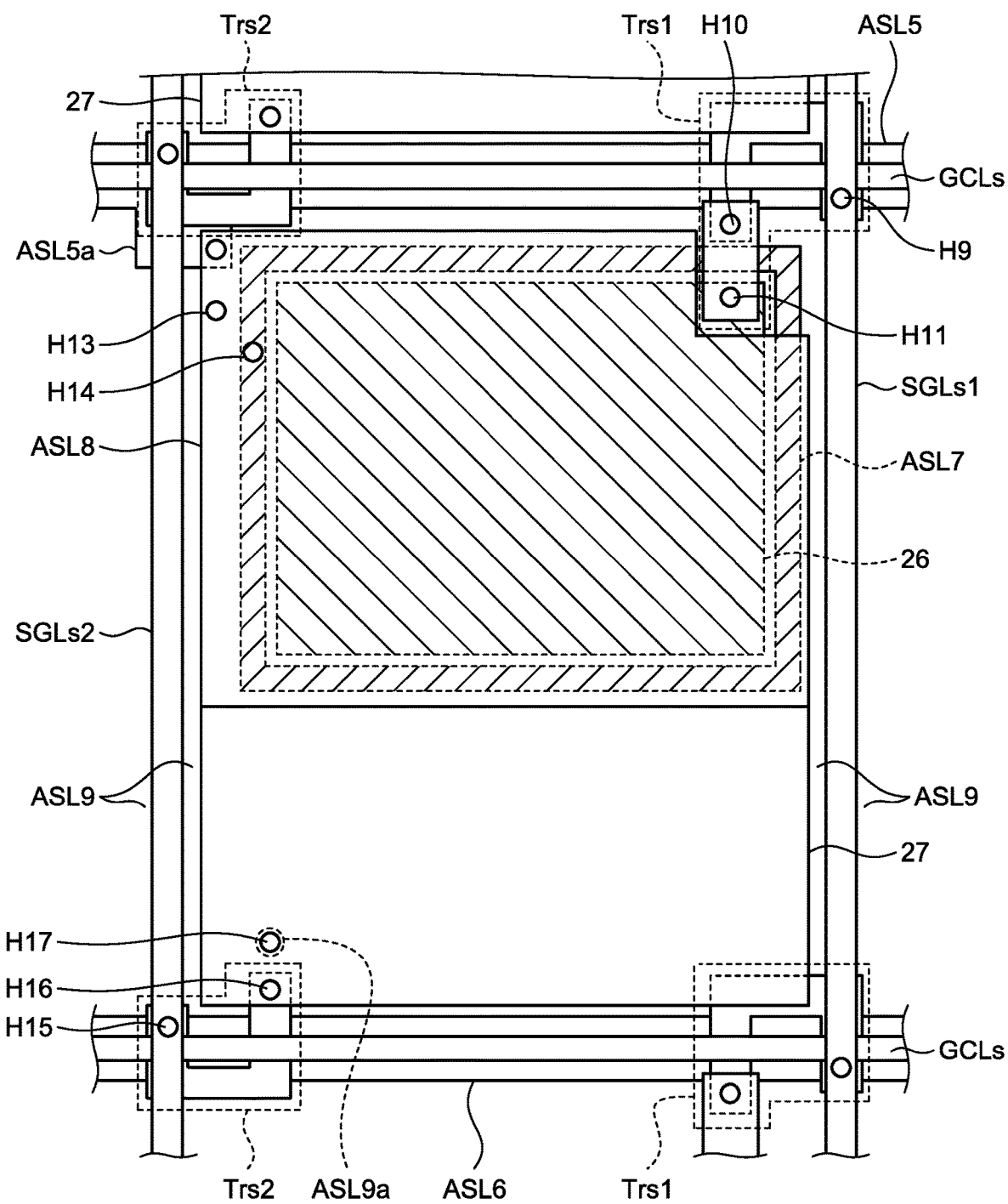
FIG. 39 is an enlarged plan view of a first detection electrode and a second detection electrode in a fingerprint detection device according to a second modification of the eighth embodiment.

FIG. 39 is an enlarged plan view of a first detection electrode and a second detection electrode in a fingerprint detection device according to a second modification of the eighth embodiment. As illustrated in FIG. 39, in the second modification, a first detection switching element Trs1 and a second detection switching element Trs2 are provided to correspond to one detection gate line GCLs. The first detection switching element Trs1 is provided at an intersection part between the detection gate line GCLs and a first detection data line SGLs1, and the second detection switching element Trs2 is provided at an intersection part between the detection gate line GCLs and a second detection data line SGLs2. In this manner, the first detection switching element Trs1 and the second detection switching element Trs2 are supplied with the scanning signal Vscan through the common detection gate line GCLs.

In this case, the first detection switching element Trs1 and the second detection switching element Trs2 are switched between on and off by the same scanning signal Vscan. Thus, the first detection electrode 26 is supplied with the drive signal Vf through the first detection data line SGLs1 and the second detection electrode 27 is supplied with the drive signal Vf through the second detection data line SGLs2 at the same time in the same detection period. Consequently, in the second modification, the fingerprint detection on one detection surface S on the first surface 21Aa side and the fingerprint detection on the other detection surface as the second surface 21Ab are simultaneously performed in the same period.

Ninth Embodiment

Figure 40:
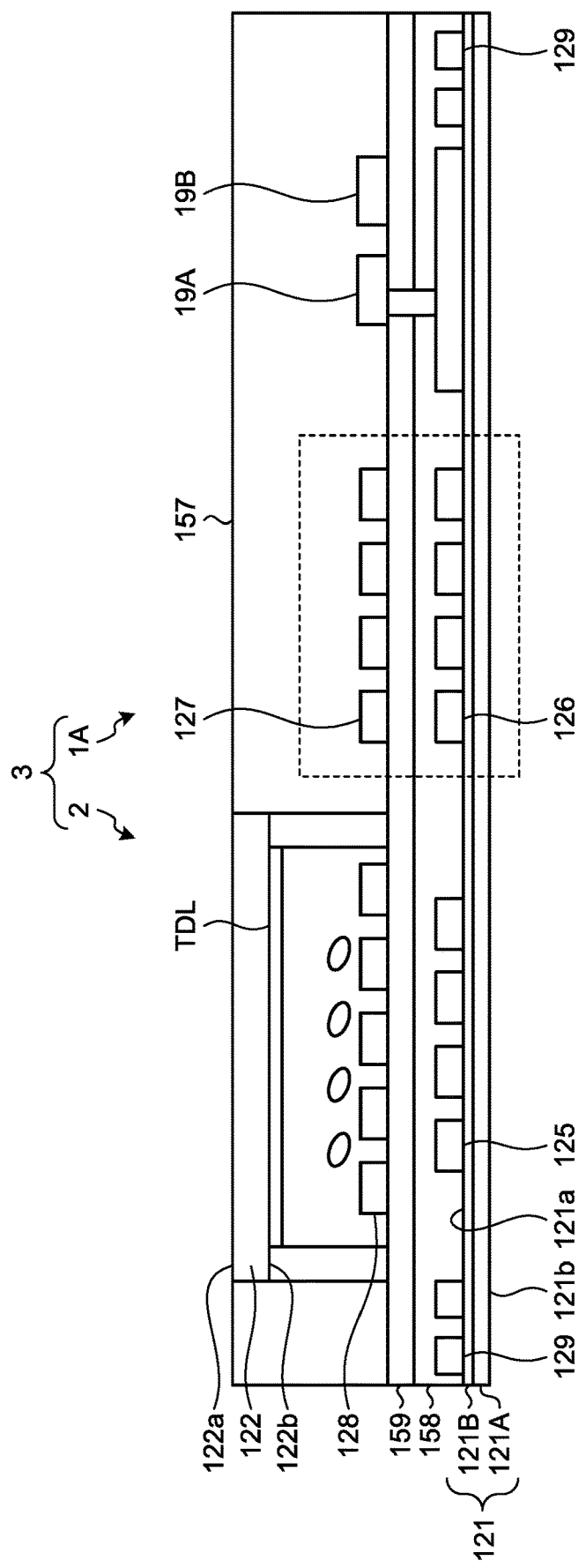
FIG. 40 is a schematic sectional view schematically illustrating a sectional structure of a display apparatus according to a ninth embodiment.
Figure 41:
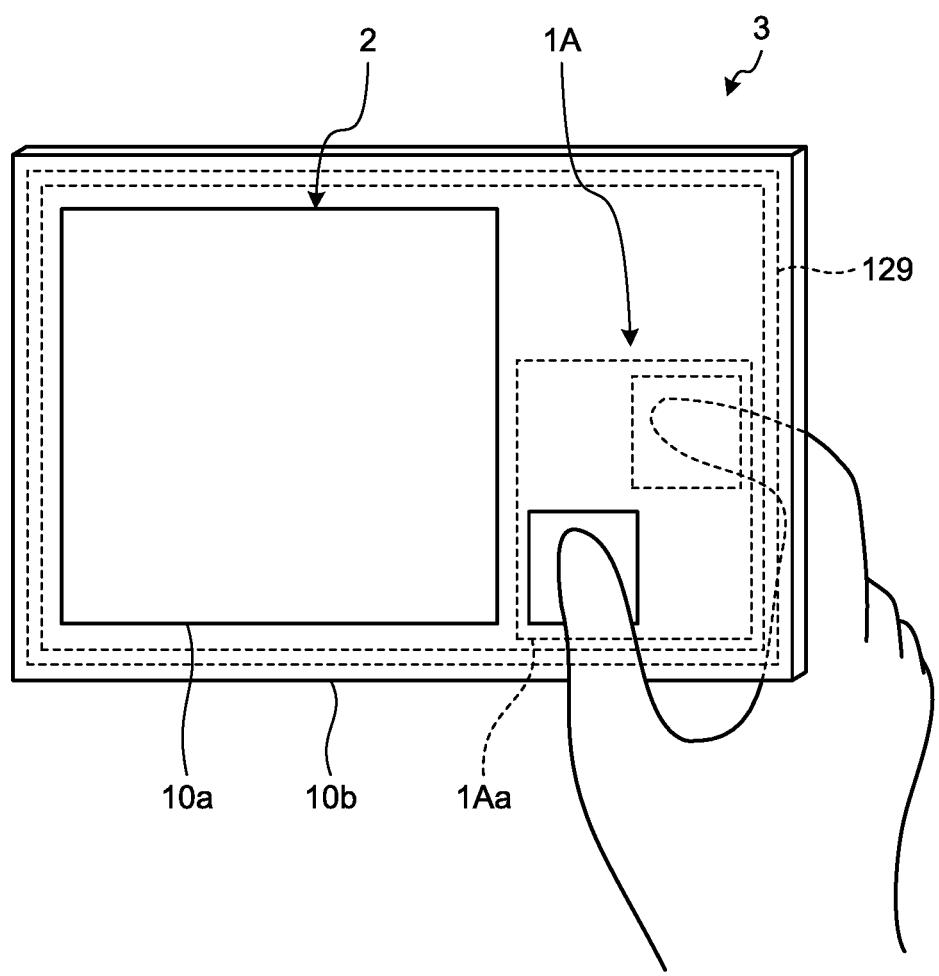
FIG. 41 is a perspective view of the display apparatus according to the ninth embodiment, for describing the state in which fingerprint detection operation is used.

FIG. 40 is a schematic sectional view schematically illustrating a sectional structure of a display apparatus according to a ninth embodiment. FIG. 41 is a perspective view of the display apparatus according to the ninth embodiment, for describing the state in which fingerprint detection operation is performed.

A display apparatus 3 in the ninth embodiment includes a display device 2 and a fingerprint detection device 1A. The display device 2 is a display device described in the fifth embodiment to the seventh embodiment, and the fingerprint detection device 1A is a fingerprint detection device described in the eighth embodiment. For example, the display apparatus 3 in the ninth embodiment can be used as a card-type multifunctional display apparatus as illustrated in FIG. 41. As illustrated in FIG. 40, the display device 2 and the fingerprint detection device 1A include a common first substrate 121. As the first substrate 121, for example, a flexible substrate including a film base 121A and a resin layer 121B provided on the film base 121A can be used.

As illustrated in FIG. 40, the top surface of the resin layer 121B is a first surface $121a$ of the first substrate 121, and the bottom surface of the film base 121A is a second surface $121b$ of the first substrate 121. A second substrate 122 is provided on the first surface $121a$ side of the first substrate 121. Detection electrodes 125 in the display device 2 are provided on the first surface $121a$ of the first substrate 121 at positions overlapping with the second substrate 122. First detection electrodes 126 in the fingerprint detection device 1A are provided on the first surface $121a$ of the first substrate 121 at positions not overlapping with the second substrate 122. An insulating layer 158 and a planarization layer 159 are laminated in this order on the detection electrode 125 and the first detection electrode 126. Reflection electrodes 128 in the display device 2 are provided on the planarization layer 159 at positions overlapping with the second substrate 122. Second detection electrodes 127 in the fingerprint detection device 1A are provided on the planarization layer 159 at positions not overlapping with the second substrate 122.

The configuration described above enables the display device 2 to display an image on a first surface $122a$ of the second substrate 122 and to detect a fingerprint of a finger in contact or in proximity on the second surface $121b$ side of the first substrate 121. The configuration described above enables the fingerprint detection device 1A to detect a fingerprint of a finger in contact or in proximity on the first surface $121a$ side of the first substrate 121 and to detect a fingerprint of a finger in contact or in proximity on the second surface $121b$ side of the first substrate 121.

The display apparatus 3 includes a control IC 19A and a communication IC 19B that are provided on the planarization layer 159 of the first substrate 121. The control IC 19A controls the display operation and the fingerprint detection operation of the display device 2 and the fingerprint detection operation of the fingerprint detection device 1A. The communication IC 19B is provided to perform wireless communication with an external reader/writer through a coil 129 provided on the first substrate 121, for example.

As illustrated in FIG. 40, the display device 2 may be provided with a touch detection electrode TDL on a second surface $122b$ side of the second substrate 122 to have a built-in touch detection function of detecting the position of a finger in contact or in proximity with the first surface 122*a* of the second substrate 122. A protective layer 157 for protecting the second detection electrodes 127, the control IC 19A, and the communication IC 19B may be provided above the first substrate 121.

As illustrated in FIG. 41, the display apparatus 3 is a card-type apparatus, and has, on one surface, a display region 10*a* and a fingerprint detection region 1Aa that is provided in a region 10*b* outside the display region. On the other surface, fingerprints can be detected in a region overlapping with the display region 10*a* and in a region overlapping with the fingerprint detection region 1Aa. For example, when the display apparatus 3 has an IC chip mounted thereon and has the electronic money function or the function of storing personal data therein, advanced security measures are required. Thus, the security of the display apparatus 3 can be improved by simultaneously performing fingerprint authentication using a plurality of fingers in a manner that the fingers are brought into contact with both surfaces of the display apparatus 3.

While the exemplary embodiments of the present invention have been described, the present invention is not intended to be limited to the embodiments. What is disclosed in the embodiments is merely illustrative and various kinds of changes can be made in the scope not departing from the gist of the present invention. It should be understood that appropriate changes made in the scope not departing from the gist of the present invention pertain to the technical scope of the present invention.

For example, the gate line GCL and the data line SGL are orthogonal to each other, but without being limited thereto, the gate line GCL and the data line SGL may be provided to be inclined in the row direction or the column direction. In this case, the shape of the detection electrode 25 may be a shape other than a rectangle, such as a rhombic and a parallelogram. The drive method for the fingerprint detection device is illustrative, and for example, the signal Vsg1 may be supplied to a detection electrode other than a detection electrode to be detected.

What is claimed is:

1. A fingerprint detection device, comprising:
    a substrate having a first surface and a second surface on an opposite side of the first surface, the first surface serving as a detection surface configured to detect an unevenness of a finger in contact or in proximity thereto;
    a detection electrode provided on a second surface side of the substrate and configured to be applied with a drive signal that produces an electrostatic capacitance to detect the unevenness;
    a switching element provided at a position corresponding to the detection electrode, the switching element comprising
        a semiconductor layer,
        a gate electrode opposed to the semiconductor layer,
        a source electrode, and
        a drain electrode;
    a gate line configured to supply a scanning signal to the gate electrode; and
    a first conductive wire configured to be supplied with a signal synchronized with the drive signal,
    wherein,
    in a vertical direction perpendicular to the second surface, a first distance from the detection electrode to the second surface is equal to or less than a second distance from the semiconductor layer to the second surface, a third distance from the drain electrode to the second surface is equal to or greater than the second distance,
    the drain electrode is in contact with the semiconductor layer through a first contact hole and in contact with the detection electrode through a second contact hole,
    the gate line extends in a horizontal direction along the second surface,
    the first conductive wire extends in the horizontal direction between the gate line and the detection electrode in a plan view, and
    the gate electrode, the gate line, and the first conductive layer are in a same layer.

2. The fingerprint detection device according to claim 1, further comprising a drive circuit provided on the second surface side of the substrate and configured to supply the drive signal to the detection electrode,
    wherein the source electrode is electrically connected to the drive circuit and in contact with the semiconductor layer through a third contact hole.

3. The fingerprint detection device according to claim 1, wherein
    a fourth distance from the gate electrode to the second surface is greater than the second distance and is less than the third distance.

4. The fingerprint detection device according to claim 1, wherein the first conductive wire is provided to surround the detection electrode.

5. The fingerprint detection device according to claim 1, further comprising a second conductive wire configured to be supplied with the signal,
    wherein
    the second conductive wire overlaps the gate line, and
    in the vertical direction, the second distance is larger than a fifth distance from the second conductive wire to the second surface.

6. The fingerprint detection device according to claim 5, wherein the second conductive wire has a width larger than a width of the gate line.

7. The fingerprint detection device according to claim 1, further comprising a second conductive wire configured to be supplied with the signal,
    wherein
    the second conductive wire overlaps the gate line, and
    the detection electrode and the second conductive wire are in a same layer.

8. The fingerprint detection device according to claim 7, wherein the second conductive wire has a width larger than a width of the gate line.

9. The fingerprint detection device according to claim 1, further comprising a conductive layer that is opposed to the second surface such that the detection electrode is disposed between the second surface and the conductive layer,
    wherein the conductive layer is supplied with the signal synchronized with the drive signal.

10. The fingerprint detection device according to claim 9, wherein the conductive layer and the drain electrode are in a same layer.

11. The fingerprint detection device according to claim 1, further comprising a conductive layer that is opposed to the second surface such that the detection electrode is disposed between the second surface and the conductive layer,
    wherein the conductive layer is electrically connected to the first conductive wire.

12. The fingerprint detection device according to claim 11, wherein the conductive layer and the drain electrode are in a same layer.

13. The fingerprint detection device according to claim 1, further comprising:
- a planarization layer provided on the second surface side to cover the detection electrode; and
- a protective layer including an inorganic material on the planarization layer.

14. The fingerprint detective service according to claim 13, wherein the inorganic material comprises a translucent conductive material.

15. The fingerprint detection device according to claim 1, wherein the substrate is fixed to a casting, and the first surface is exposed from an opening provided in the casing.

* * * * *